(12) United States Patent
Bellman et al.

(10) Patent No.: US 11,407,681 B2
(45) Date of Patent: Aug. 9, 2022

(54) GLASS-BASED ARTICLES HAVING A HARD FILM AND A CRACK MITIGATING COMPOSITE STRUCTURE FOR RETAINED ARTICLE STRENGTH AND SCRATCH RESISTANCE

(71) Applicant: Corning Incorporated, Corning, NY (US)

(72) Inventors: Robert Alan Bellman, Ithaca, NY (US); Shandon Dee Hart, Elmira, NY (US); Jenny Kim, Horseheads, NY (US); Karl William Koch, III, Elmira, NY (US); James Joseph Price, Corning, NY (US); Hannah Shenouda, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 269 days.

(21) Appl. No.: 16/498,908

(22) PCT Filed: Mar. 23, 2018

(86) PCT No.: PCT/US2018/023974
§ 371 (c)(1),
(2) Date: Sep. 27, 2019

(87) PCT Pub. No.: WO2018/183105
PCT Pub. Date: Oct. 4, 2018

(65) Prior Publication Data
US 2021/0087105 A1 Mar. 25, 2021

Related U.S. Application Data

(60) Provisional application No. 62/477,708, filed on Mar. 28, 2017.

(51) Int. Cl.
*B32B 15/04* (2006.01)
*B32B 17/06* (2006.01)
(Continued)

(52) U.S. Cl.
CPC ............ *C03C 17/42* (2013.01); *C03C 17/009* (2013.01); *C03C 21/002* (2013.01);
(Continued)

(58) Field of Classification Search
CPC .............. C03C 17/009; C03C 2217/78; C03C 2217/734
(Continued)

(56) References Cited

U.S. PATENT DOCUMENTS

| 4,995,684 A | 2/1991 | Tustison et al. |
| 6,740,416 B1 | 5/2004 | Yokogawa et al. |

(Continued)

FOREIGN PATENT DOCUMENTS

| EP | 1153739 A1 | 11/2001 |
| WO | 2015/057555 A1 | 4/2015 |

(Continued)

OTHER PUBLICATIONS

Cotterell et al; "Buckling and Cracking of Thin Films on Compliant Substrates Under Compression," International Journal of Fracture, 2000, 104(2): pp. 169-179.
(Continued)

*Primary Examiner* — Lauren R Colgan
(74) *Attorney, Agent, or Firm* — William J. Tucker

(57) ABSTRACT

An article that includes: a glass-based substrate comprising opposing major surfaces; a crack mitigating composite over one of the major surfaces, the composite comprising an inorganic element and a polymeric element; and a hard film disposed on the crack mitigating composite comprising an elastic modulus greater than or equal to the elastic modulus
(Continued)

of the glass-based substrate. The crack mitigating composite is characterized by an elastic modulus of greater than 30 GPa. Further, the hard film comprises at least one of a metal-containing oxide, a metal-containing oxynitride, a metal-containing nitride, a metal-containing carbide, a silicon-containing polymer, a carbon, a semiconductor, and combinations thereof.

21 Claims, 16 Drawing Sheets

(51) Int. Cl.
*C03C 17/42* (2006.01)
*C03C 17/00* (2006.01)
*C03C 21/00* (2006.01)

(52) U.S. Cl.
CPC .... *C03C 2217/734* (2013.01); *C03C 2217/78* (2013.01); *C03C 2217/948* (2013.01)

(58) Field of Classification Search
USPC .............................. 428/428, 432, 701, 702
See application file for complete search history.

(56) References Cited

U.S. PATENT DOCUMENTS

| | | | |
|---|---|---|---|
| 9,079,802 B2 | 7/2015 | Bellman et al. | |
| 9,335,444 B2 * | 5/2016 | Hart .................... | G02B 1/11 |
| 9,355,444 B2 | 5/2016 | Nava et al. | |
| 9,359,261 B2 | 6/2016 | Bellman et al. | |
| 9,366,784 B2 | 6/2016 | Bellman et al. | |
| 9,586,858 B2 | 3/2017 | Bellman et al. | |
| 10,688,756 B2 * | 6/2020 | Chu .................... | G09F 9/301 |
| 2013/0171456 A1 | 7/2013 | Fadeev et al. | |
| 2014/0106146 A1 * | 4/2014 | Decker ................ | C03C 17/42 |
| | | | 428/210 |
| 2014/0106150 A1 | 4/2014 | Decker et al. | |
| 2014/0220327 A1 * | 8/2014 | Adib ................... | C03C 3/083 |
| | | | 428/217 |
| 2014/0335330 A1 * | 11/2014 | Bellman ............... | C04B 35/597 |
| | | | 428/212 |
| 2014/0340755 A1 * | 11/2014 | Eguchi ................ | G02B 5/0294 |
| | | | 359/613 |
| 2015/0079398 A1 * | 3/2015 | Amin ................... | C03C 17/3435 |
| | | | 428/408 |
| 2015/0323705 A1 * | 11/2015 | Hart .................... | G02B 27/0025 |
| | | | 359/580 |
| 2016/0060161 A1 | 3/2016 | Ellison et al. | |
| 2017/0176644 A1 | 6/2017 | Nakayama | |
| 2018/0009997 A1 * | 1/2018 | Bhagwagar .......... | C09D 5/1675 |

FOREIGN PATENT DOCUMENTS

| | | |
|---|---|---|
| WO | 2015/080030 A1 | 6/2015 |
| WO | 2018118467 A2 | 6/2018 |

OTHER PUBLICATIONS

Fischer-Cripps; "Critical Review of Analysis and Interpretation of Nanoindentation Test Data," Surface & Coatings Technology, 200, pp. 4153-4165, 2006.
Giannelis; "Polymer Layered Silicate Nanocomposites", Advanced Materials, vol. 8, Issue 1, p. 29, 1996.
Harding et al; "Cracking During Indentation and Its Use in the Measurement of Fracture Toughness:"; Mat. Res. Soc. Symp. Proc., vol. 356, 1995, 663-668.
Hay et al; "Continuous Stiffness Measurement During Instrumented Indentation Testing," Experimental Techniques, 34 (3), pp. 86-94, 2010.
He et al; "Crack Deflection at an Interface Between Dissimilar Elastic Materials," International Journal of Solids and Structures, 1989, 25(9): pp. 1053-1067.
Hu et al; "Dynamic Fracturing of Strengthened Glass Under Biaxial Tensile Loading" Joutnal of Non-Crystalline Solids, 2014. 405(0): p. 153-158.).
Hutchinson et al; "Mixed Mode Cracking in Layered Materials", Advances in Applied Mechanics, vol. 29, 1992; pp. 63-191.
International Search Report and Written Opinion of the International Searching Authority; PCT/US2018/023974; dated Jul. 2, 2018; 15 Pages; European Patent Office.
Kittel; "Introduction to Solid State Physics"; Seventh Edition, John Wiley & Sons, Inc., NY, 1996, pp. 611-627.
Kubono et al, "Polymer Thin Films Prepared by Vapor Deposition", Prog. Polym. Sci., vol. 19, p. 389-138, 1994.
Li et al; "Resonant Ultrasound Spectroscopy Offers Unique Advantages as a Nondestructive Test Method"; Advanced Materials & Processes; (2014) pp. 17-19.
Oliver et al; "An Improved Technique for Determining Hardness and Elastic Modulus Using Load and Displacement Sensing Indentation Experiments"; J. Mater. Res., vol. 7, No. 6; (1992); pp. 1564-1583.
Oliver et al; "Measurement of Hardness and Elastic Modulus by Instrumented Indentation Advances in Understanding and Refinements to Methodology"; J. Mater. Res., vol. 19, No. 1, (2004) pp. 3-20.
Shackelford; "Introduction To Materials Science for Engineers"; Sixth Edition; Pearson Prentice Hall, New Jersey, 2005, pp. 404-418.
Shim et al., "Organic Thin-Film Transistors With ODPA-ODA Polyimide as a Gate Insulator Through Vapor Deposition Polymerization", Thin Solid Films, 441, p. 284-286, 2003.
Smart et al; "Solid State Chemistry, an Introduction"; Chapman & Hall University and Professional Division, London, 1992, pp. 136-151.
Yang et al; "Synthesis and Characterization of Nacre-Inspired Zirconia/Polyimide Multilayer Coatings by a Hybrid Sputtering and Pulsed Laser Deposition Technique", Surface and Coatings Technology, vol. 284, p. 118, 2015.
Zadler et al; "Resonant Ultrasound Spectroscopy: Theory and Application"; Geophys. J. Int. (2004) 156, pp. 154-169.
Zeng et al; "Investigation of Mechanical Properties of Transparent Conducting Oxide Thin Films." Thin Solid Films, 2003, 443(12): pp. 60-65.

* cited by examiner

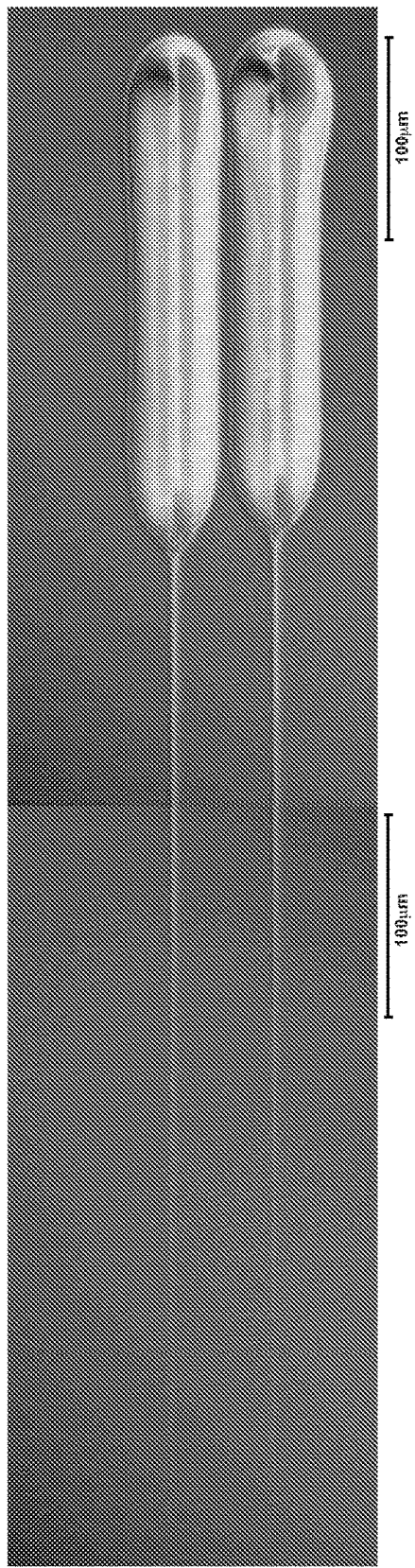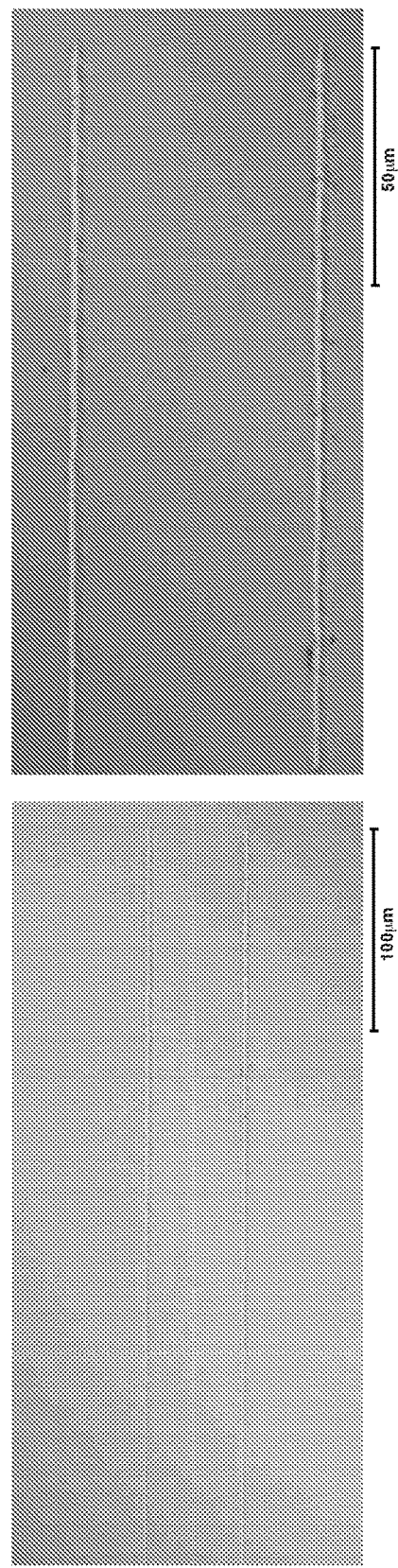
FIG. 12A
FIG. 12B

GLASS-BASED ARTICLES HAVING A HARD FILM AND A CRACK MITIGATING COMPOSITE STRUCTURE FOR RETAINED ARTICLE STRENGTH AND SCRATCH RESISTANCE

CROSS REFERENCE TO RELATED APPLICATIONS

This application claims the benefit of priority under 37 U.S.C. § 371 to International Patent Application No. PCT/US2018/023974, filed Mar. 23, 2018, which claims the benefit of priority under 35 U.S.C. § 119 to U.S. Provisional Patent Application No. 62/477,708, filed Mar. 28, 2017, the contents of all of which are relied upon and incorporated herein by reference in their entirety.

BACKGROUND

This disclosure relates to articles with a glass-based substrate that has a scratch-resistant film disposed on its surface, and display device applications thereof.

Articles including a glass-based substrate, which may be strengthened or strong as described herein, have found wide usage recently as a protective cover glass for displays, especially in touch-screen applications, and there is a potential for their use in many other applications, for example automotive or architectural windows, glass for photovoltaic systems and glass-based substrates for use in other electronic device applications. Further, such articles are often used in consumer electronic products to protect devices within the product, to provide a user interface for input and/or display, and/or many other functions. These consumer electronic products include mobile devices, for example smart phones, mp3 players and computer tablets.

Strong optical performance is beneficial in many of these articles in terms of maximum light transmission and minimum reflectivity when the articles are used in cover substrate and in some housing substrate applications. In addition, in cover substrate applications it is desirable that the color exhibited or perceived, in reflection and/or transmission, does not change appreciably as the viewing angle (or incident illumination angle) is changed. That is, if the color, reflectivity or transmission changes with viewing angle to an appreciable degree, the user of the product incorporating the cover glass will perceive a change in the color or brightness of the display, which can diminish the perceived quality of the display. Of these changes, a change in color is often the most noticeable and objectionable to users.

In many of these applications it can be advantageous to apply a scratch-resistant film to the glass-based substrates. Such scratch-resistant films can also include other functional film(s) and/or layer(s) disposed between an outer scratch-resistant film and the substrate. As such, exemplary scratch-resistant films can include one or more layers or films of the following materials: indium-tin-oxide (ITO) or other transparent conductive oxides (e.g., aluminum and gallium doped zinc oxides and fluorine doped tin oxide), hard films of various kinds (e.g., diamond-like carbon, $Al_2O_3$, AlN, $AlO_xN_y$, $Si_3N_4$, $SiO_xN_y$, $Si_uAl_vO_xN_z$, TiN, TiC), IR or UV reflecting layers, conducting or semiconducting layers, electronics layers, thin-film-transistor layers, or anti-reflection (AR) films (e.g., $SiO_2$, $Nb_2O_5$ and $TiO_2$ layered structures). These scratch-resistant films, whether stand-alone or multi-layer, are desired to have a high scratch resistance and are often hard and/or have a high elastic modulus, or otherwise their other functional properties or those of the substrate beneath them (e.g., mechanical, durability, electrical conductivity, and/or optical properties) will be degraded. In most cases these scratch-resistant films are thin films; consequently, they generally have a thickness in the range of 0.005 µm to 10 µm (e.g., 5 nm to 10,000 nm).

When a scratch-resistant film is applied to a surface of a glass-based substrate, which may be strengthened or characterized as strong, the average flexural strength of the glass-based substrate may be reduced, for example, when evaluated using ring-on-ring strength testing. This behavior has been measured to be independent of temperature effects (i.e., the behavior is not caused by significant or measurable relaxation of surface compressive stress in the strengthened glass-based substrate due to any heating). The reduction in average flexural strength is also apparently independent of any glass surface damage or corrosion from processing, and is apparently an inherent mechanical attribute of the article, even when thin, scratch-resistant films having a thickness in the range from about 5 nm to about 10 µm are applied to the article. Without being bound by theory, this reduction in average flexural strength is believed to be associated with the adhesion between a scratch-resistant film relative to the strengthened or strong glass-based substrates, the initially high average flexural strength (or high average strain-to-failure) of selected strengthened or strong glass-based substrates relative to selected, scratch-resistant films, together with crack bridging between such a film and the glass-based substrate.

When these articles employing glass-based substrates are employed in certain electronic device applications, for example, they may be subjected to additional high temperature processing during manufacturing. More specifically, the articles can be subjected to additional thermal treatments after deposition of the scratch-resistant film on the glass-based substrates. These additional high temperature treatments often are the result of application-specific development of additional structures and components on the substrates and/or films of the article. Further, the deposition of the scratch-resistant film itself on the substrate can be conducted at relatively high temperatures.

In view of these new understandings, there is a need to prevent scratch-resistant films from reducing the average flexural strength of glass-based substrates in these articles. There is also a need to ensure that the average flexural strength of the glass-based substrates is substantially retained, even after high temperature exposures from scratch-resistant film deposition processes and additional application-specific thermal treatments. In addition, a need also exists for retaining the scratch-resistance and optical properties of the substrate and scratch-resistant film in view of the additional design, configuration and/or processing of the interface between the substrate and the scratch-resistant film. That is, there is a need to retain, or otherwise balance, the scratch-resistance and optical properties of the article upon the introduction of additional interfacial features aimed at retaining strength of the article, e.g., as needed for particular applications.

SUMMARY

A first aspect of this disclosure pertains to an article including a glass-based substrate comprising opposing major surfaces; a crack mitigating composite over one of the major surfaces, the composite comprising an inorganic element and a polymeric element; and a hard film disposed on the crack mitigating composite, the film comprising an elastic modulus greater than or equal to the elastic modulus of the glass-based substrate. The crack mitigating composite is characterized by an elastic modulus of greater than about 30 GPa. Further, the hard film comprises at least one of a metal-containing oxide, a metal-containing oxynitride, a metal-containing nitride, a metal-containing carbide, a silicon-containing polymer, a carbon, a semiconductor, and combinations thereof.

According to a second aspect, the article of the first aspect is provided, wherein the article is characterized by an average flexural strength that is greater than or equal to about 50% of an average flexural strength of the substrate, as measured by ring-on-ring (ROR) testing using an average from five (5) or more samples.

According to a third aspect, the article of aspect 1 or aspect 2 is provided, wherein the hard film is further characterized by an indentation hardness of greater than or equal to about 8 GPa.

According to a fourth aspect, the article of any one of aspects 1-3 is provided, wherein the inorganic element comprises an oxide, a nitride or an oxynitride, and the polymeric element comprises at least one of a polyimide, a polycarbonate, a polyurethane, a polyester, and a fluorinated polymer.

According to a fifth aspect, the article of any one of aspects 1-4 is provided, wherein the article is further characterized by a light transmissivity of greater than or equal to 50% in the visible spectrum from about 400 nm to about 800 nm.

According to a sixth aspect, the article of any one of aspects 1-5 is provided, wherein the article is further characterized by a pencil hardness of 9H or greater.

According to a seventh aspect, the article of any one of aspects 1-6 is provided, wherein article is further characterized by a delamination threshold of 150 mN or more, as tested using a Berkovich Ramped Scratch Test on the hard film.

According to an eighth aspect, the article of any one of aspects 1-7 is provided, wherein the hard film comprises a multi-layer antireflection coating, and further wherein the crack mitigating composite and the hard film collectively comprise a photopic average single-side reflectance of less than about 2%.

A ninth aspect of the disclosure pertains to an article including a glass-based substrate comprising opposing major surfaces; a crack mitigating composite over one of the major surfaces, the composite comprising an inorganic element and a polymeric element; and a hard film disposed on the crack mitigating composite, the film comprising an elastic modulus greater than or equal to the elastic modulus of the glass-based substrate. The crack mitigating composite is characterized by an elastic modulus ratio between the inorganic element and the polymeric element of greater than 10:1. Further, the hard film comprises at least one of a metal-containing oxide, a metal-containing oxynitride, a metal-containing nitride, a metal-containing carbide, a silicon-containing polymer, a carbon, a semiconductor, and combinations thereof.

According to a tenth aspect, the article of aspect 9 is provided, wherein the article is characterized by an average flexural strength that is greater than or equal to about 50% of an average flexural strength of the substrate, as measured by ROR testing using an average from five (5) or more samples.

According to a eleventh aspect, the article of aspect 9 or aspect 10 is provided, wherein the hard film is further characterized by an indentation hardness of greater than or equal to about 8 GPa.

According to a twelfth aspect, the article of any one of aspects 9-11 is provided, wherein the inorganic element comprises an oxide, a nitride or an oxynitride, and the polymeric element comprises at least one of a polyimide, a polycarbonate, a polyurethane, a polyester, and a fluorinated polymer.

According to a thirteenth aspect, the article of any one of aspects 9-12 is provided, wherein the article is further characterized by a light transmissivity of greater than or equal to 50% in the visible spectrum from about 400 nm to about 800 nm.

According to a fourteenth aspect, the article of any one of aspects 9-13 is provided, wherein the article is further characterized by a pencil hardness of 9H or greater.

According to a fifteenth aspect, the article of any one of aspects 9-14 is provided, wherein the article is further characterized by a delamination threshold of 150 mN or more, as tested using a Berkovich Ramped Scratch Test on the hard film.

According to a sixteenth aspect, the article of any one of aspects 9-15 is provided, wherein the hard film comprises a multi-layer antireflection coating, and further wherein the crack mitigating composite and the hard film collectively comprise a photopic average single-side reflectance of less than about 2%.

A seventeenth aspect of the disclosure pertains to an article including a glass-based substrate comprising opposing major surfaces; a crack mitigating composite over one of the major surfaces, the composite comprising an inorganic element and a polymeric element; and a hard film disposed on the crack mitigating composite, the film comprising an elastic modulus greater than or equal to the elastic modulus of the glass-based substrate. The inorganic layer comprises an oxide, a nitride or an oxynitride, and the polymeric layer comprises at least one of a polyimide, a polycarbonate, a polyurethane, a polyester, and a fluorinated polymer. Further, the hard film comprises at least one of a metal-containing oxide, a metal-containing oxynitride, a metal-containing nitride, a metal-containing carbide, a silicon-containing polymer, a carbon, a semiconductor, and combinations thereof.

According to an eighteenth aspect, the article of aspect 17 is provided, wherein the article is characterized by an average flexural strength that is greater than or equal to about 50% of an average flexural strength of the substrate, as measured by ROR testing using an average from five (5) or more samples.

According to a nineteenth aspect, the article of aspect 17 or aspect 18 is provided, wherein the hard film is further characterized by an indentation hardness of greater than or equal to about 8 GPa.

According to a twentieth aspect, the article of any one of aspects 17-19 is provided, wherein the at least one polymeric layer is a polyimide that comprises PMDA-ODA, ODPA-ODA, BPDA-ODA, or a fluorinated polyimide.

According to a twenty-first aspect, the article of any one of aspects 17-20 is provided, wherein the at least one inorganic layer comprises $SiO_2$, $Al_2O_3$, $ZrO_2$, CaO, $CaCO_3$, SnO, ZnO, $SiN_x$, $AlN_x$, $AlO_xN_y$, $Si_uAl_vO_xN_y$, or $SiO_xN_y$.

According to a twenty-second aspect, the article of any one of aspects 17-21 is provided, wherein the article is further characterized by a light transmissivity of greater than or equal to 50% in the visible spectrum from about 400 nm to about 800 nm.

According to a twenty-third aspect, the article of any one of aspects 17-22 is provided, wherein the article is further characterized by a pencil hardness of 9H or greater.

According to a twenty-fourth aspect, the article of any one of aspects 17-23 is provided, wherein article is further characterized by a delamination threshold of 150 mN or more, as tested using a Berkovich Ramped Scratch Test on the hard film.

According to a twenty-fifth aspect, the article of any one of aspects 17-24 is provided, wherein the crack mitigating composite comprises two or more inorganic layers and at least one polymeric layer, wherein one of the two or more inorganic layers is in contact with the substrate and another of the two or more inorganic layers is in contact with the hard film.

According to a twenty-sixth aspect, the article of any one of aspects 17-25 is provided, wherein each of the at least one inorganic layer comprises an inorganic layer thickness and each of the at least one polymeric layer comprises a polymeric layer thickness, and further wherein a ratio of the polymeric layer thickness to the inorganic layer thickness is from about 0.1:1 to about 5:1.

According to a twenty-seventh aspect, the article of any one of aspects 17-26 is provided, wherein the hard film comprises a multi-layer antireflection coating, and further wherein the crack mitigating composite and the hard film collectively comprise a photopic average single-side reflectance of less than about 2%.

According to a twenty-eighth aspect of the disclosure, a consumer electronic product is provided that includes: a housing having a front surface, a back surface and side surfaces; electrical components provided at least partially within the housing, the electrical components including at least a controller, a memory, and a display, the display being provided at or adjacent the front surface of the housing; and a cover glass disposed over the display. Further, at least one of a portion of the housing or the cover glass comprises the article of any one of aspects 1-27.

According to a twenty-ninth aspect of the disclosure, the article of any one of aspects 1-27 is provided, wherein any cracked, damaged or delaminated region associated with the at least one of the hard film and the crack mitigating composite is less than 15 microns in length after the hard film is subjected to an indent from a diamond indenter at a 250 mN load level during the Cube Corner Indentation Test.

BRIEF DESCRIPTION OF THE DRAWINGS

FIG. 12A is an optical microscopy image from an article comprising a glass-based substrate, a silicon nitride hard film and a barium fluoride crack mitigating composite, as subjected to a Berkovich ramped scratch test (0 to 150 mN).

FIG. 12B is an optical microscopy image from an article, according to some embodiments of the disclosure, comprising a glass-based substrate, a silicon nitride hard film and a crack mitigating composite comprising alumina and polyimide layers, as subjected to a Berkovich ramped scratch test (0 to 150 mN).

DETAILED DESCRIPTION

Figure 1A:
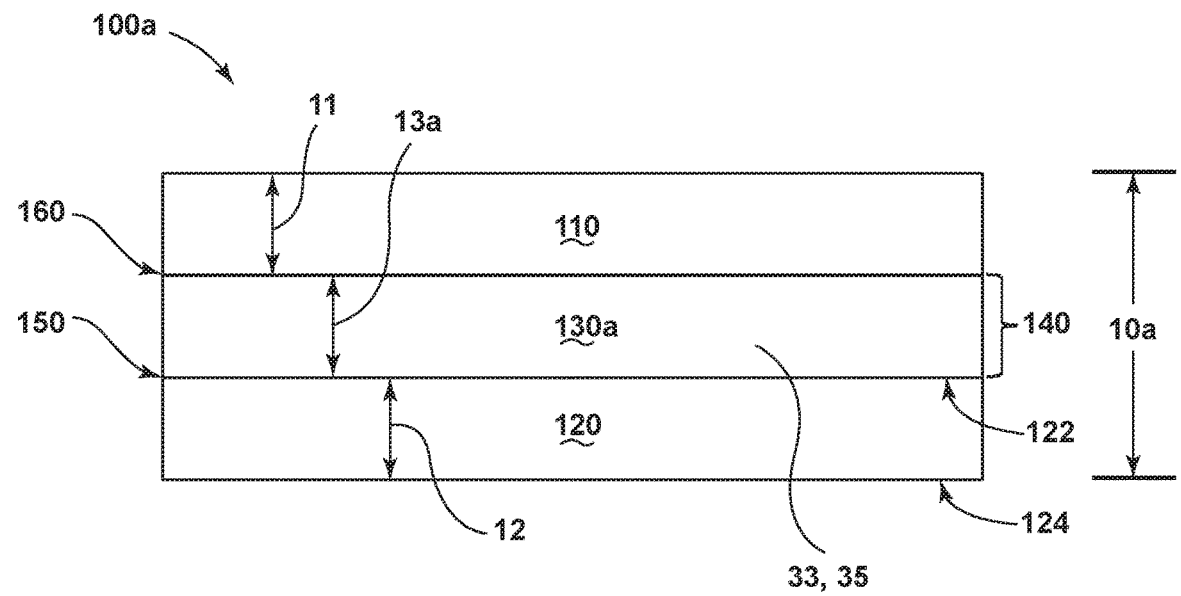
FIG. 1A is an illustration of an article comprising a glass-based substrate, a hard film and a crack mitigating composite, according to one or more embodiments.

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the disclosure. In addition, like or identical reference numerals may be used to identify common or similar elements.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein (except when used in "substantially no peeling" which is defined elsewhere) are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein the term "glass-based" is meant to include any material made at least partially of glass, including glass and glass-ceramics, and sapphire. "Glass-ceramics" include materials produced through controlled crystallization of glass. In embodiments, glass-ceramics have about 1% to about 99% crystallinity. Non-limiting examples of glass ceramic systems that may be used include $Li_2O \times Al_2O_3 \times nSiO_2$ (i.e. LAS system), $MgO \times Al_2O_3 \times nSiO_2$ (i.e. MAS system), and $ZnO \times Al_2O_3 \times nSiO_2$ (i.e. ZAS system).

Referring to FIG. 1A, aspects of this disclosure include a laminate article 100a having a total stack thickness 10a. The article 100a also includes a hard film 110 with a thickness 11, a glass-based substrate 120 with a thickness 12 and a crack mitigating composite 130a with a thickness 13a comprising an inorganic element 33 and a polymeric element 35. In these aspects, the crack mitigating composite 130a includes an inorganic element 33 and a polymeric element 35, either or both in the form of one or more layers, films, or other structures, such as particulate, fibers and/or whiskers. Further, the crack mitigating composite 130a, inclusive of its inorganic and polymer elements 33, 35, is characterized by an elastic modulus of greater than 30 GPa. For example, the crack mitigating composite 130a can be characterized by an elastic modulus of 30.5 GPa, 31 GPa, 32 GPa, 33 GPa, 34 GPa, 35 GPa, 40 GPa, 45 GPa, 50 GPa, and so on, including all elastic modulus values between these levels, and conceivably up to 80 GPa and even approaching 120 GPa in some cases.

According to some embodiments of the laminate article 100a, the crack mitigating composite 130a includes an inorganic element 33 and a polymeric element 35, with greater than about 20% by volume of material associated with the inorganic element 33 and greater than about 0.5% or more by volume of material associated with the polymeric element 35. For example, the amount of material associated with the inorganic element 35 can be greater than about 20%, 30%, 40%, 50%, 60% by volume, and all amounts between these volumetric levels. Preferably, the polymeric element 35 comprises polymeric material having C—C, C—N, C—O and/or C═C bonds as polymeric chain-forming bonds. Further, in some embodiments, the crack mitigating composite 130a can have a composite crack-onset-strain (COS) value of greater than about 0.8%, greater than 1%, greater than about 1.5%, and all COS values between or above these levels.

COS on a glass substrate is measured in a ring-on ring setup linked to a camera system. More specifically, to determine the strain-to-failure of the coated article 100, force is applied to the top ring 304 in a downward direction and/or to the bottom ring in an upward direction in a ring-on-ring mechanical testing device. According to the Ring-on-Ring Tensile Testing Procedure, the article 100 is positioned between the bottom ring and the top ring. The top ring and the bottom ring have different diameters. As used herein, the top ring has a diameter of 12.7 mm and the bottom ring as a diameter of 25.4 mm. The portion of the top ring and bottom ring which contact the article are circular in cross section and each have radius of 1.6 mm. The top ring and bottom ring are made of steel. Testing is performed in an environment of about 22° C. with 45%-55% relative humidity. The articles used for testing are 50 mm by 50 mm square in size. The force on the top ring and or bottom ring is increased, causing strain in the article 100 until catastrophic failure of one or both of the substrate and any optical coating. A light and camera are provided below the bottom ring to record the catastrophic failure during testing. An electronic controller, such as a Dewetron acquisition system, is provided to coordinate the camera images with the applied load to determine the load when catastrophic damage is observed by the camera. To determine the strain-to-failure, camera images and load signals are synchronized through the Dewetron system, so that the load at which the coating and/or substrate shows failure can be determined. Then, finite element analysis is used to analyze the strain levels the sample is experiencing at this load. The element size may be chosen to be fine enough to be representative of the stress concentration underneath the loading ring. The strain level is averaged over 30 nodal points or more underneath the loading ring. Furthermore, testing techniques to determine load-to-failure may be found in "Hu, G., et al., *Dynamic fracturing of strengthened glass under biaxial tensile loading*. Journal of Non-Crystalline Solids, 2014. 405(0): p. 153-158.)"

Further, in some embodiments of the laminate article 100a, the crack mitigating composite 130a can be characterized by an elastic modulus ratio between the inorganic element 33 and the polymeric element 35 of greater than 10:1 (e.g., an inorganic element 33 with an elastic modulus of 150 GPa and a polymeric element with an elastic modulus of 10 GPa would result in an elastic modulus ratio of 15:1). For example, the elastic modulus ratio of the crack mitigating composite 130a can be 11:1, 12:1, 13:1, 14:1, 15:1, 20:1, 30:1, 40:1, 50:1, 60:1, 70:1, 80:1, 90:1, 100:1 and all elastic modulus ratios between or above these ratios. According to some embodiments, a practical elastic modulus ratio limit for the crack mitigating composite 130a is about 500:1 for certain very low elastic modulus polymeric elements 35 (e.g., <1 GPa) coupled with relatively high elastic modulus inorganic elements 33 (e.g., >75 GPa) incorporated within the crack mitigating composite 130a.

Further, the hard film 110 of the laminate article 100a comprises at least one of a metal-containing oxide, a metal-containing oxynitride, a metal-containing nitride, a metal-containing carbide, a silicon-containing polymer, a carbon, a semiconductor, and combinations thereof. In some embodiments of the laminate article 100a, the hard film 110 comprises silicon nitride or silicon dioxide. In certain aspects, the hard film 110 can be further characterized by an indentation hardness of greater than or equal to about 8 GPa. In other embodiments, the hard film 110 can be characterized by an indentation hardness of greater than or equal to about 12 GPa. Accordingly, the hard film 110 can be characterized by an indentation hardness of 8 GPa, 9 GPa, 10 GPa, 11 GPa, 12 GPa, 13 GPa, 14 GPa, 15 GPa, 20 GPa, 25 GPa, 30 GPa and all indentation hardness values between or above these levels. According to some embodiments, a practical limit for the indentation hardness of the hard film 110 is about 50 GPa.

Within the article 100a, the interfacial properties at an effective interface 140 between the hard film 110 and the crack mitigating composite 130a or the crack mitigating composite 130a and the substrate 120 are modified, generally by virtue of the crack mitigating composite 130a, such that the article 100a substantially retains its average flexural strength, and the film 110 retains functional properties for its application, particularly scratch resistance. For example, in some embodiments of the laminate article 100a, the article is characterized by an average flexural strength that is greater than or equal to about 50% of an average flexural strength of the glass-substrate (i.e., as tested without a crack mitigating composite 130a and hard film 110 structures disposed thereon). In other embodiments, the flexural strength of the article 100a that comprises the crack mitigating composite 130a may be characterized by comparison to a similar article comprising the same hard film 110 and the same glass substrate 120, but no crack mitigating composite structure. In these embodiments, the article 100a that comprises the crack mitigating composite 130a may have an average or characteristic flexural strength that is 25% greater, or 50% greater, than the same article without the crack mitigating composite (i.e., a comparison article in which the hard film 110 is deposited directly over the substrate 120).

Figure 1B:
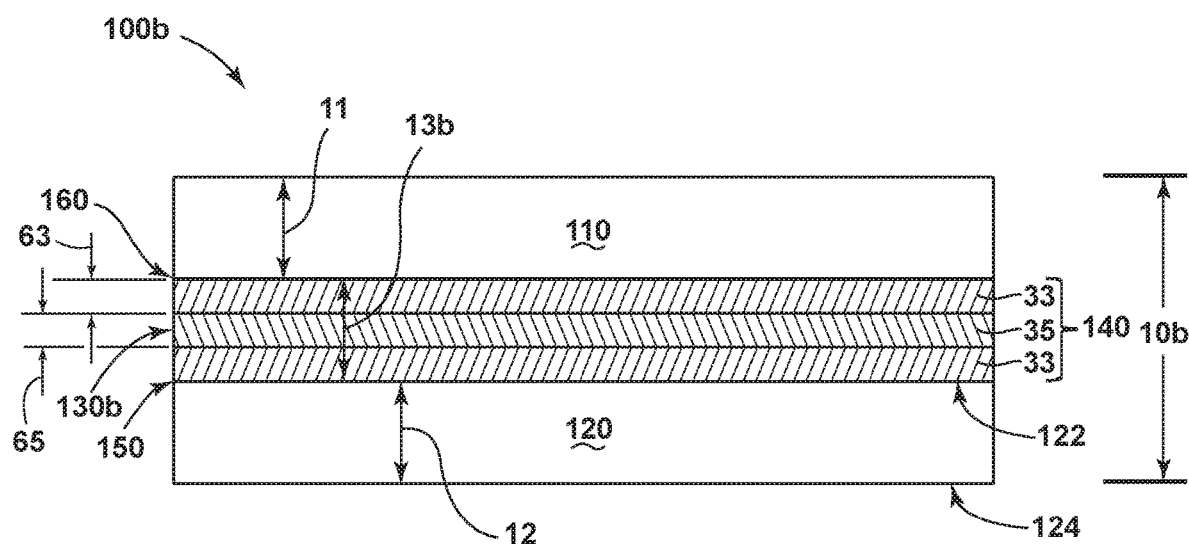
FIG. 1B is an illustration of an article comprising a glass-based substrate, a hard film and a crack mitigating composite comprising two inorganic layers and a polymeric layer, according to one or more embodiments.

Referring now to FIG. 1B, aspects of this disclosure include a laminate article 100b having a total stack thickness 10b. The article 100b also includes a hard film 110, a glass-based substrate 120, and a crack mitigating composite 130b having a total thickness 13b and comprising an inorganic element 33 and a polymeric element 35. The laminate article 100b is similar to the laminate article 100a; consequently, like-numbered elements have the same or similar structure and function(s) (e.g., the hard film 110). Further, as shown in FIG. 1B, the crack mitigating composite 130b can include an inorganic element 33 in the form of one or more layers, and a polymeric element 35 in the form of one or more layers. As shown in exemplary form in FIG. 1B, the laminate article 100b has an inorganic element 33 with two layers and a polymeric element 35 with one layer interposed between the layers of the inorganic element 33. As also shown in FIG. 1B, one of the layers of the inorganic element 33 is in contact with the glass-based substrate 120 and the other layer of the inorganic element 33 is in contact with the hard film 110. As also shown in FIG. 1B, each of the layers of the inorganic element 33 has a thickness 63 and each of the layers of the polymeric element 35 has a thickness 65. Additionally, the thickness of each layer may be the same as the other layers, or may be different therefrom.

Further, the crack mitigating composite 130b, inclusive of its inorganic and polymer elements 33, 35 in the form of layers, is characterized by an elastic modulus of greater than 30 GPa. For example, the crack mitigating composite 130b can be characterized by an elastic modulus of 30.5 GPa, 31 GPa, 32 GPa, 33 GPa, 34 GPa, 35 GPa, 40 GPa, 45 GPa, 50 GPa, and so on, including all elastic modulus values between these levels, and conceivably up to 80 GPa and even approaching 120 GPa in some cases. As described herein, the "elastic modulus" or "average elastic modulus" of the crack mitigating composite 130b, inclusive of its inorganic and polymer elements 33, 35 in the form of layers, is calculated by taking the measured values of each layer of the inorganic and polymeric elements 33, 35, as measured on a single film basis on the order of 100 nm to 1000 nm in thickness and then calculating a volumetric average elastic modulus for the crack mitigating composite 130b. In addition, the volumetric average elastic modulus can be calculated as understood by those with ordinary skill in the field of the disclosure, e.g., in view of volumetric estimates or actual volumetric measurements for each of the layers of the inorganic and polymeric elements 33, 35. In addition, the modulus of the crack mitigating composite, which may comprise layers, can be an effective or empirical modulus that is directly measured on the composite using known nanoindentation methods sampling a volume of the composite structure that effectively averages together the moduli of the organic and inorganic layer components.

According to some embodiments of the laminate article 100b, the crack mitigating composite 130b includes an inorganic element 33 comprising one or more layers and a polymeric element 35 comprising one or more layers, with greater than about 20% by volume of material associated with the inorganic element 33 and greater than about 0.5% or more by volume of material associated with the polymeric element 35. For example, the amount of material associated with the inorganic element 35 can be greater than about 20%, 30%, 40%, 50%, 60% by volume, and all amounts between these volumetric levels. Preferably, the polymeric element 35 comprises polymeric material having C—C, C—N, C—O and/or C=C bonds as polymeric chain-forming bonds. Further, in some embodiments, the crack mitigating composite 130b can have a composite crack-onset-strain (COS) value of greater than about 0.8%, greater than 1%, greater than about 1.5%, and all COS values between or above these levels.

Further, in some embodiments of the laminate article 100b, the crack mitigating composite 130b can be characterized by an elastic modulus ratio between the inorganic element 33 and the polymeric element 35 (i.e., as inclusive of their respective layers) of greater than 10:1 (e.g., an inorganic element 33 with two layers, each having an elastic modulus of 150 GPa, and a polymeric element having one layer with an elastic modulus of 10 GPa would result in an elastic modulus ratio of 15:1). For example, the elastic modulus ratio of the crack mitigating composite 130b can be 11:1, 12:1, 13:1, 14:1, 15:1, 20:1, 30:1, 40:1, 50:1, 60:1 70:1, 80:1, 90:1, 100:1, and all elastic modulus ratios between or above these ratios. According to some embodiments, a practical elastic modulus ratio limit for the crack mitigating composite 130b is about 500:1 for certain very low elastic modulus polymeric elements 35 (e.g., <1 GPa) coupled with relatively high elastic modulus inorganic elements 33 (e.g., >75 GPa) incorporated within the crack mitigating composite 130b.

Referring again to FIG. 1B, the crack mitigating composite 130b of the laminated article 100b includes an inorganic element 33 with one or more layers having a thickness 63. In some aspects, the thickness 63 of each layer of the inorganic element 33 can range from about 1 nm to about 200 nm, preferably from about 5 nm to about 150 nm. Further, in some aspects, the thickness 65 of each layer of the polymeric element 35 can range from about 1 nm to about 500 nm, preferably from about 5 nm to about 300 nm. According to another implementation, the total thickness 13b of the crack mitigating composite 130b can range from about 10 nm to about 1000 nm. In a preferred aspect, the total thickness 13b of the crack mitigating composite 130b ranges from about 50 nm to about 750 nm.

In some implementations, the laminate article 100b can include a crack mitigating composite 130b governed by a thickness ratio for the layers of its inorganic and polymeric elements 33, 35. For example, a ratio between the total thickness of the polymeric element 35 (i.e., the sum of the thickness 65 values for each of its layers) and the inorganic element 33 (i.e., the sum of the thickness 63 values for each of its layers) can be from about 0.1:1 to about 5:1. In other implementations, the thickness ratio can be about 0.2:1 to about 3:1. As also understood herein, the implementations of the laminate article 100b and crack mitigating composite 130b governed by such thickness ratios are configured such that the thickness ratios are calculated independent of any additional layers added to the crack mitigating composite 130b immediately adjacent to one or both of the hard film 110 and/or glass-based substrate 120. Such layers, as described herein, are referred to as "tie layers" and are typically one half to an order (or orders) of magnitude thinner than the other layers of the inorganic and polymeric elements 33, 35.

Within the article 100b, the interfacial properties at an effective interface 140 between the hard film 110 and the crack mitigating composite 130b or between the crack mitigating composite 130b and the substrate 120 are modified, generally by virtue of the crack mitigating composite 130b, such that the article 100b substantially retains its average flexural strength, and the hard film 110 retains functional properties for its application, particularly scratch-resistance. For example, in some embodiments of the laminate article 100b, the article is characterized by an average flexural strength that is greater than or equal to about 70% of an average flexural strength of the glass-substrate (i.e., as tested without a crack mitigating composite 130b and hard film 110 structures disposed thereon).

As understood in this disclosure, the terms "hard film," "scratch-resistant film" and the "hard film 110" can include one or more films, layers, structures and combinations thereof. Further, the hard film 110 can, in some aspects, include additional functional films including but not limited to fingerprint resistant coatings, smudge-resistant coatings, easy-to-clean coatings, coatings with low surface energies, and fluorosilane-based coatings. It should also be understood that for a "film" that includes more than one film, layer, structure, etc., the refractive index associated with the "film" is the aggregate or composite refractive index of the films, layers, structures, etc. that make up the "film."

Figure 1C:
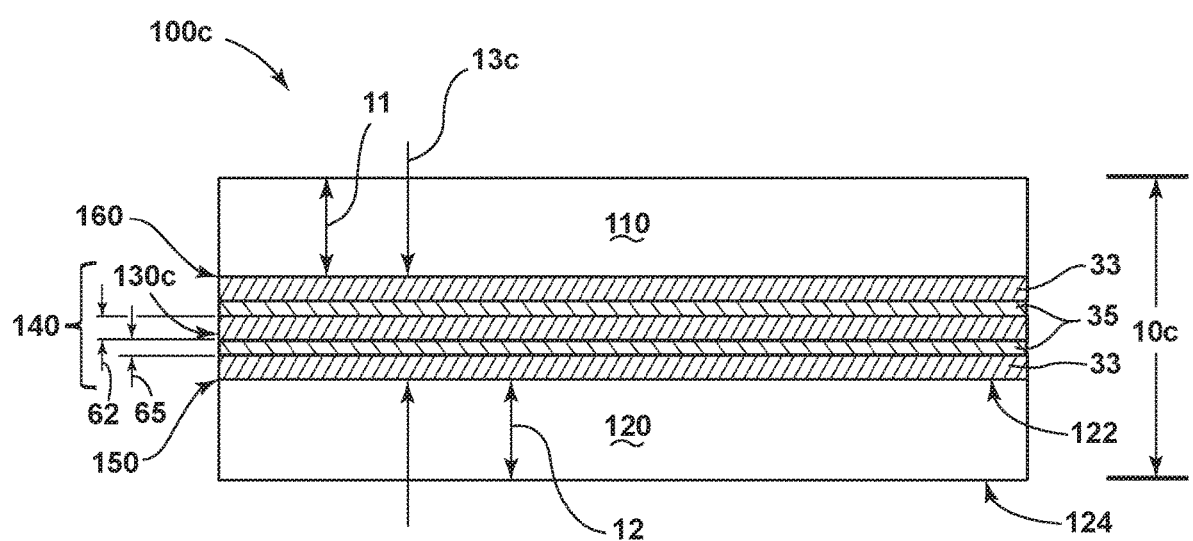
FIG. 1C is an illustration of an article comprising a glass-based substrate, a hard film and a crack mitigating composite comprising three inorganic layers and two polymeric layers, according to one or more embodiments.

Referring now to FIG. 1C, aspects of this disclosure include a laminate article 100c having a total stack thickness 10c. The article 100c also includes a hard film 110, a glass-based substrate 120, and a crack mitigating composite 130c having a total thickness 13c and comprising an inorganic element 33 and a polymeric element 35. The laminate article 100c is similar to the laminate article 100b; consequently, like-numbered elements have the same or similar structure and function(s) (e.g., the hard film 110). Further, as shown in FIG. 1C, the crack mitigating composite 130c of the laminate article 100c is depicted in an exemplary, preferred form. In particular, the crack mitigating composite 130c includes an inorganic element 33 in the form of three layers, preferably comprising $Al_2O_3$, and a polymeric element 35 in the form of two layers, preferably comprising a polyimide. As also shown in FIG. 1C, one of the layers of the inorganic element 33 is in contact with the glass-based substrate 120 and one of the other layers of the inorganic element 33 is in contact with the hard film 110. As also shown in FIG. 1C, each of the layers of the inorganic element 33 has a thickness 62, preferably from about 1 nm to about 200 nm, and each of the layers of the polymeric element 35 has a thickness 65, preferably about 1 nm to about 500 nm.

Referring again to FIGS. 1A-1C, aspects of this disclosure include a laminate article 100a, 100b, 100c including a glass-based substrate 120 and a crack mitigating composite 130a, 130b, 130c. Within the article 100a, 100b, 100c, the interfacial properties at an effective interface 140 between the crack mitigating composite 130a, 130b, 130c and the substrate 120 are modified such that the article 100a, 100b, 100c substantially retains its average flexural strength. In further embodiments, the interfacial properties at an effective interface 140 between the crack mitigating composite 130a, 130b, 130c and the substrate 120 are modified such that the article 100a, 100b, 100c substantially retains 50% or more, 60% or more, 70% or more, 80% or more, 90% or more, or 95% or more of its average flexural strength. In additional implementations, the interfacial properties at the effective interface 140 are modified such that the article 100a, 100b, 100c substantially retains its scratch resistance, particularly the scratch resistance associated with the hard film 110.

In one or more embodiments, the laminate article 100a, 100b, 100c exhibits functional properties that are also retained after such interface modifications, e.g., scratch resistance. Functional properties of the hard film 110 and/or articles 100a, 100b, 100c may include optical properties, electrical properties and/or mechanical properties, for example hardness, elastic modulus, strain-to-failure, abrasion resistance, scratch resistance, mechanical durability, coefficient of friction, electrical conductivity, electrical resistivity, electron mobility, electron or hole carrier doping, optical refractive index, density, opacity, transparency, reflectivity, absorptivity, transmissivity and the like.

In one or more embodiments, the refractive index may be measured using an Model 1512-RT analyzer, supplied by n&k Technology, Inc., located in San Jose, Calif., or by spectroscopic ellipsometry, as is known in the art. Elastic modulus may be measured by nanoindentation, using methods known in the art according to those skilled in the field of the disclosure. In certain implementations, the optical properties of the articles 100a, 100b, 100c are retained, independent of the properties and/or processing of the crack mitigating composite 130a, 130b, 130c. In certain aspects, the optical transmittance of the glass-based substrate 120 and the crack mitigating composite 130a, 130b, 130c can vary by 1% or less from the optical transmittance of the substrate 120 (e.g., from wavelengths of 400 nm to 800 nm). In other aspects, the optical transmittance of the laminated article 100a, 100b, 100c can be characterized by a light transmissivity of greater than or equal to 50% in the visible spectrum from about 400 nm to about 800 nm, or from about 450 to about 650 nm. In other aspects, the optical transmittance of the laminated article 100a, 100b, 100c can be characterized by a light transmissivity of greater than or equal to 20%, 50% or 80% in the visible spectrum. These functional properties of the articles 100a, 100b, 100c can be retained after combination with the crack mitigating composite 130a, 130b, 130c, and before any separation of the crack mitigating composite 130a, 130b, 130c from the glass-based substrate 120 as described herein.

The advantageous properties of the articles 100a-100c can also be characterized the Cube Corner Indentation Test. In particular, the Cube Corner Indentation Test uses a diamond indenter tip shaped as the corner of a cube, which is pushed down into the surface of the film, structure or other feature to be measured. With regard to the articles 100a-c of the disclosure, it is beneficial to quantify delamination and cracking thresholds which are related to scratch performance of the articles in real world applications. These properties can be quantified by the severity and/or area of the damaged surface after loading and unloading by the cube corner indenter during the Cube Corner Indentation Test. These scratch resistance-related properties can also be quantified by monitoring the load vs. displacement curve during the loading phase in the Cube Corner Indentation Test for discontinuous jumps, which are an indication of the starting point of crack at certain loading conditions. Both of these approaches can be used to quantify a threshold for cracking or delamination events. For example in embodiments of the articles 100a-c, a cracked, delaminated and/or chipped area (i.e., as associated with the hard film and/or the crack mitigating composite) after the Cube Corner Indentation can be less than 15 microns in length from the center of the indent at a 250 mN load level and less than 30 microns in length from the center of the indent at a 400 mN load level. Additionally, discontinuities in the load vs. displacement curve that results from the Cube Corner Indentation Test can occur during loading at loads greater than 200 mN (with no significant discontinuities observed at loads less than 200 mN) during loading with the indenter in the Cube Corner Indentation Test.

In one or more embodiments, the laminate article 100a, 100b, 100c comprising a crack mitigating composite 130a, 130b, 130c and a hard film 110 can exhibit a substantial retained scratch resistance, as judged relative to the scratch-resistance of the same film 110 disposed directly on a glass-based substrate 120 without a comparable crack mitigating composite. For example, the laminate article 100a, 100b, 100c can exhibit no evidence of delamination when subjected to a Berkovich Ramped Test from scratch loads ranging from 0 mN up to 150 mN as a stylus is moved from left to right (or vice versa) over each sample. In particular, in the Berkovich Ramped Scratch Test, a Berkovich diamond indenter is scratched (leading with the corner of the indenter tip) across the surface of the laminate article 100a, 100b, 100c with an increasing load from 0 mN to 150 mN, ramped in a linear fashion over a length of 1500 microns and at a velocity of 15 microns/second (1.5 mN/sec). The onset of delamination (e.g., between a hard film and an underlying crack mitigating composite and/or glass-based substrate) is determined using an optical microscope and correlating the location on the scratch where delamination starts to the indenter load level at the onset of delamination.

As another example, the laminate article 100a, 100b, 100c comprising a crack mitigating composite 130a, 130b, 130c and a hard film 110 can exhibit a substantial retained scratch resistance as determined through pencil hardness measurements, as judged relative to the scratch-resistance of the same film 110 disposed directly on a glass-based substrate 120 without a comparable crack mitigating composite. In particular, pencil hardness testing on laminate articles 100a-c can be conducted according to the ASTM D3363 test method. The pencil is placed in an angled holder and scratched across the surface of the laminate article 100a-c on the side of the hard film 110 with enough force to crush the graphite of the pencil. Accordingly, the maximum pencil hardness value in the ASTM D3363 test is associated with the hardest common pencil, a 9H pencil. In some implementations, the laminate article 100a-c is further characterized by a pencil hardness of 9H or greater.

In one or more embodiments of laminate articles 100a, 100b, 100c, the modification to the effective interface 140 between the hard film 110 and the glass-based substrate 120 includes preventing one or more cracks from bridging from one of the film 110 or the glass-based substrate 120 into the other of the film 110 or the glass-based substrate 120, while preserving other functional properties of the film 110 and/or the article. In one or more specific embodiments, as illustrated in FIGS. 1A, 1B and 1C, the modification of the interfacial properties includes disposing a crack mitigating composite 130a, 130b, 130c between the glass-based substrate 120 and the hard film 110. In one or more embodiments, the crack mitigating composite 130a, 130b, 130c is disposed on the glass-based substrate 120 and forms a first interface 150, and the film 110 is disposed on the crack mitigating composite 130a, 130b, 130c forming a second interface 160. The effective interface 140 includes the first interface 150, the second interface 160 and/or the crack mitigating composite 130a, 130b, 130c.

With regard to the laminate articles 100a-c depicted in FIGS. 1A-1C, the term "hard film," as applied to the hard film 110 and/or other films incorporated into the article 100a, 100b, 100c, includes one or more layers that are formed by any known method in the art, including discrete deposition or continuous deposition processes. Such layers of the hard film may be in direct contact with one another. The layers may be formed from the same material or more than one different material. In one or more alternative embodiments, such layers may have intervening layers of different materials disposed therebetween. In one or more embodiments a hard film 110 may include one or more contiguous and uninterrupted layers and/or one or more discontinuous and interrupted layers (i.e., a layer having different materials formed adjacent to one another).

As used herein (e.g., in relation to laminate articles 100a, 100b, 100c), the term "dispose" includes coating, depositing and/or forming a material onto a surface using any known method in the art. The disposed material may constitute a layer or film as defined herein. The phrase "disposed on" includes the instance of forming a material onto a surface such that the material is in direct contact with the surface and also includes the instance where the material is formed on a surface, where one or more intervening material(s) is between the disposed material and the surface. The intervening material(s) may constitute a layer or film, as defined herein.

As used herein, the term "average flexural strength" is intended to refer to the flexural strength of a glass-containing material (e.g., an article and/or a glass-based substrate), as tested through methods of ring-on-ring (also referred herein as "ROR") testing. The term "average" when used in connection with average flexural strength or any other property is based on the mathematical average of measurements of such a property on 5 samples or more. Average flexural strength may refer to the scale parameter of two parameter Weibull statistics of failure load under ring-on-ring testing. This scale parameter is also called the Weibull characteristic strength, at which a material's failure probability is 63.2%. More broadly, average flexural strength may also be defined by other tests, for example, a ball drop test, where the glass surface flexural strength is characterized by a ball drop height that can be tolerated without failure. Glass surface strength may also be tested in a device configuration, where an appliance or device containing the glass-containing material (e.g., an article and/or a glass-based substrate) article is dropped in different orientations that may create a surface flexural stress. Average flexural strength may in some cases also incorporate the strength as tested by other methods known in the art, for example 3-point bend or 4-point bend testing. In some cases, these test methods may be significantly influenced by the edge strength of the article.

As used herein, the terms "bridge" and "bridging" are interchangeable, and refer to crack, flaw or defect formation and such crack, flaw or defect's growth in size and/or propagation from one material, layer or film into another material, layer or film. For example, bridging includes the instance where a crack that is present in the hard film 110 propagates into another material, layer or film (e.g., the glass-based substrate 120). The terms "bridge" or "bridging" also include the instance where a crack crosses an interface between different materials, different layers and/or different films. The materials, layers and/or films need not be in direct contact with one another for a crack to bridge between such materials, layers and/or films. For example, the crack may bridge from a first material into a second material, not in direct contact with the first material, by bridging through an intermediate material disposed between the first and second material. The same scenario may apply to layers and films and combinations of materials, layers and films. In the laminate articles 100a, 100b, 100c, as described herein (see FIGS. 1A-1C), a crack may originate in one of the hard film 110 or the glass-based substrate 120 and bridge into the other of the hard film 110 or the glass-based substrate 120 across the effective interface 140 (and specifically across the first interface 150 and the second interface 160).

As will be described herein in connection with the laminate articles 100a, 100b, 100c, the crack mitigating composite 130a, 130b, 130c may deflect cracks from bridging between the hard film 110 and the glass-based substrate 120, regardless of where the crack originates (i.e., the film 110 or the glass-based substrate 120). Likewise, the crack mitigating composite 130a, 130b, 130c of the laminate articles 100a, 100b, 100c may deflect cracks from bridging between the crack mitigating composite 130a, 130b, 130c and the glass-based substrate 120. Crack deflection may include at least partial delamination of the crack mitigating composite 130a, 130b, 130c from the film 110 and/or glass-based substrate 120, as described herein, upon bridging of the crack from one material (e.g., the film 110, glass-based substrate 120 or crack mitigating composite 130a, 130b, 130c) to another material (e.g., the film 110, glass-based substrate 120 or crack mitigating composite 130a, 130b, 130c). Crack deflection may also include causing a crack to propagate through the crack mitigating composite 130a-c instead of propagating into the film 110 and/or the glass-based substrate 120. In such instances, the crack mitigating composite 130a-c may form a low toughness interface at the effective interface 140 that facilitates crack propagation through the crack mitigating composite instead of into the glass-based substrate or film. This type of mechanism may be described as deflecting the crack along the effective interface 140.

Figure 2:
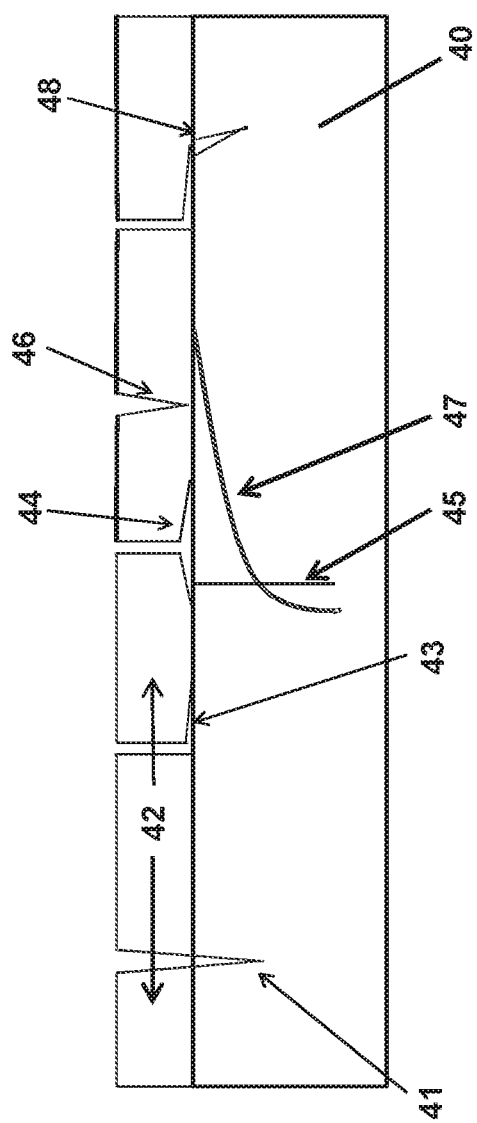
FIG. 2 is a schematic diagram of the development of a crack in a film or layer and its possible bridging modes.

The following theoretical fracture mechanics analysis illustrates selected ways in which cracks may bridge or may be mitigated within a laminated article, e.g., laminate articles 100a, 100b, 100c (see FIGS. 1A-1C). FIG. 2 is a schematic illustrating the presence of a crack in a film disposed on a glass-based substrate and its possible bridging or mitigation modes. The numbered elements in FIG. 2 are the glass-based substrate 40 (e.g., comparable to the glass-based substrate 120 in FIGS. 1A-1C), the film 42 (e.g., comparable to the hard film 110) on top of a surface (unnumbered) of glass-based substrate 40, a two-sided deflection 44 into the interface between glass-based substrate 40 and film 42, an arrest 46 (which is a crack that started to develop in film 42 but did not go completely through film 42), a "kinking" 48 (which is a crack that developed in the surface of film 42, but when it reached the surface of the glass-based substrate 40 it did not directly penetrate into the glass-based substrate 40, but instead moves in a lateral direction as indicated in FIG. 2 and then penetrates the surface of the glass-based substrate 40 at another position), a penetration crack 41 that developed in the film 42 and penetrated into the glass-based substrate 40, and a one-sided deflection 43. FIG. 2 also shows a graph of tension vs. compression (i.e., element 47) in the glass-based substrate 40 compared to a zero axis (i.e., element 45) as may be induced by the glass-based substrate 40 by chemical and/or thermal tempering, wherein surfaces of the glass-based substrate are in compression (including compressive stress), and a central portion is in tension (including tensile stress). Hence, the portion of element 47 to the right of the zero axis (i.e., element 45) is indicative of compressive stress and the portion of element 47 to the left of the zero axis is indicative of tensile stress. As illustrated, upon application of external loading (in such cases, tensile loading is the most detrimental situation), the flaws in the film can be preferentially activated to form cracks (e.g., crack deflection 44) prior to the development of cracks in the residually compressed or strengthened glass-based substrate 40. In the scenarios illustrated in FIG. 2, with continued increase of external loading, the cracks will bridge until they encounter the glass-based substrate. When the cracks, upon origination in the film 42, reach the surface of glass-based substrate 40, the possible bridging modes of the crack are: (a) penetration into the glass-based substrate without changing its path as represented by numeral 41; (b) deflection into one side along the interface between the film and the glass-based substrate as indicated by numeral 43; (c) deflection into two sides along the interface as indicated by numeral 44; (d) first deflection along the interface and then kinking into the glass-based substrate as indicated by numeral 48; or (e) crack arrest as indicated by numeral 46 due to microscopic deformation mechanisms, for example, plasticity, nano-scale blunting, or nano-scale deflection at the crack tip. Cracks may originate in the film and may bridge into the glass-based substrate. The above-described bridging modes are also applicable where cracks originate in the glass-based substrate and bridge into the film, for example where pre-existing cracks or flaws in the glass-based substrate may induce or nucleate cracks or flaws in the film, thus leading to crack growth or propagation from the glass-based substrate into the film, resulting in crack bridging.

Crack penetration into the glass-based substrate 120 and/or hard film 110 reduces the average flexural strength of the laminated articles 100a, 100b, 100c (see FIGS. 1A-1C) and the glass-based substrate 120 as compared to the average flexural strength of the glass-based substrate 120 alone (i.e., without a hard film 110 and/or a crack mitigating composite 130a-c), while crack deflection, crack blunting or crack arrest (collectively referred to herein as crack mitigation) helps retain the average flexural strength of the articles. "Crack blunting" and "crack arrest" can be distinguished from one another. "Crack blunting" may comprise an increasing crack tip radius, for example, through plastic deformation or yielding mechanisms. "Crack arrest," on the other hand, could comprise a number of different mechanisms, for example, encountering a highly compressive stress at the crack tip; a reduction of the stress intensity factor at the crack tip resulting from the presence of a low-elastic modulus interlayer or a low-elastic modulus-to-high-elastic modulus interface transition; nano-scale crack deflection or crack tortuosity as in some polycrystalline or composite materials; and strain hardening at the crack tip, and the like. The various modes of crack deflection will be described herein.

Without being bound by theory, certain possible crack bridging paths can be analyzed in the context of linear elastic fracture mechanics. In the following paragraphs, one crack path is used as an example and the fracture mechanics concept is applied to the crack path to analyze the problem and illustrate the desired material parameters to help retain the average flexural strength performance of the article for a particular range of material properties.

Figure 3:
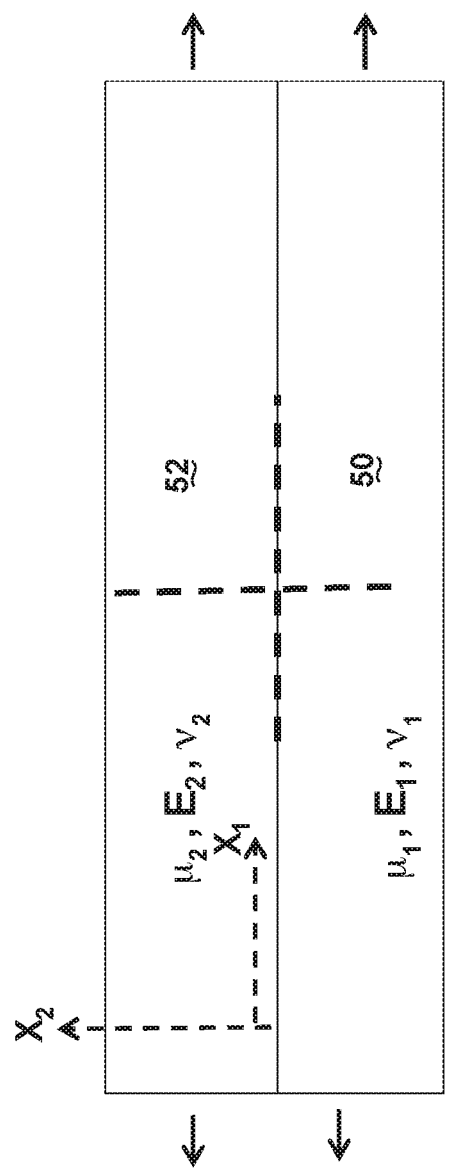
FIG. 3 is an illustration of a theoretical model for the presence of a crack in a film or layer and its possible bridging paths.

FIG. 3 shows the illustration of the theoretical model framework. This is a simplified schematic view of the interface region between the film 52 (e.g., film 52 is comparable to the hard film 110 in laminate articles 100a-100c) and glass-based substrate 50 (e.g., the substrate 40 is comparable to the glass-based substrate 120 in the laminate articles 100a-100c). The terms $\mu_1$, $E_1$, $v_1$, and $\mu_2$, $E_2$, $v_2$ are respective shear modulus in units of Pa, Young's modulus (elastic modulus) in units of Pa, Poisson's ratio (unit less) of the glass-based substrate and film materials, $\Gamma_c^{Glass}$ and $\Gamma_c^{IT}$ are critical energy release rate of glass-based substrate and the interface between substrate and film, respectively in units of J/m².

The common parameters to characterize the elastic mismatch between the film and the substrate are Dundurs' parameters $\alpha$ and $\beta$, as defined below $$\alpha = \frac{\bar{E}_1 - \bar{E}_2}{\bar{E}_1 + \bar{E}_2} \quad (1)$$

where $\bar{E}=E/(1-v^2)$ for plain strain and $$\beta = \frac{1}{2} \frac{\mu_1(1-2v_2) - \mu_2(1-2v_1)}{\mu_1(1-v_2) + \mu_2(1-v_1)} \quad (2)$$

It is worth pointing out that the critical energy release rate is closely related with the fracture toughness of the material through the relationship defined as $$\Gamma = \frac{1-v^2}{E} K_C^2 \quad (3)$$

Under the assumption that there is a pre-existing flaw in the film, upon tensile loading the crack will extend vertically down as illustrated in FIG. 3. Right at the interface, the crack tends to deflect along the interface if $$\frac{G_d}{G_p} \geq \frac{\Gamma_c^{IT}}{\Gamma_c^{Glass}} \quad (4)$$

and the crack will penetrate into the glass-based substrate if $$\frac{G_{dc}}{G_{pc}} < \frac{\Gamma^{IT}}{\Gamma^{Glass}} \quad (5)$$

where $G_d$ and $G_p$ and are the energy release rates of a deflected crack along the interface and a penetrated crack into the glass-based substrate, respectively. On the left hand side of Equations (4) and (5), the ratio $G_d/G_p$ is a strong function of elastic mismatch parameter $\alpha$ and weakly dependent on $\beta$; and on the right hand side, the toughness ratio $\Gamma_c^{IT}/\Gamma_c^{Glass}$ is a material parameter.

Figure 4:
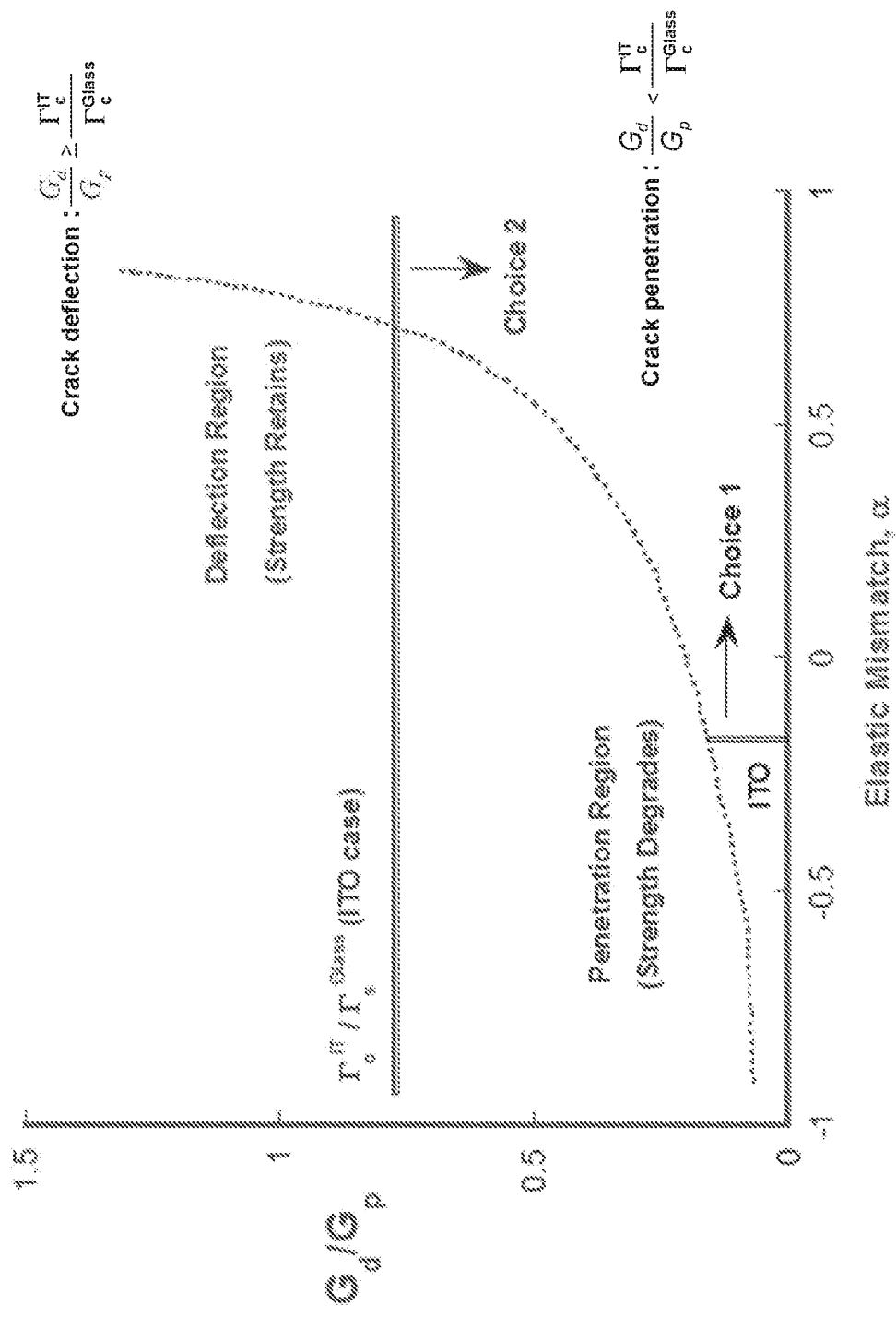
FIG. 4 is a diagram illustrating the energy release ratio $G_d/G_p$.

FIG. 4 graphically illustrates the trend of $G_d/G_p$ as a function of elastic mismatch $\alpha$, reproduced from a reference for doubly-deflected cracks. (See Ming-Yuan, H. and J. W. Hutchinson, "Crack deflection at an interface between dissimilar elastic materials," *International Journal of Solids and Structures*, 1989, 25(9): pp. 1053-1067.)

It is evident that the ratio $G_d/G_p$ is strongly dependent on $\alpha$. Negative $\alpha$ means the film is stiffer than the glass-based substrate and positive $\alpha$ means the film is softer than the glass-based substrate. The toughness ratio $\Gamma_c^{IT}/\Gamma_c^{Glass}$, which is independent of $\alpha$, is a horizontal line in FIG. 4. If the criterion in Equation (4) is satisfied, in FIG. 4, at the region above the horizontal line, the crack tends to deflect along the interface which may be beneficial for the retention of the average flexural strength of a substrate. On the other hand, if the criterion in Equation (5) is satisfied, in FIG. 4, at the region below the horizontal line, the crack tends to penetrate into glass-based substrate which leads to degradation of the average flexural strength of the article, particularly those articles utilizing strengthened or strong glass-based substrates as described elsewhere herein.

With regard to the above concept, an indium-tin-oxide (ITO) film (e.g., as a hard film 110 comprising ITO) is utilized as an illustrative example according to the following analysis. For glass-based substrate, $E_1$=72 GPa, $v_1$=0.22, and $K_{1c}$=0.7 MPa·m$^{1/2}$; for ITO, $E_2$=99.8 GPa, and $v_2$=0.25. (Zeng, K., et al., "Investigation of mechanical properties of transparent conducting oxide thin films." *Thin Solid Films*, 2003, 443(1-2): pp. 60-65.) The interfacial toughness between the ITO film and glass-based substrate can be approximately $\Gamma_{in}$=5 J/m$^2$, depending on deposition conditions. (Cotterell, B. and Z. Chen, "Buckling and cracking of thin films on compliant substrates under compression," *International Journal of Fracture*, 2000, 104(2): pp. 169-179.) This will give the elastic mismatch $\alpha$=−0.17 and $\Gamma_c^{IT}/\Gamma_c^{Glass}$=0.77. These values are plotted in FIG. 4. This fracture analysis predicts that the crack penetration into the glass-based substrate for the ITO film will be favored, which leads to degradation of the average flexural strength of the glass-based substrate, particularly a glass-based substrate that is strengthened or strong. This is believed to be one of the potential underlying mechanisms observed with various hard films, including those films comprising indium-tin-oxide or other transparent conductive oxides, silicon nitride, and other hard films disposed on glass-based substrates, including strengthened or strong glass-based substrates. As shown in FIG. 4, one way to mitigate the degradation of the average flexural strength can be to select appropriate materials to change the elastic mismatch a (i.e., "Choice 1," which involves shifting the elastic mismatch value a to the right) or to adjust the interfacial toughness (i.e., "Choice 2," which involves shifting the value of Gd/Gp downward).

The theoretical analysis outlined above suggests that a crack mitigating composite 130*a*, 130*b*, 130*c* can be used to better retain the strength of laminate articles 100*a*, 100*b*, 100*c*, respectively. Specifically, the insertion of a crack mitigating composite 130*a*, 130*b*, 130*c* between a glass-based substrate 120 and a hard film 110 makes crack mitigation, as defined herein, a more preferred path and thus the article is better able to retain its strength. In some embodiments, the crack mitigating composite 130*a*, 130*b*, 130*c* facilitates crack deflection, as will be described in greater detail herein.

Glass-Based Substrate

Referring to FIGS. 1A-1C, the laminate articles 100*a*, 100*b*, 100*c* include a glass-based substrate 120, which may be strengthened or strong, as described herein, having opposing major surfaces 122, 124. Laminate article 100*a*, 100*b*, 100*c* also includes a hard film 110 disposed over at least one opposing major surface (122 or 124) of the substrate. In addition, laminate articles 100*a*, 100*b*, 100*c* include a crack mitigating composite 130*a*, 130*b*, 130*c*. With regard to articles 100*a*, 100*b*, 100*c*, the crack mitigating composite 130*a*, 130*b*, 130*c* is disposed between the hard film 110 and the glass-based substrate 120. In one or more alternative embodiments, the crack mitigating composite 130*a*, 130*b*, 130*c* and/or the hard film 110 may be disposed on the minor surface(s) of the glass-based substrate 120 (e.g., an edge of the substrate that is perpendicular to the opposing major surfaces 122, 124) in addition to or instead of being disposed on at least one major surface (e.g., surfaces 122 or 124) or may be disposed on both major surfaces.

As used herein, the glass-based substrate 120 may be substantially planar sheets, although other embodiments may utilize a curved or otherwise shaped or sculpted glass-based substrate. The glass-based substrate 120 may be substantially clear, transparent and free from light scattering. The glass-based substrate may have a refractive index in the range from about 1.45 to about 1.55. In one or more embodiments, the glass-based substrate 120 may be strengthened or characterized as strong, as will be described in greater detail herein. The glass-based substrate 120 may be relatively pristine and flaw-free (for example, having a low number of surface flaws or an average surface flaw size less than about 1 micron) before such strengthening. Where strengthened or strong glass-based substrates 120 are utilized, such substrates may be characterized as having a high average flexural strength (when compared to glass-based substrates that are not strengthened or strong) or high surface strain-to-failure (when compared to glass-based substrates that are not strengthened or strong) on one or more major opposing surfaces of such substrates.

Additionally or alternatively, the thickness 12 of the glass-based substrate 120 may vary along one or more of its dimensions for aesthetic and/or functional reasons. For example, the edges of the glass-based substrate 120 may be thicker as compared to more central regions of the glass-based substrate 120. The length, width and thickness dimensions of the glass-based substrate 120 may also vary according to the application or use of the article 100*a*, 100*b*, 100*c*.

The glass-based substrate 120, according to one or more embodiments, includes an average flexural strength that may be measured before and after the glass-based substrate 120 is combined with the hard film 110, crack mitigating composite 130*a*, 130*b*, 130*c* and/or other films or layers. In one or more embodiments described herein, the laminate articles 100*a*, 100*b*, 100*c* retain their average flexural strength after the combination of the glass-based substrate 120 with the hard film 110, crack mitigating composite 130*a*, 130*b*, 130*c* and/or other films, layers or materials, when compared to the average flexural strength of the glass-based substrate 120 before such a combination. In other words, the average flexural strength of the articles 100*a*, 100*b*, 100*c* is substantially the same before and after the hard film 110, crack mitigating composite 130*a*, 130*b*, 130*c* and/or other films or layers are disposed on the glass-based substrate 120. In one or more embodiments, the articles 100*a*, 100*b*, 100*c* have an average flexural strength that is significantly greater than the average flexural strength of similar articles that do not include the crack mitigating composite 130*a*, 130*b*, 130*c* (e.g., a higher strength value than an article that comprises hard film 110 and glass-based substrate 120 in direct contact, without an intervening crack mitigating composite 130*a*, 130*b*, 130*c*). In other embodiments, the articles 100*a*, 100*b*, 100*c* have an average flexural strength that is 50% or more of the average flexural strength of similar articles comprising the glass-based substrates alone (i.e., with no other coatings or films).

In accordance with one or more embodiments, the glass-based substrate 120 has an average strain-to-failure that may be measured before and after the glass-based substrate 120 is combined with the hard film 110, crack mitigating composite 130*a*, 130*b*, 130*c* and/or other films or layers. The term "average strain-to-failure" refers to the strain at which cracks propagate without application of additional load, typically leading to catastrophic failure in a given material, layer or film and, perhaps even bridge to another material, layer, or film, as described herein. Average strain-to-failure may be measured using, for example, ball-on-ring testing.

Without being bound by theory, the average strain-to-failure may be directly correlated to the average flexural strength using appropriate mathematical conversions. In specific embodiments, the glass-based substrate 120, which may be strengthened or strong as described herein, has an average strain-to-failure that is 0.5% or greater, 0.6% or greater, 0.7% or greater, 0.8% or greater, 0.9% or greater, 1% or greater, 1.1% or greater, 1.2% or greater, 1.3% or greater, 1.4% or greater, 1.5% or greater or even 2% or greater, and all ranges and sub-ranges between the foregoing values. Unless specified otherwise, the average strain-to-failure numbers supported herein were determined by Ring-on-ring testing. In specific embodiments, the glass-based substrate 120 has an average strain-to-failure of 1.2%, 1.4%, 1.6%, 1.8%, 2.2%, 2.4%, 2.6%, 2.8% or 3% or greater, and all ranges and sub-ranges between the foregoing values. The average strain-to-failure of the film 110 may be less than the average strain-to-failure of the glass-based substrate 120 and/or the average strain-to-failure of the crack mitigating composite 130a-c. Without being bound by theory, it is believed that the average strain-to-failure of a glass-based substrate 120 or any other material is dependent on the surface quality of such material. With respect to glass-based substrates, e.g., substrates 120, the average strain-to-failure of a specific glass-based substrate is dependent on the conditions of ion exchange or strengthening process utilized in addition to or instead of the surface quality of the glass-based substrate. In some embodiments, the glass-based substrate may have an elastic modulus from about 55 GPa to about 100 GPa, and all ranges and sub-ranges between the foregoing values. In other embodiments, the glass-based substrate may have an elastic modulus from about 55 GPa to about 80 GPa. Further, other implementations employ glass-based substrates with an elastic modulus from 60 GPa to 90 GPa. The elastic modulus values of the glass-based substrates recited in this disclosure were measured using Resonant Ultrasound Spectroscopy.

In one or more embodiments, the glass-based substrate 120 retains its average strain-to-failure after combination with the hard film 110, crack mitigating composite 130a, 130b, 130c and/or other films or layers. In other words, the average strain-to-failure of the glass-based substrate 120 is substantially the same before and after the hard film 110, crack mitigating composite 130a-c and/or other films or layers are disposed on the glass-based substrate 120. In one or more embodiments, the articles 100a, 100b, 100c have an average strain-to-failure that is significantly greater than the average strain-to-failure of similar articles that do not include the crack mitigating composite 130a-c (e.g., a higher strain-to-failure than an article that comprises hard film 110 and glass-based substrate 120 in direct contact, without an intervening crack mitigating composite). For example, the articles 100a, 100b, 100c may exhibit average strain-to-failures that are 10% or more higher, 25% higher, 50% higher, 100% higher, 200% higher or 300% higher, and all ranges and sub-ranges between the foregoing values, than the average strain-to-failure of similar articles that do not include the crack mitigating composite 130a, 130b, 130c. Similarly, the laminate articles 100a, 100b, 100c can be characterized by an average strain to failure of greater than about 0.5%, greater than about 0.8%, greater than about 1%, greater than about 1.2%, greater than about 1.4%, and all average strain to failure lower threshold values between these levels.

The glass-based substrate 120 may be provided using a variety of different processes. For example, glass-based substrate forming methods include float glass processes, press rolling processes, tube forming processes, updraw processes, and down-draw processes, for example, fusion draw and slot draw. In the float glass process, a glass-based substrate that may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further and annealed to reduce internal stress.

Down-draw processes produce glass-based substrates having a uniform thickness that may possess relatively pristine surfaces. Because the average flexural strength of the glass-based substrate is controlled by the frequency, amount and/or size of surface flaws, a pristine surface that has had minimal contact has a higher initial strength. When this high strength glass-based substrate is then further strengthened (e.g., chemically or thermally), the resultant strength can be higher than that of a glass-based substrate with a surface that has been lapped and polished. Down-drawn glass-based substrates may be drawn to a thickness of less than about 2 mm. In addition, down drawn glass-based substrates may have a very flat, smooth surface that can be used in its final application form, without the need for costly grinding and polishing processes.

The fusion draw process, for example, uses a drawing tank that has a channel for accepting molten raw material. The channel has weirs that are open at the top along the length of the channel on both sides of the channel. When the channel fills with molten material, the molten material overflows the weirs. Due to gravity, the molten material flows down the outside surfaces of the drawing tank as two flowing films. These outside surfaces of the drawing tank extend down and inwardly so that they join at an edge below the drawing tank. The two flowing films join at this edge to fuse and form a single flowing substrate. The fusion draw method offers the advantage that, because the two films flowing over the channel fuse together, neither of the outside surfaces of the resulting substrate comes in contact with any part of the apparatus. Thus, the surface properties of the fusion drawn substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten material flows through the slot/nozzle and is drawn downward as a continuous substrate and into an annealing region.

Once formed, glass-based substrates 120 may be strengthened to form strengthened glass-based substrates for use in the laminate articles 100a-c. As used herein, the term "strengthened glass-based substrate" may refer to a glass-based substrate that has been chemically strengthened, for example, through ion-exchange of larger ions for smaller ions in the surface of the glass-based substrate. However, other strengthening methods known in the art, for example, thermal tempering, may be utilized to form strengthened glass-based substrates. As will be described, strengthened glass-based substrates may include a glass-based substrate having a surface compressive stress in its surface that aids in the strength preservation of the glass-based substrate. As also used herein, "strong" glass-based substrates are also within the scope of this disclosure and include glass-based substrates that may not have undergone a specific strengthening process, and may not have a surface compressive stress, but are nevertheless strong as understood by those with ordinary skill in the art. Such strong glass-based substrate articles may be defined as glass sheet articles or glass-based substrates having an average strain-to-failure greater than about 0.5%, 0.7%, 1%, 1.5%, or even greater than 2%, and all ranges and sub-ranges between the foregoing values. These strong glass-based substrates can be made, for example, by protecting the pristine glass surfaces after melting and forming the glass-based substrate. An example of such protection occurs in a fusion draw method, where the surfaces of the glass films do not come into contact with any part of the apparatus or other surface after forming. The glass-based substrates formed from a fusion draw method derive their strength from their pristine surface quality. A pristine surface quality can also be achieved through etching or polishing and subsequent protection of glass-based substrate surfaces, and other methods known in the art. In one or more embodiments, both strengthened glass-based substrates and the strong glass-based substrates may comprise glass sheet articles having an average strain-to-failure greater than about 0.5%, 0.7%, 1%, 1.5%, or even greater than 2%, and all ranges and sub-ranges between the foregoing values, for example, when measured using ring-on-ring or ball-on-ring flexural testing.

As mentioned above, the glass-based substrates described herein may be chemically strengthened by an ion exchange process to provide a strengthened glass-based substrate 120. The glass-based substrate may also be strengthened by other methods known in the art, for example, thermal tempering. In the ion-exchange process, typically by immersion of the glass-based substrate into a molten salt bath for a predetermined period of time, ions at or near the surface(s) of the glass-based substrate are exchanged for larger metal ions from the salt bath. In some embodiments, the temperature of the molten salt bath is about 350° C. to 450° C. and the predetermined time period is about two to about eight hours. The incorporation of the larger ions into the glass-based substrate strengthens the glass-based substrate by creating a compressive stress in a near surface region or in regions at and adjacent to the surface(s) of the glass-based substrate. A corresponding tensile stress is induced within a central region or regions at a distance from the surface(s) of the glass-based substrate to balance the compressive stress. Glass-based substrates utilizing this strengthening process may be described more specifically as chemically-strengthened glass-based substrates 120 or ion-exchanged glass-based substrates 120. Glass-based substrates 120 employed in the laminate articles 100a-100c that are not strengthened may be referred to herein as non-strengthened glass-based substrates.

In one example, sodium ions in a strengthened glass-based substrate 120 are replaced by potassium ions from the molten salt bath, for example, a potassium nitrate salt bath, though other alkali metal ions having larger atomic radii, for example, rubidium or cesium, can replace smaller alkali metal ions in the glass. According to particular embodiments, smaller alkali metal ions in the glass can be replaced by $Ag^+$ ions. Similarly, other alkali metal salts, for example, sulfates, phosphates, halides, and the like may be used in the ion exchange process.

The replacement of smaller ions by larger ions at a temperature below that at which the glass network can relax produces a distribution of ions across the surface(s) of the strengthened glass-based substrate 120 that results in a stress profile. The larger volume of the incoming ion produces a compressive stress (CS) on the surface and tension (central tension, or CT) in the center of the strengthened glass-based substrate 120. Depth of exchange may be described as the depth within the strengthened glass-based substrate 120 (i.e., the distance from a surface of the glass-based substrate to a central region of the glass-based substrate), at which ion exchange facilitated by the ion exchange process takes place.

Compressive stress (at the surface of the glass) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

As used herein, depth of compression (DOC) means the depth at which the stress in the strengthened alkali aluminosilicate glass-based substrate described herein changes from compressive to tensile. When induced chemically, the DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

In some embodiments, a strengthened glass-based substrate 120 employed in the laminate articles 100a-c can have a surface CS of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater, and all ranges and sub-ranges between the foregoing values. The strengthened glass-based substrate 120 may have a DOC 15 μm or greater, 20 μm or greater (e.g., 25 μm, 30 μm, 35 μm, 40 μm, 45 μm, 50 μm or greater) and/or a central tension of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less), and all ranges and sub-ranges between the foregoing values. In one or more specific embodiments, the strengthened glass-based substrate 120 has one or more of the following: a surface CS greater than 500 MPa, a depth of compressive layer greater than 15 μm, and a central tension greater than 18 MPa.

Without being bound by theory, it is believed that strengthened glass-based substrates 120 with a surface CS greater than 500 MPa and a DOC greater than about 15 μm typically have greater strain-to-failure than non-strengthened glass-based substrates (or, in other words, glass-based substrates that have not been ion exchanged or otherwise strengthened). In some aspects, the benefits of one or more embodiments described herein may not be as prominent with non-strengthened or weakly strengthened types of glass-based substrates that do not meet these levels of surface CS or DOC, because of the presence of handling or common glass surface damage events in many typical applications. However, as mentioned previously, in other specific applications where the glass-based substrate surfaces can be adequately protected from scratches or surface damage (for example, by a protective coating or other layers), strong glass-based substrates with a relatively high strain-to-failure can also be created through forming and protection of a pristine glass surface quality, for example, by using the fusion forming method. In these alternate applications, the benefits of one or more embodiments described herein can be similarly realized.

Example ion-exchangeable glasses that may be used in the strengthened glass-based substrate 120 employed in the laminate articles 100a-100c may include alkali aluminosilicate glass compositions or alkali aluminoborosilicate glass compositions, though other glass compositions are contemplated. As used herein, "ion exchangeable" means that a glass-based substrate is capable of exchanging cations located at or near the surface of the glass-based substrate with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In some embodiments, the glass-based substrate 120 includes a glass composition with 6 wt. % or more aluminum oxide. In some embodiments, a glass-based substrate 120 includes a glass composition with one or more alkaline earth oxides, such that a content of alkaline earth oxides is 5 wt. % or more. Suitable glass compositions, in some embodiments, further comprise at least one of $K_2O$, MgO, and CaO. In some embodiments, the glass compositions used in the glass-based substrate 120 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the glass-based substrate 120, which may optionally be strengthened or strong, comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $(Li_2O+Na_2O+K_2O) \leq 20$ mol. % and 0 mol. % $\leq (MgO+CaO) \leq 10$ mol. %.

A still further example glass composition suitable for the glass-based substrate 120, which may optionally be strengthened or strong, comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $(Li_2O+Na_2O+K_2O) \leq 18$ mol. % and 2 mol. % $\leq (MgO+CaO) \leq 7$ mol. %.

In some embodiments, an alkali aluminosilicate glass composition suitable for the glass-based substrate 120, which may optionally be strengthened or strong, comprises alumina, at least one alkali metal and, in some embodiments, greater than 50 mol. % $SiO_2$, in other embodiments 58 mol. % or more $SiO_2$, and in still other embodiments 60 mol. % or more $SiO_2$, all as further defined by the ratio given by Equation (6):

$$\frac{Al_2O_3 + B_2O_3}{\sum modifiers} > 1 \quad (6)$$

and the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; 0-4 mol. % $K_2O$, and as further defined by Equation (6) above.

In some embodiments, the glass-based substrate 120, which may optionally be strengthened or strong, may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO>10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

In some embodiments, the glass-based substrate 120, which may optionally be strengthened or strong, may comprise an alkali silicate glass composition comprising: 2 mol % or more of $Al_2O_3$ and/or $ZrO_2$, or 4 mol % or more of $Al_2O_3$ and/or $ZrO_2$.

In some embodiments, the glass-based substrate used in the glass-based substrate 120 of the laminate articles 100a-100c may be batched with 0-2 mol % of at least one fining agent selected from a group that includes $Na_2SO_4$, NaCl, NaF, NaBr, $K_2SO_4$, KCl, KF, KBr, and $SnO_2$.

The glass-based substrate 120 according to one or more embodiments can have a thickness 12 ranging from about 50 μm to 5 mm. Example thicknesses 12 for the glass-based substrate 120 can range from 100 μm to 500 μm, e.g., 100, 200, 300, 400 or 500 μm. Further example thicknesses 12 range from 500 μm to 1000 μm, e.g., 500, 600, 700, 800, 900 or 1000 μm. The glass-based substrate 120 may have a thickness 12 that is greater than 1 mm, e.g., about 2, 3, 4, or 5 mm. In one or more embodiments, the glass-based substrate 120 may have a thickness 12 of 2 mm or less, or less than 1 mm. The glass-based substrate 120 may be acid polished or otherwise treated to remove or reduce the effect of surface flaws.

Hard Film

The laminate articles 100a, 100b, 100c (see FIGS. 1A-1C) include a hard film 110 disposed on a surface of the glass-based substrate 120 and specifically on the crack mitigating composite 130a, 130b, 130c. The hard film 110 may be disposed on one or both major surfaces 122, 124 of the glass-based substrate 120. In one or more embodiments, the film 110 may be disposed on one or more minor surfaces (not shown) of the glass-based substrate 120 in addition to or instead of being disposed on one or both major surfaces 122, 124. In one or more embodiments, the hard film 110 is free of macroscopic scratches or defects that are easily visible to the eye. Further, as shown in FIGS. 1A-1C, the film 110 forms the effective interface 140 with the glass-based substrate 120.

In one or more embodiments, the hard film 110 may lower the average flexural strength of laminate articles 100a, 100b, 100c (e.g., as incorporating such films and a glass-based substrate 120), through the mechanisms described herein. In one or more embodiments, such mechanisms include instances in which the film 110 may lower the average flexural strength of the article because crack(s) that develop in the film 110 bridge into the glass-based substrate 120. In other embodiments, the mechanisms include instances in which the film may lower the average flexural strength of the article because cracks developing in the glass-based substrates bridge into the film. The film 110 of one or more embodiments may exhibit a strain-to-failure of 2% or less or a strain-to-failure that is less than the strain to failure of the glass-based substrates described herein. Further, the film 110 of one or more embodiments may exhibit an elastic modulus that is greater than or equal to the elastic modulus of the glass-based substrate 120. Films including one or more of these attributes may be characterized within the disclosure as "brittle."

In accordance with one or more embodiments of the laminate articles 100a-c, the hard film 110 may have a strain-to-failure (or crack onset strain level) that is lower than the strain-to-failure of the glass-based substrate 120. For example, the film 110 may have a strain-to-failure of about 2% or less, about 1.8% or less, about 1.6% or less, about 1.5% or less, about 1.4% or less, about 1.2% or less, about 1% or less, about 0.8% or less, about 0.6% or less, about 0.5% or less, about 0.4% or less or about 0.2% or less, and all ranges and sub-ranges between the foregoing values. In some embodiments, the strain-to-failure of the film 110 may be lower than the strain-to-failure of the strengthened glass-based substrates 120 that have a surface CS greater than 500 MPa and a DOC greater than about 15 μm. In one or more embodiments, the film 110 may have a strain-to-failure that is 0.1% (or more) lower or less, or in some cases, 0.5% (or more) lower or less, and all ranges and sub-ranges between the foregoing values, than the strain-to-failure of the glass-based substrate 120. In one or more embodiments, the film 110 may have a strain-to-failure that is about 0.15% (or more), for example 0.2%, 0.25%, 0.3%, 0.35%, 0.4%, 0.45%, 0.50%, 0.55%, 0.6%, 0.65%, 0.7%, 0.75%, 0.8%, 0.85%, 0.9%, 0.95% or 1%, lower or less, and all ranges and sub-ranges between the foregoing values, than the strain-to-failure of the glass-based substrate 120. These strain-to-failure values can be measured, for example, using ball-on-ring and ring-on-ring flexural test methods combined with optional microscopic or high-speed-camera analysis. Unless otherwise noted, the strain-to-failure attributes and measurements of the films (e.g., films 110) on substrates (e.g., substrates 120) in the disclosure were made by using a microscopic camera attached in situ to a ring-on-ring flexural test setup (the same as for measuring COS as described above) to measure displacement and other related data to calculate the strain-to-failure value according to equations understood by those with ordinary skill in the field of the disclosure. As also understood by those with ordinary skill, these evaluations can be performed during the application of load or stress, or in some cases by inspection after the application of load or stress. In cases in which the film, e.g., film 110, is electrically conductive, or a thin conductive layer is coated on the film, it is also understood by those with ordinary skill in the field that the onset of film cracking may be measured by analyzing the electrical resistivity of a conducting film.

Exemplary hard films 110 employed in the laminate articles 100a-c may have an elastic modulus of 25 GPa or more and/or a hardness of 1.75 GPa or more, although some combinations outside of this range are possible. Generally, however, the hard films 110 employed in the laminate articles 100a-100c are "hard" in the sense that they exhibit an elastic modulus of 25 GPa or more and/or a hardness of 1.75 GPa or more. In some embodiments the hard film 110 may have an elastic modulus of 50 GPa or greater or even 70 GPa or greater, and all ranges and sub-ranges between the foregoing values. For example, the film elastic modulus may be 55 GPa, 60 GPa, 65 GPa, 75 GPa, 80 GPa, 85 GPa or more, and all ranges and sub-ranges between the foregoing values. In one or more embodiments, the film 110 may have a hardness value that is measured to be greater than 3.0 GPa.

For example, the film 110 may have a hardness of 5 GPa, 5.5 GPa, 6 GPa, 6.5 GPa, 7 GPa, 7.5 GPa, 8 GPa, 8.5 GPa, 9 GPa, 9.5 GPa, 10 GPa, 11 GPa, 12 GPa, 13 GPa, 14 GPa, 15 GPa, 16 GPa or greater, and all ranges and sub-ranges between the foregoing values. According to another implementation, the hard film 110 employed in the laminate articles 100a-c can exhibit a hardness of greater than or equal to 8 GPa, or greater than or equal to 12 GPa. These elastic modulus and hardness values can be measured for such films 110 using known diamond nano-indentation methods that are commonly used by those with ordinary skill in the field of the disclosure for determining the elastic modulus and hardness of films. Exemplary diamond nano-indentation methods may utilize a Berkovich diamond indenter. Hardness and Young's modulus of thin film coatings, such as the films and layers of the disclosure (e.g., films 110 and crack mitigating composites 130a, 130b, 130c), are determined using widely accepted nanoindentation practices. (See Fischer-Cripps, A. C., "Critical Review of Analysis and Interpretation of Nanoindentation Test Data," Surface & Coatings Technology, 200, pp. 4153-4165, 2006 (hereinafter "Fischer-Cripps"); and Hay, J. et al, "Continuous Stiffness measurement During Instrumented Indentation Testing," Experimental Techniques, 34 (3), pp. 86-94, 2010 (hereinafter "Hay").) For coatings, it is typical to measure hardness and modulus as a function of indentation depth. So long as the coating is of sufficient thickness, it is then possible to isolate the properties of the coating from the resulting response profiles. It should be recognized that if the coatings are too thin (for example, less than ~500 nm), it may not be possible to completely isolate the coating properties as they can be influenced from the proximity of the substrate which may have different mechanical properties. (See Hay.) The methods used to report the properties herein are representative of the coatings themselves. The process is to measure hardness and modulus versus indentation depth out to depths approaching 1000 nm. In the case of hard coatings on a softer glass, the response curves will reveal maximum levels of hardness and modulus at relatively small indentation depths (≤about 200 nm). At deeper indentation depths both hardness and modulus will gradually diminish as the response is influenced by the softer glass substrate. In this case, the coating hardness and modulus are taken be those associated with the regions exhibiting the maximum hardness and modulus. In the case of soft coatings on a harder glass substrate, the coating properties will be indicated by the lowest hardness and modulus levels that occur at relatively small indentation depths. At deeper indentation depths, the hardness and modulus will gradually increase due to the influence of the harder glass. These profiles of hardness and modulus versus depth can be obtained using the traditional Oliver and Pharr approach (as described in Fischer-Cripps) or the more efficient continuous stiffness approach (see Hay). Extraction of reliable nanoindentation data requires that well-established protocols be followed. Otherwise, these metrics can be subject to significant errors. These elastic modulus and hardness values are measured for such thin films using known diamond nano-indentation methods, as described above, with a Berkovich diamond indenter tip. Further, without being bound by theory, the hardness values exhibited by the hard film 110 are indicative of the hardness of the laminate article 100a-c, provided that the hardness measurement made on the film is conducted with all of the aspects of the laminate article 100a-c in place, including the crack mitigating composite 130a-c and the glass-based substrate 120.

The hard films 110 described herein employed in the laminate articles 100a-c may also exhibit a fracture toughness of less than about 10 MPa·m$^{1/2}$, or in some cases less than 5 MPa·m$^{1/2}$, or in some cases less than 1 MPa·m$^{1/2}$. For example, the film may have a fracture toughness of 4.5 MPa·m$^{1/2}$, 4 MPa·m$^{1/2}$, 3.5 MPa·m$^{1/2}$, 3 MPa·m$^{1/2}$, 2.5 MPa·m$^{1/2}$, 2 MPa·m$^{1/2}$, 1.5 MPa·m$^{1/2}$, 1.4 MPa·m$^{1/2}$, 1.3 MPa·m$^{1/2}$, 1.2 MPa·m$^{1/2}$, 1.1 MPa·m$^{1/2}$, 0.9 MPa·m$^{1/2}$, 0.8 MPa·m$^{1/2}$, 0.7 MPa·m$^{1/2}$, 0.6 MPa·m$^{1/2}$, 0.5 MPa·m$^{1/2}$, 0.4 MPa·m$^{1/2}$, 0.3 MPa·m$^{1/2}$, 0.2 MPa·m$^{1/2}$, 0.1 MPa·m$^{1/2}$ or less, and all ranges and sub-ranges between the foregoing values. Fracture toughness of thin films as reported herein was measured as described in D. S Harding, W. C. Oliver, and G. M. Pharr, Cracking During Indentation and its use in the Measurement of Fracture Toughness, Mat. Res. Soc. Symp. Proc., vol. 356, 1995, 663-668.

The hard films 110 described herein employed in the laminate articles 100a-c may also have a critical strain energy release rate ($G_{IC}=K_{IC}^2/E$) that is less than about 0.1 kJ/m$^2$, or in some cases less than 0.01 kJ/m$^2$. In one or more embodiments, the film 110 may have a critical strain energy release rate of 0.09 kJ/m$^2$, 0.08 kJ/m$^2$, 0.07 kJ/m$^2$, 0.06 kJ/m$^2$, 0.05 kJ/m$^2$, 0.04 kJ/m$^2$, 0.03 kJ/m$^2$, 0.02 kJ/m$^2$, 0.01 kJ/m$^2$, 0.0075 kJ/m$^2$, 0.005 kJ/m$^2$, 0.0025 kJ/m$^2$ or less, and all ranges and sub-ranges between the foregoing values. Critical strain energy release rate is calculated using the values of fracture toughness and modulus measured as described above.

In one or more embodiments, the hard film 110 may include a plurality of layers, each with the same or with different thicknesses. In certain aspects, one or more layers within the film 110 may have a different composition than the other layers in film 110. Various sequences of layers making up film 110 are also contemplated by certain aspects of the disclosure. In one or more embodiments, each of the layers of the film may be characterized as brittle based on the influence of one or more of the layers on the average flexural strength of the laminate article 100a, 100b, 100c and/or the strain-to-failure, fracture toughness, elastic modulus, or critical strain energy release rate values of the layer or layers, as otherwise described herein. In one variant, the layers of the hard film 110 need not have identical properties, for example, elastic modulus and/or fracture toughness. In another variant, the layers of the film 110 may include different materials from one another—e.g., as in alternating, thin layers having different compositions. In some embodiments, the hard film 110 includes an outermost layer or layers with high scratch resistance (e.g., a silicon nitride and/or a silicon dioxide layer or layers) and an innermost layer or layers with other functional properties (e.g., a conducting film comprising a transparent conductive oxide, for example, ITO).

The compositions or material(s) of the hard film 110 can be limited, in certain embodiments, in the sense that the bulk of the film 110, or at least its outermost layer or layers, should exhibit an appropriate level of scratch resistance beneficial for the desired application of the laminated article 100a, 100b, 100c. According to some implementations of the laminated articles 100a, 100b, 100c, the hard film 110 can comprise at least one of a metal-containing oxide, a metal-containing oxynitride, a metal-containing nitride, a metal-containing carbide, a silicon-containing polymer, a carbon, a semiconductor, and combinations thereof. Some additional examples of the hard film 110 materials include oxides, for example, $SiO_2$, $Al_2O_3$, $TiO_2$, $Nb_2O_5$, $Ta_2O_5$; oxynitrides, for example, $SiO_xN_y$, $Si_uAl_vO_xN_y$, and $AlO_xN_y$; nitrides, for example, $SiN_x$, $AlN_x$, cubic boron nitride, and $TiN_x$; carbides, for example, SiC, TiC, and WC; combinations of the above, for example, oxycarbides and oxy-carbonitrides (for example, $SiC_xO_y$ and $SiC_xO_yN_z$); semiconductor materials, for example, Si and Ge; transparent conductors, for example, indium-tin-oxide (ITO), tin oxide, fluorinated tin oxide, aluminum zinc oxide, or zinc oxide; carbon nanotube or graphene-doped oxides; silver or other metal-doped oxides, highly siliceous polymers, for example, highly cured siloxanes and silsesquioxanes; diamond or diamond-like-carbon materials; or selected metal films which can exhibit a fracture behavior. Further, for those hard films 110 containing layer or layers with materials not typically associated with high scratch resistance (e.g., semiconductor materials, cubic boron nitride, etc.), the outermost layer or layers of the hard film can comprise a metal-containing oxide, a metal-containing oxynitride, a metal-containing nitride, a metal-containing carbide, a silicon-containing polymer, a diamond-like carbon material, and combinations thereof. In addition, various multilayer hard coating designs described in U.S. Pat. Nos. 9,079,802, 9,355,444, 9,359,261, and 9,366,784, incorporated herein by reference, can also be employed in the laminate articles and thereby obtain the benefit of the crack mitigating composite schemes of the disclosure.

It is common to describe solids with "whole number formula" descriptions, such as $Al_2O_3$. It is also common to describe solids using an equivalent "atomic fraction formula" description such as $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6 respectively. Atomic fraction descriptions are described in many general textbooks and atomic fraction descriptions are often used to describe alloys. See, for example: (i) Charles Kittel, Introduction to Solid State Physics, seventh edition, John Wiley & Sons, Inc., NY, 1996, pp. 611-627; (ii) Smart and Moore, Solid State Chemistry, An introduction, Chapman & Hall University and Professional Division, London, 1992, pp. 136-151; and (iii) James F. Shackelford, Introduction to Materials Science for Engineers, Sixth Edition, Pearson Prentice Hall, New Jersey, 2005, pp. 404-418.

To speak generally about an alloy, such as aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e. v+x=1), then the formula would be an atomic fraction description. Similarly, more complicated mixtures can be described, such as $Si_uAl_vO_xN_y$, where again, if the sum u+v+x+y were equal to 1, we would have the atomic fractions description case.

Atomic fraction formulas are sometimes easier to use in comparisons. For instance; an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another; For instance, we see that Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

The hard film 110 can be disposed on the glass-based substrate 120 by vacuum deposition techniques, for example, chemical vapor deposition (e.g., plasma enhanced chemical vapor deposition, atmospheric pressure chemical vapor deposition, or plasma-enhanced atmospheric pressure chemical vapor deposition), physical vapor deposition (e.g., reactive or nonreactive sputtering or laser ablation), thermal, resistive, or e-beam evaporation, or atomic layer deposition. The hard film 110 may also be disposed on one or more surfaces 122, 124 of the glass-based substrate 120 using liquid-based techniques, for example, sol-gel coating or polymer coating methods, for example spin, spray, slot draw, slide, wire-wound rod, blade/knife, air knife, curtain, gravure, and roller coating among others. In some embodiments it may be desirable to use adhesion promoters, for example, silane-based materials, between the hard film 110 and the glass-based substrate 120, between the glass-based substrate 120 and crack mitigating composite 130a, 130b, 130c, between the layers (if any) of the crack mitigating composite 130a, 130b, 130c, between the layers (if any) of the film 110 and/or between the film 110 and the crack mitigating composite 130a, 130b, 130c.

The thickness 11 of the hard film 110 (see FIGS. 1A-1C) can vary depending on the intended use of the laminate article 100a, 100b, 100c. In some embodiments the hard film 110, the thickness 11 may be in the ranges from about 0.005 μm to about 5 μm, from about 0.2 μm to about 5 μm, or from about 0.2 μm to about 0.5 μm. In some embodiments, the thickness 11 of the hard film 110 may range from about 0.005 μm to about 10 μm, from about 0.05 μm to about 0.5 μm, from about 0.01 μm to about 0.15 μm or from about 0.015 μm to about 0.2 μm, and all ranges and sub-ranges between the foregoing values.

In some embodiments of the laminate articles 100a, 100b, 100c, it may be advantageous to include a material (or materials) in the hard film 110 (e.g., as comprising a single layer, dual-layer or multi-layer structure) that has: (1) a refractive index that is similar to (or greater than) the refractive index of either the glass-based substrate 120, the crack mitigating composite 130a, 130b, 130c and/or other films or layers in order to minimize optical interference effects; (2) a refractive index (real and/or imaginary components) that is tuned to achieve anti-reflective interference effects; and/or (3) a refractive index (real and/or imaginary components) that is tuned to achieve wavelength-selective reflective or wavelength-selective absorptive effects, for example, to achieve UV or IR blocking or reflection, or to achieve coloring/tinting effects. In some implementations of the laminate articles 100a-c, for example, the hard film 110 can comprise a multi-layer antireflection coating, in which the crack mitigating composite 130a-c and the hard film 110 collectively comprise a photopic average single-side reflectance of less than about 2%. As referenced in this disclosure, a single-side reflectance value is measured by optically coupling the rear surface of the glass-based substrate to a strong light absorber, effectively removing the reflection from the back surface of the substrate from the measurement. Further, a photopic average is obtained by weighting the measured reflectance according to the sensitivity of the human eye, and averaging the result, using methods readily understood by those with ordinary skill in the field.

In one or more embodiments, the hard film 110 may have a refractive index that is greater than the refractive index of the glass-based substrate 120 and/or greater than the refractive index of the crack mitigating composite 130a, 130b, 130c. In one or more embodiments, the film 110 may have a refractive index in the range from about 1.7 to about 2.2, or in the range from about 1.4 to about 1.6, or in the range from about 1.6 to about 1.9, and all ranges and sub-ranges between the foregoing values. Some embodiments can employ a film 110 having one or more layers in which such layer(s) have a refractive index comparable to that of the substrate, even if the aggregate refractive index of the film exceeds that of the substrate (e.g., a film 110 with one or more silica layers and a balance of silicon nitride layer(s) disposed over a substrate 120 having a silicate glass composition).

The hard film 110 may also serve multiple functions, including scratch resistance, or be integrated with additional film(s) or layers as described herein that serve other functions than the scratch-resistance associated with the hard film 110. For example, the hard film 110 may include UV or IR light reflecting or absorbing layers, anti-reflection layers, anti-glare layers, dirt-resistant layers, self-cleaning layers, scratch-resistant layers, barrier layers, passivation layers, hermetic layers, diffusion-blocking layers, fingerprint-resistant layers, and the like. Further, the film 110 may include conducting or semi-conducting layers, thin film transistor layers, EMI shielding layers, breakage sensors, alarm sensors, electrochromic materials, photochromic materials, touch sensing layers, or information display layers. The film 110 and/or any of the foregoing layers may include colorants or tint. When information display layers are integrated into the laminate article 100a, 100b, 100c, the article may form part of a touch-sensitive display, a transparent display, or a heads-up display. In such cases, it may be desirable that the hard film 110 performs an interference function, which selectively transmits, reflects, or absorbs different wavelengths or colors of light. For example, the hard film 110 may selectively reflect a targeted wavelength in a heads-up display application.

Other functional properties of the hard film 110 besides scratch resistance include optical properties, electrical properties and/or mechanical properties, for example, hardness, elastic modulus, strain-to-failure, abrasion resistance, mechanical durability, coefficient of friction, electrical conductivity, electrical resistivity, electron mobility, electron or hole carrier doping, optical refractive index, density, opacity, transparency, reflectivity, absorptivity, transmissivity and the like. These functional properties are substantially maintained or even improved after the hard film 110 is combined with the glass-based substrate 120, crack mitigating composite 130a, 130b, 130c and/or other films included in the laminate article 100a, 100b, 100c.

Crack Mitigating Composite

As described herein, the crack mitigating composite 130a, 130b, 130c (see FIGS. 1A-1C) suppresses crack growth through the effective interface 140 in laminate articles 100a, 100b, 100c. The crack mitigating composite 130a-c may suppress crack growth by one or more of the following mechanisms: 1) reduction of stress intensity at crack tips due to changing elastic modulus within the composite structure; 2) crack blunting through plastic deformation within the composite structure; and 3) crack deflection by providing a preferred path for crack growth which is tortuous and consumes fracture energy within the crack mitigating composite/stack instead of within the hard film 110 or glass-based substrate 120.

With regard to the laminate article 100a-c, the crack mitigating composite 130a-c comprises an inorganic element 33 and a polymeric element 35. In these aspects, the crack mitigating composite 130a-c includes an inorganic element 33 and a polymeric element 35, either or both in the form of one or more layers, films, or other structures, such as particulate, fibers and/or whiskers. In some embodiments, the inorganic element 33 can comprise an oxide, a nitride, or an oxynitride; and the polymeric element 35 can comprise at least one of a polyimide, a polycarbonate, a polyurethane, a polyester and a fluorinated polymer. In some implementations, the inorganic element 33 can comprise one or more of $SiO_2$, $Al_2O_3$, $ZrO_2$, CaO, $CaCO_3$, SnO, ZnO, $SiN_x$, $AlN_x$, $AlO_xN_y$ or $SiO_xN_y$; and/or the polymeric element 35 of the crack mitigating composite 130a-c can comprise a polyimide derived from or otherwise comprising one or more of poly(pyromellitic dianhydride-co-4,4'-oxydianiline) (PMDA-ODA); 4,4'-oxidiphthalic anhydride and 4,4'-diaminodiphenyl ether monomers (ODPA-ODA; biphenyltetracarboxylicdianhydride-4,40-oxydianiline (BPDA-ODA); and a fluorinated polyimide. In some cases, the polymer component or the entire composite can demonstrate a high temperature tolerance, which can be characterized in multiple ways including one or more of the following: 1) a 2% or lower change in mass of the layer or complete crack mitigating composite; and 2) a 2% or lower change in optical reflectance or transmittance upon heating the article to 200° C. for 30 minutes, or, in some cases, 250° C. for 30 minutes.

According to some embodiments of the laminate articles 100a-c, the crack mitigating composite 130a-c includes an inorganic element 33 and a polymeric element 35, with greater than about 20% by volume of material associated with the inorganic element 33 and greater than about 0.5% or more by volume of material associated with the polymeric element 35. For example, the amount of material associated with the inorganic element 35 can be greater than about 20%, 30%, 40%, 50%, 60% by volume, and all amounts between these volumetric levels. Preferably, the polymeric element 35 comprises polymeric material having C—C, C—N, C—O and/or C═C bonds as polymeric chain-forming bonds. Further, in some embodiments, the crack mitigating composite 130a-c can have a composite crack-onset-strain (COS) value of greater than about 0.8%, greater than 1%, greater than about 1.5%, and all COS values between or above these levels. Further, the crack mitigating composite 130a-c, inclusive of its inorganic and polymer elements 33, 35, may be characterized by an elastic modulus of greater than 30 GPa. For example, the crack mitigating composite 130a-c can be characterized by an elastic modulus of 30.5 GPa, 31 GPa, 32 GPa, 33 GPa, 34 GPa, 35 GPa, 40 GPa, 45 GPa, 50 GPa, and so on, including all elastic modulus values between these levels, and conceivably up to 80 GPa and even approaching 120 GPa in some cases.

Further, in some embodiments of the laminate article 100a-c, the crack mitigating composite 130a-c can be characterized by an elastic modulus ratio between the inorganic element 33 and the polymeric element 35 of greater than 10:1 (e.g., an inorganic element 33 with an elastic modulus of 150 GPa and a polymeric element with an elastic modulus of 10 GPa would result in an elastic modulus ratio of 15:1). For example, the elastic modulus ratio of the crack mitigating composite 130a can be 11:1, 12:1, 13:1, 14:1, 15:1, 20:1, 30:1, 40:1, 50:1, 60:1, 70:1, 80:1, 90:1, 100:1 and all elastic modulus ratios between or above these ratios. According to some embodiments, a practical elastic modulus ratio limit for the crack mitigating composite 130a-c is about 500:1 for certain very low elastic modulus polymeric elements 35 (e.g., <1 GPa) coupled with relatively high elastic modulus inorganic elements 33 (e.g., >75 GPa) incorporated within the crack mitigating composite 130a-c.

Further, as shown in FIGS. 1B-1C, the crack mitigating composite 130b, 130c of the laminate articles 100b, 100c can include an inorganic element 33 in the form of one or more layers, and a polymeric element 35 in the form of one or more layers. Without being bound by theory, the retained strength, optical properties and scratch resistance values of the laminate articles 100b-c can be obtained for various quantities, combinations, thicknesses and/or compositions of the layer or layers that make up each of the inorganic element 33 and the polymeric element 35. Preferably, the laminate articles (e.g., laminate articles 100b, 100c) employing the inorganic and polymeric elements 33, 35 in the form of one or more layers each do so such that the layers of the inorganic and polymeric elements 33, 35 are alternating. In some embodiments, the laminate article 100b, 100c includes a crack mitigating composite 130b, 130c such that a layer of the inorganic element 33 is in contact with at least one of the glass-based substrate 120 and the hard film 110. In the scenario in which a layer of the inorganic element 33 is in contact with both of the glass-based substrate 120 and the hard-film 110, different layers of the inorganic element 33 will serve this function as at least one layer of the polymeric element 35 will be interposed between these layers.

As described herein and noted earlier, the "elastic modulus" or "average elastic modulus" of the crack mitigating composite 130b, 130c, inclusive of its inorganic and polymer elements 33, 35 in the form of layers, can be calculated by taking the measured values of each layer of the inorganic and polymeric elements 33, 35, as measured on a single film basis on the order of 100 nm to 1000 nm in thickness and then calculating a volumetric average elastic modulus for the crack mitigating composite 130b. In addition, the volumetric average elastic modulus can be calculated as understood by those with ordinary skill in the field of the disclosure, e.g., in view of volumetric estimates or actual volumetric measurements for each of the layers of the inorganic and polymeric elements 33, 35. Further, these methods of calculating an average elastic modulus of the crack mitigating composite agree closely with measurements of elastic modulus made directly on the crack mitigating composite through nanoindentation methods, as also described in the disclosure.

As shown in FIGS. 1B and 1C, the crack mitigating composite 130b, 130c of the laminated article 100b, 100c includes an inorganic element 33 with one or more layers having a thickness 63. In some aspects, the thickness 63 of each layer of the inorganic element 33 can range from about 1 nm to about 200 nm, preferably from about 5 nm to about 150 nm. Further, in some aspects, the thickness 65 of each layer of the polymeric element 35 can range from about 1 nm to about 500 nm, preferably from about 5 nm to about 300 nm. According to another implementation, the total thickness 13b of the crack mitigating composite 130b can range from about 10 nm to about 1000 nm. In another aspect, the total thickness 13b of the crack mitigating composite 130b ranges from about 50 nm to about 750 nm. In additional embodiments, the total thickness 13b of the crack mitigating composite 130b ranges from about 25 nm to about 1000 nm, from about 50 nm to about 800 nm, from about 50 nm to about 700 nm, from about 50 nm to about 600 nm, from about 50 nm to about 500 nm, and all ranges and sub-ranges of total thicknesses within these ranges.

In some implementations, the laminate article 100b, 100c can include a crack mitigating composite 130b, 130c governed by a thickness ratio for the layers of its inorganic and polymeric elements 33, 35. For example, a ratio the total thickness of the polymeric element 35 (i.e., the sum of the thickness 65 values for each of its layers) and the inorganic element 33 (i.e., the sum of the thickness 63 values for each of its layers) can be from about 0.1:1 to about 5:1. In other implementations, the thickness ratio can be about 0.2:1 to about 3:1. As also understood herein, the implementations of the laminate article 100b, 100c and crack mitigating composite 130b, 130c governed by such thickness ratios are configured such that the thickness ratios are calculated independent of any additional layers added to the crack mitigating composite 130b, 130c immediately adjacent to one or both of the hard film 110 and/or glass-based substrate 120. Such layers, as described herein, are referred to as "tie layers" and are typically one half to an order (or orders) of magnitude thinner than the other layers of the inorganic and polymeric elements 33, 35.

Figure 6A:
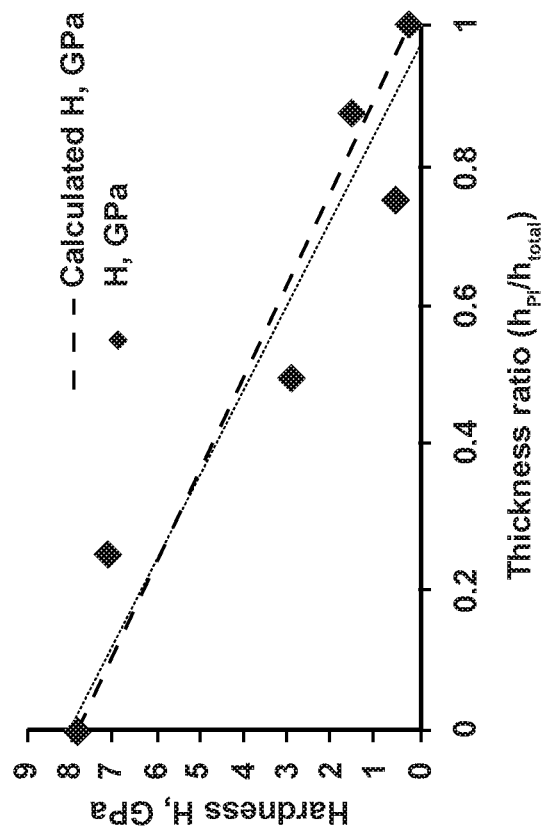
FIG. 6A is a plot of elastic modulus of a crack mitigating composite, as disposed on a glass-based substrate, as a function of the ratio of the thickness of the polymeric layer in the composite to the thickness of the complete crack mitigating composite, as measured according to a nanoindentation method, according to some embodiments of the disclosure.
Figure 6B:
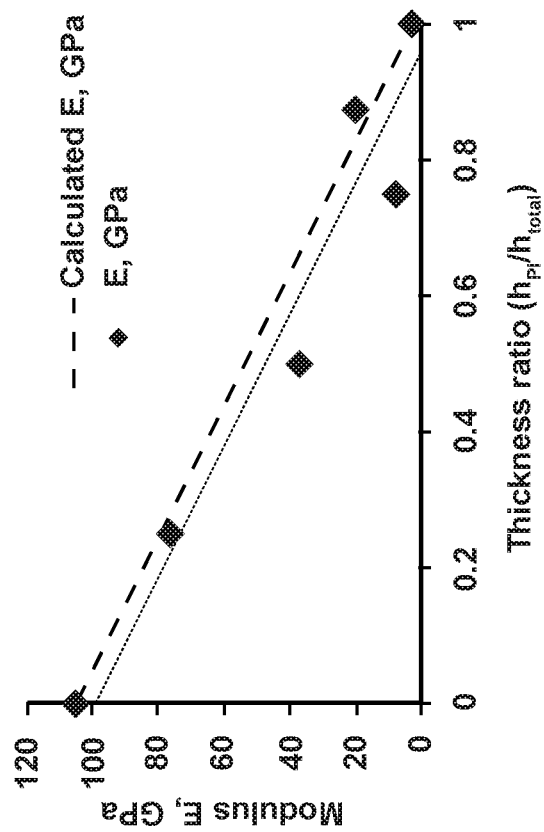
FIG. 6B is a plot of hardness of a crack mitigating composite, as disposed on a glass-based substrate, as a function of the ratio of the thickness of the polymeric layer in the composite to the thickness of the complete crack mitigating composite, as measured according to a nanoindentation method, according to some embodiments of the disclosure.

According to other embodiments of the laminate articles 100b, 100c, the crack mitigating composite 130b, 130c includes a hardness sufficient to retain the scratch resistance of the hard film 110, while also exhibiting a toughness sufficient to improve or otherwise retain the flexural strength of the glass-based substrate 120 and a hard film 110. To find a beneficial balance between hardness and toughness, the elastic modulus, E, and the hardness, H, of the crack mitigating composite 130b, 130c can be tailored by controlling the thickness ratio between the thickness of the layers of the polymeric element 35 (e.g., the sum of the thicknesses 63) and the total thickness 13b, 13c of the composite. As shown in FIGS. 6A and 6B, a plots of elastic modulus (GPa) and hardness (GPa) of a crack mitigating composite, as disposed on a glass-based substrate, as a function of the ratio of the thickness of the polymeric layer in the composite to the thickness of the complete crack mitigating composite, as measured according to a nanoindentation method, according to some embodiments of the disclosure. As is evident from FIGS. 6A & 6B, increases in the thickness ratio of the total thickness of the polymeric element to the total thickness of the crack mitigating composite (i.e., about 400 nm for the data points) tend to result in decreased elastic modulus and hardness levels for the laminate articles. In addition, the fitted lines to the data depicted in FIGS. 6A and 6B have $R^2$ values of 0.93 and 0.91, respectively, indicating a strong correlation between thickness ratio and elastic modulus or hardness of the crack mitigating composite.

Referring now more generally to laminate articles 100a-c, the interfacial properties at an effective interface 140 between the hard film 110 and the crack mitigating composite 130a-c, or between the crack mitigating composite 130a-c and the substrate 120, are modified, generally by virtue of the crack mitigating composite 130a-c, such that the article 100a-c substantially retains its average flexural strength, and the hard film 110 retains functional properties for its application, particularly scratch-resistance. For example, in some embodiments of the laminate article 100a-c, the article is characterized by an average flexural strength that is greater than or equal to about 50% of an average flexural strength of the glass-substrate (i.e., as tested without a crack mitigating composite 130a-c and hard film 110 structures disposed thereon).

Figure 5A:
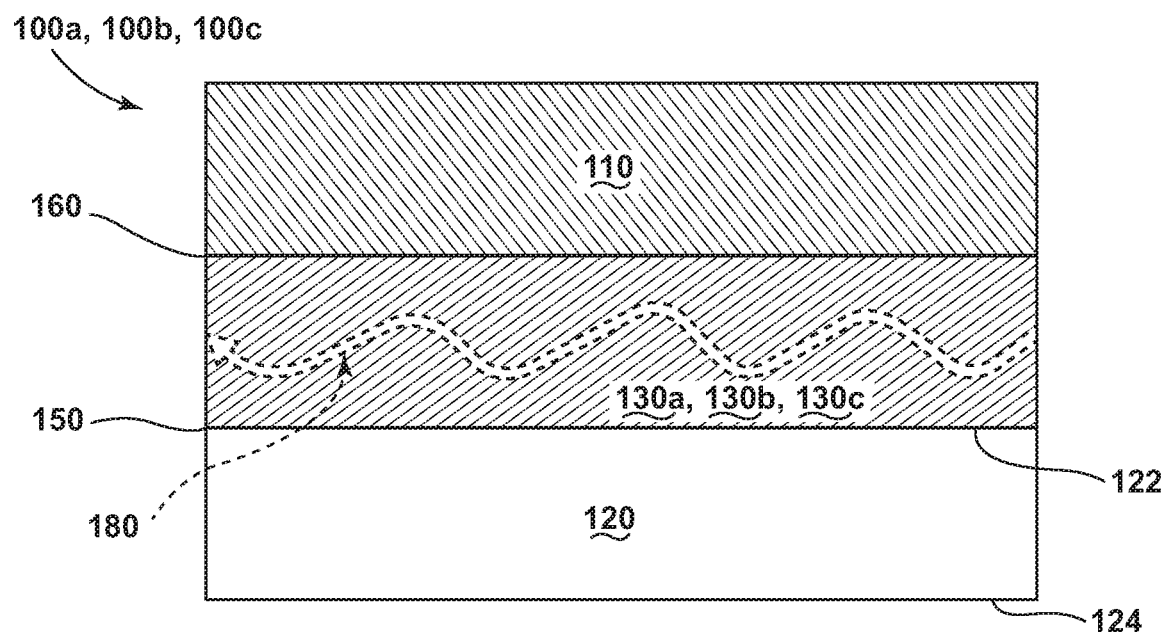
FIG. 5A is a schematic diagram of a cohesive failure in a crack mitigating composite interposed between a hard film and a glass-based substrate according to some embodiments of this disclosure.

In one or more embodiments of the laminated articles 100a-c depicted in FIGS. 1A-1C, the crack mitigating composite 130a-c may form a preferred path of crack propagation other than bridging between the hard film 110 and the glass-based substrate 120. In other words, the crack mitigating composite 130a-c may deflect a crack, forming in one of the film 110 and the glass-based substrate 120 and propagating toward the other of the film 110 and the glass-based substrate 120, into the crack mitigating composite 130a-c. In such embodiments, the crack may propagate through the crack mitigating composite 130a-c in a direction substantially parallel to at least one of the first interface 150 or the second interface 160 for laminate articles 100a-c. As depicted in FIG. 5A, the crack becomes a cohesive failure 180, when confined within the crack mitigating composite 130a-c. As used herein, the term "cohesive failure" relates to crack propagation substantially confined within the crack mitigating composite 130a-c.

The crack mitigating composite 130a-c, when configured to develop a cohesive failure 180 as shown in FIG. 5A, provides a preferred path for crack propagation in such embodiments. The crack mitigating composite 130a-c may cause a crack originating in the hard film 110 or the glass-based substrate 120 and entering into the crack mitigating composite 130a-c to remain in the crack mitigating composite. Alternatively, or additionally, the crack mitigating composite 130a-c of laminate articles 100a-c effectively confines a crack originating in one of the hard film 110 and glass-based substrate 120 from propagating into the other of such film and glass-based substrate. Similarly, the crack mitigating composite 130a-c of laminate article 100a-c effectively confines a crack originating in one of the composite 130a-c and glass-based substrate 120 from propagating into the other such composite and substrate. These behaviors may be characterized individually or collectively as crack deflection. In this way, the crack is deflected from bridging between the film 110 and the glass-based substrate 120, or between the crack mitigating composite 130a-c and the glass-based substrate 120. In one or more embodiments, the crack mitigating composite 130a-c may provide a low toughness layer or interface that exhibits a low fracture toughness and/or a low critical strain energy release rate, which may promote crack deflection into the crack mitigating composite 130a-c instead of through the crack mitigating composite into the film 110 and/or glass-based substrate 120. As used herein, "facilitate" includes creating favorable conditions in which the crack deflects into the crack mitigating composite 130a-c instead of propagating into the glass-based substrate 120 or the film 110. The term "facilitate" may also include creating a less tortuous path for crack propagation into and/or through the crack mitigating composite 130a-c instead of into the glass-based substrate 120 or the film 110.

In accordance with one or more embodiments of the laminate article 100a-c, the crack mitigating composite 130a-c may have an average strain-to-failure that is greater than the average strain-to-failure of the hard film 110. In one or more embodiments of laminate articles 100a-c, the crack mitigating composite 130a-c may have an average strain-to-failure that is equal to or greater than about 0.5%, 0.7%, 1%, 1.5%, 2%, or even 4%. The crack mitigating composite 130a-c may have an average strain-to-failure of 0.6%, 0.8%, 0.9%, 1.1%, 1.2%, 1.3%, 1.4%, 1.5%, 1.6%, 1.7%, 1.8%, 1.9%, 2.0% 2.2%, 2.4%, 2.6%, 2.8%, 3%, 3.2%, 3.4%, 3.6%, 3.8%, 4%, 5% or 6% or greater, and all ranges and sub-ranges between the foregoing values. In one or more embodiments, the hard film 110 may have an average strain-to-failure (crack onset strain) that is 1.5%, 1.0%, 0.7%, 0.5%, or even 0.4% or less, and all ranges and sub-ranges between the foregoing values. The film 110 may have an average strain-to-failure of 1.4%, 1.3%, 1.2%, 1.1%, 0.9%, 0.8%, 0.6%, 0.3%, 0.2%, 0.1% or less, and all ranges and sub-ranges between the foregoing values. The average strain-to-failure of the glass-based substrate 120 may be greater than the average strain-to-failure of the hard film 110 for laminate articles 100a-c, and in some instances, may be greater than the average strain-to-failure of the crack mitigating composite 130a-c. In some other specific embodiments of laminated articles 100a-c, the crack mitigating composite 130a-c may have a higher average strain-to-failure than the glass-based substrate 120, to minimize any negative mechanical effect of the crack mitigating composite on the glass-based substrate.

The crack mitigating composite 130a-c, according to one or more embodiments, may have a critical strain energy release rate ($G_{IC}=K_{IC}^2/E$) that is greater than the critical strain energy release rate of the hard film 110. In other examples, the crack mitigating composite 130a-c may exhibit a critical strain energy release rate that is less than 0.25 times, or less than 0.5 times, the critical strain energy release rate of the glass-based substrate. In specific embodiments, the critical strain energy release rate of the crack mitigating composite 130a-c can be about 0.1 kJ/m$^2$ or less, about 0.09 kJ/m$^2$ or less, about 0.08 kJ/m$^2$ or less, about 0.07 kJ/m$^2$ or less, about 0.06 kJ/m$^2$ or less, about 0.05 kJ/m$^2$ or less, about 0.04 kJ/m$^2$ or less, about 0.03 kJ/m$^2$ or less, about 0.02 kJ/m$^2$ or less, about 0.01 kJ/m$^2$ or less, about 0.005 kJ/m$^2$ or less, about 0.003 kJ/m$^2$ or less, about 0.002 kJ/m$^2$ or less, about 0.001 kJ/m$^2$ or less; but in some embodiments, greater than about 0.0001 kJ/m$^2$ (i.e., greater than about 0.1 J/m$^2$), and all ranges and sub-ranges between the foregoing values.

The crack mitigating composite 130a-c employed in laminate articles 100a-c may have a refractive index that is greater than the refractive index of the glass-based substrate 120. In one or more embodiments, the refractive index of the crack mitigating composite 130a-c may be less than the refractive index of the hard film 110. In some embodiments, the refractive index of the crack mitigating composite 130a-c may be between the refractive index of the glass-based substrate 120 and the film 110. For example, the refractive index of the crack mitigating composite 130a-c may be in the range from about 1.45 to about 1.95, from about 1.5 to about 1.8, or from about 1.6 to about 1.75, and all ranges and sub-ranges between the foregoing values. Alternatively, the crack mitigating composite 130a-c may have a refractive index that is substantially the same as the glass-based substrate, or a refractive index that is not more than 0.05 index units greater than or less than that of the glass-based substrate over a substantial portion of the visible wavelength range (e.g. from 450 to 650 nm). In certain implementations, the crack mitigating composite 130a-c is configured such that the optical transmittance of the substrate and the crack mitigating composite vary by 1% or less from the optical transmittance of the substrate alone. Put another way, the crack mitigating composite 130a-c can be configured such that the optical properties (e.g., optical transmittance and reflectance) of the substrate are retained.

In one or more embodiments, the crack mitigating composite 130a-c of the laminate articles 100a, 100b, 100c is able to withstand high temperature processes. Such processes can include vacuum deposition processes, for example, chemical vapor deposition (e.g., plasma-enhanced chemical vapor deposition), physical vapor deposition (e.g., reactive or nonreactive sputtering or laser ablation), thermal or e-beam evaporation and/or atomic layer deposition. In one or more specific embodiments, the crack mitigating composite 130a-c is able to withstand a vacuum deposition process in which the hard film 110 and/or other films disposed on the glass-based substrate 120 are deposited on the crack mitigating composite 130a-c via vacuum deposition. As used herein, the term "withstand" includes the resistance of the crack mitigating composite 130a-c to temperatures exceeding 100° C., 200° C., 300° C., 400° C., 500° C., 600° C. and potentially even greater temperatures such that no more than 10% weight loss and/or no more than 2% loss in optical transmittance is observed in the crack mitigating composite. In some embodiments, the crack mitigating composite 130a-c may be considered to withstand the vacuum deposition or temperature treatment process if the crack mitigating composite 130a-c experiences a weight loss of 10% or less, 8% or less, 6% or less, 4% or less, 2% or less or 1% or less, and all ranges and sub-ranges between the foregoing values, after deposition of the film 110 and/or other films on the glass-based substrate (and on the crack mitigating composite 130a-c). The deposition process (or testing after the deposition process) under which the crack mitigating composite 130a-c experiences weight loss can include temperatures of about 100° C. or greater, 200° C. or greater, 300° C. or greater, 400° C. or greater; environments that are rich in a specific gas (e.g., oxygen, nitrogen, argon etc.); and/or environments in which deposition may be performed under high vacuum (e.g. 10$^{-6}$ Torr), under atmospheric conditions and/or at pressures therebetween (e.g., 10 mTorr). As will be discussed herein, the material utilized to form the crack mitigating composite 130a or stack 130b may be specifically selected for its high temperature tolerance (i.e., the ability to withstand high temperature processes, for example, vacuum deposition processes) and/or its environmental tolerance (i.e., the ability to withstand environments rich in a specific gas or at a specific pressure). These tolerances may include high temperature tolerance, high vacuum tolerance, low vacuum outgassing, a high tolerance to plasma or ionized gases, a high tolerance to ozone, a high tolerance to UV, a high tolerance to solvents, or a high tolerance to acids or bases. In some instances, the crack mitigating composite 130a-c may be selected to pass an outgassing test according to ASTM E595.

With regard to processing of the crack mitigating composite 130a-c, various processes can be used to deposit, coat, or otherwise form its inorganic and polymeric elements 33, 35. For example, wet-coating methods, e.g., spin-casting, spray, and dip-coating, can be employed with various organic solvents, at least for development of the polymeric element 35. Preferably, however, various vacuum-based deposition methods, e.g., thermal evaporation, e-beam evaporation, sputtering, and CVD methods, can be employed to fabricate both of the inorganic and polymeric elements 33, 35. Vacuum deposition methods are advantageous in that they do not rely on the use of any organic solvents, which can be toxic. Further, vacuum deposition methods, relative to other deposition and forming methods, can achieve better control of the thickness, layer uniformity and adhesion between the layers of the crack mitigating composite 130a-c, and between the layers of the composite and the hard film 110 or glass-based substrate 120.

Figure 7:
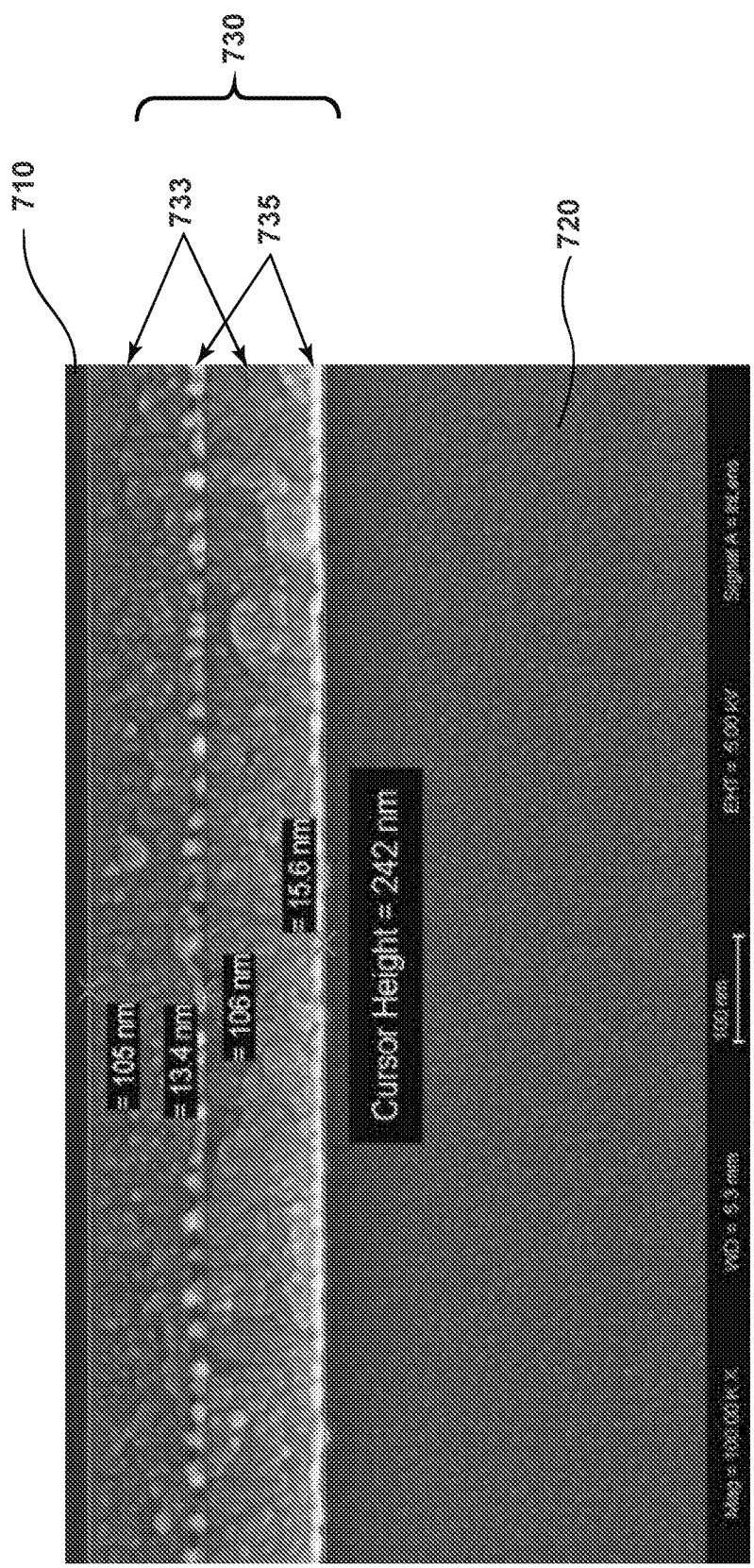
FIG. 7 is a scanning electron microscope (SEM) image from a cross-section of an article comprising a glass-based substrate, a hard film and a crack mitigating composite comprising two inorganic layers and two polymeric layers according to some embodiments of this disclosure.

For example, these processing techniques can be demonstrated by the scanning electron microscope (SEM) image in FIG. 7 from a cross-section of a laminate article comprising a glass-based substrate 720, a hard film 710 and a crack mitigating composite 730 comprising two inorganic layers 733 and two polymeric layers 735 according to some embodiments of this disclosure. In the laminate article depicted in FIG. 7, an organic layer (PMDA-ODA) 735 is co-evaporated by thermal evaporation and an inorganic layer 733, Al$_2$O$_3$, is deposited by e-beam evaporation on a glass-based substrate 720. These steps were repeated to complete the crack mitigating composite 730, which comprises two layers of polyimide and two layers of Al$_2$O$_3$. Further, PMDA and ODA are polyimide precursors (e.g., of the polymeric layer 735), which undergo step polymerization when deposited onto the surface of the glass-based substrate 720 or a subsequent layer of the inorganic layer 733, and are then thermally cured at 200° C. to complete the formation of the polyimide layer. Using these vacuum-based deposition processes, e.g., as depicted in the FIG. 7 image of a laminate article produced according to the foregoing, both of the inorganic and polymeric layers 733, 735 of the crack mitigating composite 730 can be deposited in a single chamber that is capable of introducing multiple precursor sources. In a preferred embodiment, additional ion cleaning steps are conducted between the deposition of each of the layers making up the inorganic and polymeric layers 733, 735 to improve adhesion with subsequent layers and/or the hard film 710. In addition, some aspects of the crack mitigating composites 130a-c of the laminate articles 100a-100c, including the article depicted in FIG. 7, are fabricated according to the foregoing, followed by deposition of a hard film 110 comprising a silicon nitride ($SiN_x$) with a plasma-enhanced chemical vapor deposition technique. The SiNx scratch-resistant film (e.g., film 710 as shown in FIG. 7) was deposited in a Plasma-Therm high density plasma-enhanced vapor deposition (HDPCVD) Versaline system at 200° C. with a silane precursor gas and nitrogen gas.

Further, the crack mitigating composite 130a-c of one or more embodiments of the laminate articles 100a-c (see FIGS. 1A-1C) may exhibit higher temperature tolerance, robustness to UV ozone or plasma treatments, UV transparency, robustness to environmental aging, low outgassing in vacuum environments, and the like. In instances where the hard film 110 is also formed by vacuum deposition, both the crack mitigating composite 130a-c and the film 110 can be formed in the same or similar vacuum deposition chamber or using the same or similar coating equipment.

According to some embodiments, the hard film 110 of the laminate article 100a-c, which comprises a crack mitigating composite 130a-c, is characterized by no peeling or substantially no peeling from the article upon exposure of the film 110 to a Garnet scratch test. As used herein, the "Garnet scratch test" is performed by attaching a ~6 mm diameter circular piece of 150 grit garnet sandpaper to the head of a Taber Abraser unit using a double-sided adhesive tape. A total of 1 kg load is applied to the abrasive head (~650 g added load plus ~350 g spindle load). Alternately, a total of 4 kg load may be applied. The abrasive head is then swept in a single scratching pass of ~30 mm length over the surface of the sample, which is then inspected for scratches. Although some scratches or damage marks may be visible on the sample, the criteria of "substantially no peeling," as used herein, is defined as having no visible regions in the center of the ~30 mm Garnet scratch path larger than about 100 microns in any spatial dimension where the scratch resistant film 110 is completely removed from the substrate, when inspected using an optical microscope. Put another way, "peeling" or a "peeling-related failure," is defined as complete removal of the scratch resistant film(s) after undergoing the Garnet scratch test. Aspects of the disclosure exhibit substantially no peeling according to this criterion when subjected to Garnet scratch testing with both 1 kg and 4 kg total applied load.

The crack mitigating composite 130a-c (see FIGS. 1A-1C) may be substantially optically transparent and free of light scattering, for example, having an optical transmission haze of 10% or less, 9% or less, 8% or less, 7% or less, 6% or less, 5% or less, 4% or less, 3% or less, 2% or less, 1% or less and all ranges and sub-ranges therebetween. The transmission haze of the layer may be controlled by controlling the average sizes of pores within the crack mitigating composite 130a-c, as defined herein. Exemplary average pore sizes in the layer may include 200 nm or less, 100 nm or less, 90 nm or less, 80 nm or less, 70 nm or less, 60 nm or less, 50 nm or less, 40 nm or less, 30 nm or less, 20 nm or less, 10 nm or less, 5 nm or less and all ranges and sub-ranges therebetween. These pore sizes can be estimated from light scattering measurements, or directly analyzed using transmission electron microscopy (TEM) and other known methods.

In some embodiments, the crack mitigating composite 130a-c may exhibit a similar refractive index to either the glass-based substrate 120 and/or hard film 110 to minimize optical interference effects. Accordingly, the crack mitigating composite 130a-c can exhibit a refractive index that is somewhat above, equal to or somewhat below the refractive indices of the substrate 120 and/or the hard film 110. Additionally or alternatively, the crack mitigating composite 130a-c may exhibit a refractive index that is tuned to achieve anti-reflective interference effects. The refractive index of the crack mitigating composite 130a-c can be engineered somewhat by controlling the relative amounts and compositions of the inorganic and polymeric elements 33, 35 along with the thicknesses of any layers serving as constituents of the elements 33, 35 (e.g., as consistent with the crack mitigating composites 130b, 130c depicted in FIGS. 1B and 1C).

The thickness 13a-c (which includes an average thickness where the thickness of the crack mitigating composite varies) of the crack mitigating composite 130a-c employed in laminate articles 100a-c may be in the range of about 0.001 μm to about 10 μm (1 nm to 10,000 nm), from about 0.01 μm to about 1 μm (10 nm to about 1000 nm), from about 0.05 μm to about 0.75 μm (50 nm to about 750 nm), from about 0.01 μm to about 0.5 μm (10 nm to about 500 nm), from about 0.02 μm to about 0.2 μm (20 nm to about 200 nm). In one or more embodiments, the thickness 13a-c of the crack mitigating composite 130a-c is in the range from about 0.02 μm to about 10 μm, from about 0.03 μm to about 10 μm, from about 0.04 μm to about 10 μm, from about 0.05 μm to about 10 μm, from about 0.06 μm to about 10 μm, from about 0.07 μm to about 10 μm, from about 0.08 μm to about 10 μm, from about 0.09 μm to about 10 μm, from about 0.1 μm to about 10 μm, from about 0.01 μm to about 9 μm, from about 0.01 μm to about 8 μm, from about 0.01 μm to about 7 μm, from about 0.01 μm to about 6 μm, from about 0.01 μm to about 5 μm, from about 0.01 μm to about 4 μm, from about 0.01 μm to about 3 μm, from about 0.01 μm to about 2 μm, from about 0.01 μm to about 1 micron, from about 0.02 μm to about 1 micron, from about 0.03 to about 1 μm, from about 0.04 μm to about 0.5 μm, from about 0.05 μm to about 0.25 μm or from about 0.05 μm to about 0.15 μm, and all ranges and sub-ranges between the foregoing values.

In one or more embodiments, thicknesses of the glass-based substrate 120, hard film 110 and/or crack mitigating composite 130a-c (e.g., thicknesses 12, 11 and 13a-c, respectively) may be specified in relation to one another (see FIGS. 1A-1C). For example, the crack mitigating composite 130a-c may have a thickness 13a-c that is less than or equal to about 10 times the thickness 11 of the hard film 110. In another example, where a hard film 110 has a thickness 11 of about 85 nm, the crack mitigating composite 130a-c may have a thickness 13a-c of about 850 nm or less. In yet another example, the thickness 13a-c of the crack mitigating composite 130a-c may be in the range from about 35 nm to about 80 nm and the film 110 may have a thickness 11 in the range from about 30 nm to about 300 nm. In a further example, the thickness 13a-c of the crack mitigating composite 130a-c may be in the range from about 150 nm to about 450 nm and the thickness 11 of the hard film 110 is in the range from about 1 micron to about 3 microns.

In one variant, the crack mitigating composite 130a-c may have a thickness 13a-c that is less than or equal to about 9 times, 8 times, 7 times, 6 times, 5 times, 4 times, 3 times or two times the thickness 11 of the film 110, and all ranges and sub-ranges between the foregoing values. In another variant, the thickness 11 of the film 110 and the thickness 13a-c of the crack mitigating composite 130a-c are each less than about 10 µm, less than about 5 µm, less than about 2 µm, less than about 1 µm, less than about 0.5 µm, or less than about 0.2 µm, and all ranges and sub-ranges between the foregoing values. The ratio of the crack mitigating composite 130a-c thicknesses 13a-c to the film 110 thickness 11 maybe, in some embodiments, in the range from about 1:1 to about 1:20, in the range from about 1:2 to about 1:6, in the range from about 1:3 to about 1:5, or in the range from about 1:3 to about 1:4, and all ranges and sub-ranges between the foregoing values. In another variant, the thickness 13a, 13b of the crack mitigating composite 130a-c is less than about 0.4 µm and the thickness 11 of the film 110 is greater than the crack mitigating composite 130a-c.

Additionally or alternatively, the hard film 110 including one or more of an indium-tin-oxide layer, a scratch-resistant layer (e.g., $AlO_xN_y$, AlN and combinations thereof), and an anti-reflective layer; and the crack mitigating composite 130a-c form a stack element, wherein the stack element has an overall low optical reflectance. For example, the overall (or total) reflectance of such a stack element may be 15% or less, 10% or less, 8% or less, 7% or less, 6.5% or less, 6% or less, 5.5% or less, and all ranges and sub-ranges between the foregoing values, across a visible wavelength range from 450-650 nm, 420-680 nm, or even 400-700 nm. The reflectance numbers above may be present in some embodiments including the reflectance from one bare (or uncoated) glass interface (e.g., of the glass-based substrate 120), which is approximately 4% reflectance from the uncoated glass interface alone, or may be characterized as the reflectance for a first major surface of a glass-based substrate 120 and the stack element (and associated interfaces) disposed on the first major surface (excluding the 4% reflectance from an uncoated second major surface of the glass-based substrate). The average reflectance from the stack element structure and the stack element-glass coated interfaces alone (subtracting out the reflectance of the uncoated glass interface) may be less than about 5%, 4%, 3%, 2%, or even less than about 1.5%, and all ranges and sub-ranges between the foregoing values, across a visible wavelength range from 450-650 nm, 420-680 nm, or even 400-700 nm, in some cases when one or more major surfaces of the glass-based substrate 120 is covered by a typical encapsulant (i.e., an additional film or layer) having an encapsulant refractive index of about 1.45-1.65. In addition, the stack element may exhibit a high optical transmittance, which indicates both low reflectance and low absorptance, according to the general relationship: Transmittance=100%−Reflectance−Absorptance. The average transmittance values for the stack element (when neglecting reflectance and absorptance associated with the glass-based substrate 120 or encapsulant layers alone) may be greater than about 75%, 80%, 85%, 90%, 95%, or even 98%, and all ranges and sub-ranges between the foregoing values, across a visible wavelength range from 450-650 nm, 420-680 nm, or even 400-700 nm.

The optical properties of the laminate articles 100a-c (see FIGS. 1A-1C) may be adjusted by varying one or more of the properties of the hard film 110, crack mitigating composite 130a-c and/or the glass-based substrate 120. For example, the articles 100a-c may exhibit a total reflectance of 15% or less, 10% or less, 8% or less, 7% or less, 6.9% or less, 6.8% or less, 6.7% or less, 6.6% or less, 6.5% or less, 6.4% or less, 6.3% or less, 6.2% or less, 6.1% or less and/or 6% or less, and all ranges and sub-ranges between the foregoing values, over the visible wavelength range from about 400 nm to about 700 nm. Ranges may further vary as specified hereinabove, and ranges for the stack element (i.e., as including the hard film 110 and the crack mitigating composite 130a-c)/coated glass interfaces alone are listed hereinabove. In more specific embodiments, the articles 100a-c described herein may exhibit a lower average reflectance and greater average flexural strength than articles without a crack mitigating composite 130a-c. In one or more alternative embodiments, at least two of optical properties, electrical properties or mechanical properties of the article 100a-c may be adjusted by varying the thickness(es) of the glass-based substrate 120, film 110 and/or the crack mitigating composite 130a-c. Additionally or alternatively, the average flexural strength of the articles 100a-c may be adjusted or improved by modifying the thickness(es) of the glass-based substrate 120, film 110 and/or the crack mitigating composite 130a-c.

Additionally, glass-based substrates 120 coated with the crack mitigating composite 130a-c may have a reflectance that is within 2% or within 1% of the glass-based substrate alone. The crack mitigating composite may have a refractive index which is less than 1.55, from 1.35 to 1.55, or no greater than 0.05 higher than the refractive index of the substrate. The crack mitigating composite may also have a combined absorptance and scattering level that is less than 5% of the incident optical energy across a visible wavelength range from 400-800 nm.

The articles 100a-c (see FIGS. 1A-1C) may include one or more additional films (not shown) disposed on the glass-based substrate 120. In one or more embodiments of the article 100a-c, the one or more additional films may be disposed on the hard film 110 or, as is more typical, on the opposite major surface from the film 110. Certain of the additional film(s) may be disposed in direct contact with the film 110. In one or more embodiments, the additional film(s) may be positioned between: 1) the glass-based substrate 120 and the crack mitigating composite 130a-c (e.g., in laminate articles 100a-c); or 2) the crack mitigating composite 130a-c and the film 110. In one or more embodiments, both the crack mitigating composite 130a-c and the film 110 may be positioned between the glass-based substrate 120 and the additional film(s). The additional film(s) may include a protective layer, an adhesive layer, a planarizing layer, an anti-splintering layer, an optical bonding layer, a display layer, a polarizing layer, a light-absorbing layer, reflection-modifying interference layers, scratch-resistant layers, barrier layers, passivation layers, hermetic layers, diffusion-blocking layers and combinations thereof, and other layers known in the art to perform these or related functions. Examples of suitable protective or barrier layers include layers containing $SiO_x$, $SiN_y$, $SiO_xN_y$, other similar materials and combinations thereof. Such layers can also be modified to match or complement the optical properties of the hard film 110, the crack mitigating composite 130a-c and/or the glass-based substrate 120. For example, the protective layer may be selected to have a similar refractive index as the crack mitigating composite 130a-c, the film 110, or the glass-based substrate 120.

In one or more embodiments, the articles 100a-c described may be used in information display devices and/or touch-sensing devices. In one or more alternative embodiments, the articles 100a-c may be part of a laminate structure, for example, as a glass-polymer-glass laminated safety glass to be used in automotive or aircraft windows. An exemplary polymer material used as an interlayer in these laminates is PVB (polyvinyl butyral), and there are many other interlayer materials known in the art that can be used. In addition, there are various options for the structure of the laminated glass, which are not particularly limited. The articles 100a-c may be curved or shaped in the final application, for example as in an automotive windshield, sunroof, or side window. The thickness 10a-c of the articles 100a-c can vary, for either design or mechanical reasons; for example, the articles 100a-c can be thicker at the edges than at the center of the article. The articles 100a-c may be acid-polished or otherwise treated to remove or reduce the effect of surface flaws.

Some embodiments of the present disclosure pertain to cover glass applications that utilize the articles 100a-c described herein. In one or more embodiments, the cover glass may include a laminated article with a glass-based substrate 120 (which may be strengthened or not strengthened), a hard film 110 (e.g., $AlO_xN_y$, AlN, $SiO_xN_y$, $SiAl_vO_xN_y$, $Si_3N_4$ and combinations thereof), and the crack mitigating composite 130a-c comprising an inorganic element and a polymeric element. The laminated article 100a-c may include one or more additional film(s) for reducing the reflection and/or providing an easy-to-clean or anti-fingerprint surface on the laminated article. In particular, a ~1-10 nm thick silane or fluorosilane layer may be applied to the surface of the hard film to reduce friction, improve cleanability, or aid in scratch reduction at the user surface of the article.

Some embodiments of the present disclosure pertain to touch-sensing devices including the articles described herein. In one or more embodiments, the touch sensor device may include a glass-based substrate 120 (which may be strengthened or not strengthened), a hard film 110 (e.g., as comprising a transparent conductive oxide and a scratch-resistant material, e.g., $AlO_xN_y$, AlN, $SiO_xN_y$, $SiAl_vO_xN_y$, $Si_3N_4$ and combinations thereof) and a crack mitigating composite 130a-c. The transparent conductive oxide may include indium-tin-oxide, aluminum-zinc-oxide, fluorinated tin oxide, or others known in the art. In one or more embodiments, the conductive oxide portion of the hard film 110 is discontinuously disposed on the glass-based substrate 120. In other words, conductive portions of the hard film 110 may be disposed on discrete regions of the glass-based substrate 120 (with crack mitigating composite 130a-c). The discrete regions with the film form patterned or coated regions (not shown), while the discrete regions without the film form unpatterned or uncoated regions (not shown). In one or more embodiments, the patterned or coated regions and unpatterned or uncoated regions are formed by disposing the film 110 continuously on a surface of the crack mitigating composite 130a-c, which in turn is on the surface of the glass-based substrate 120 and then selectively etching away the film 110 in the discrete regions so that there is no film 110 in those discrete regions. The film 110 may be etched away using an etchant, for example, HCl or $FeCl_3$ in aqueous solutions, for example, the commercially available TE-100 etchant from Transene Co. In one or more embodiments, the crack mitigating composite 130a-c is not significantly degraded or removed by the etchant. Alternatively, the film 110 may be selectively deposited onto discrete regions of a surface of the crack mitigating composite 130a-c, which, in turn, is on the surface of the glass-based substrate 120 to form the patterned or coated regions and unpatterned or uncoated regions.

In one or more embodiments of the laminate articles 100a-c having a hard film 110 that includes conductive oxide portions or discrete regions, the uncoated regions have a total reflectance that is similar to the total reflectance of the coated regions. In one or more specific embodiments, the unpatterned or uncoated regions have a total reflectance that differs from the total reflectance of the patterned or coated regions by about 5% or less, 4.5% or less, 4% or less, 3.5% or less, 3% or less, 2.5% or less, 2.0% or less, 1.5% or less or even 1% or less, and all ranges and sub-ranges between the foregoing values, across a visible wavelength in the range from about 400 nm to about 800 nm, from about 450 nm to about 650 nm, from about 420 nm to about 680 nm or even from about 400 nm to about 700 nm.

In some embodiments of the present disclosure, articles 100a-c comprising a crack mitigating composite 130a-c and a hard film 110, which may include indium-tin-oxide or other transparent conductive oxides, exhibit resistivity that is acceptable for use of such articles in touch sensing devices. In one or more embodiments, the films 110, when present in the articles disclosed herein, exhibit a sheet resistance of about 100 ohm/square or less, 80 ohm/square or less, 50 ohm/square or less, or even 30 ohm/square or less. In such embodiments, the film may have a thickness of about 200 nm or less, 150 nm or less, 100 nm or less, 80 nm or less, 50 nm or less or even 35 nm or less, and all ranges and sub-ranges between the foregoing values. In one or more specific embodiments, such films, when present in the article 100a-c, exhibit a resistivity of $10 \times 10^{-4}$ ohm-cm or less, $8 \times 10^{-4}$ ohm-cm or less, $5 \times 10^{-4}$ ohm-cm or less, or even $3 \times 10^{-4}$ ohm-cm or less, and all ranges and sub-ranges between the foregoing values. Thus, the hard films 110, when present in the articles 100a-c disclosed herein with conductive oxide portions, can favorably maintain the electrical and optical performance expected of transparent conductive oxide films and other such films used in touch sensor applications, including projected capacitive touch sensor devices.

The disclosure herein can also be applied to articles 100a-c which are not interactive or for display; for example, such articles may be used in a case in which a device has a glass front side that is used for display and can be interactive, and a back side that might be termed "decorative" in a very broad sense, meaning that backside can be "painted" in some color, have art work or information about the manufacturer, model and serial number, texturing or other features.

With regard to the optical properties of the laminate articles 100a-c (see FIGS. 1A-1C), the hard film 110 can comprise a scratch-resistant material, for example AlN, $Si_3N_4$, $AlO_xN_y$, and $SiO_xN_y$, which possesses a relatively high refractive index in the range from about 1.7 to about 2.1. The glass-based substrates 120 employed in laminate articles 100a-c typically have refractive indices in the range from about 1.45 to about 1.65. Further, the crack mitigating composite 130a-c employed in articles 100a-c typically has a refractive index somewhere near or between the refractive index ranges common to the substrate 120 and the film 110 (when present). The differences in these refractive index values (e.g., between the substrate 120 and the crack mitigating composite 130a-c) can contribute to undesirable optical interference effects. In particular, optical interference at the interfaces 150 and/or 160 (see FIGS. 1A-1C) can lead to spectral reflectance oscillations that create apparent color observed in the articles 100a-c. The color shifts in reflection with viewing angle due to a shift in the spectral reference oscillations with incident illumination angle. Ultimately, the observed color and color shifts with incident illumination angle are often distracting or objectionable to device users, particularly under illumination with sharp spectral features, for example, fluorescent lighting and some LED lighting. Alternately or additionally, the crack mitigating composite 130a-c and/or hard film 110 may have layers or sub-layers with alternating high and low refractive indices, thus providing an optical impedance tuning effect which can be used to lower reflectance, control reflectance to match a target, lower color, or lower color shifts of the coated article, as further illustrated in the Examples below.

According to aspects of this disclosure, observed color and color shifts in the articles 100a-c can be reduced by minimizing reflectance at one or both of the interfaces 150 and 160 (see FIGS. 1A-1C), thus reducing reflectance oscillations and reflected color shifts for the entire article. In some aspects, the density, thickness, composition and/or porosity of the crack mitigating composite 130a-c can be tailored to minimize such reflectance at the interfaces 150 and 160. For example, configuring the layer 130a-c according to the foregoing aspects can reduce the amplitudes and/or oscillations of the reflectance across the visible spectrum.

As used herein, the term "amplitude" includes the peak-to-valley change in reflectance or transmittance. As also used herein, the term "transmittance" is defined as the percentage of incident optical power within a given wavelength range transmitted through the articles 100a-c. The term "average transmittance" refers to the spectral average of the light transmission multiplied by the luminous efficiency function, as described by CIE standard observer. The term "reflectance" is similarly defined as the percentage of incident optical power within a given wavelength range that is reflected from the articles 100a-c. In general, transmittance and reflectance are measured using a specific line width. Furthermore, the phrase "average amplitude" includes the peak-to-valley change in reflectance or transmittance averaged over every possible 100 nm wavelength range within the optical wavelength regime. As used herein, the "optical wavelength regime" includes the range from about 400 nm to about 800 nm.

According to one or more embodiments, the laminated articles 100a-c exhibit an average transmittance of 85% or greater over the visible spectrum. In some embodiments, the laminated articles 100a-c can exhibit an average transmittance of 80% or greater, 82% or greater, 85% or greater, 90% or greater, 91% or greater, 92% or greater, 93% or greater, 94% or greater, or 95% or greater, and all ranges and sub-ranges between the foregoing values.

In some aspects, the articles 100a-c exhibit an average total reflectance of 20% or less over the visible spectrum. Certain embodiments of the articles 100a-c, for example, exhibit a total reflectance of 20% or less, 15% or less, 10% or less, 9% or less, 8% or less, 7% or less, 6% or less, or 5% or less, 4% or less, 3% or less, 2% or less, and all ranges and sub-ranges between the foregoing values.

In accordance with one or more embodiments, the articles 100a-c have a total reflectivity that is the same or less than the total reflectivity of the glass-based substrate 120. In one or more embodiments, the articles 100a-c exhibit a relatively flat transmittance spectrum, reflectance spectrum or transmittance and reflectance spectrum over the optical wavelength regime. In some embodiments, the relatively flat transmittance and/or reflectance spectrum includes an average oscillation amplitude of about 5 percentage points or less along the entire optical wavelength regime, or wavelength range segments in the optical wavelength regime. Wavelength range segments may be about 50 nm, about 100 nm, about 200 nm or about 300 nm, and all ranges and sub-ranges between the foregoing values. In some embodiments, the average oscillation amplitude may be about 4.5 percentage points or less, about 4 percentage points or less, about 3.5 percentage points or less, about 3 percentage points or less, about 2.5 percentage points or less, about 2 percentage points or less, about 1.75 percentage points or less, about 1.5 percentage points or less, about 1.25 percentage points or less, about 1 percentage point or less, about 0.75 percentage points or less, about 0.5 percentage points or less, about 0.25 percentage points or less, or about 0 percentage points, and all ranges and sub-ranges therebetween. In one or more specific embodiments, the articles 100 and 100a exhibit a transmittance over a selected wavelength range segment of about 100 nm or 200 nm over the optical wavelength regime, wherein the oscillations from the spectra have a maximum peak of about 80%, about 82%, about 84%, about 86%, about 87%, about 88%, about 89%, about 90%, about 91%, about 92%, about 93%, about 94%, or about 95%, and all ranges and sub-ranges therebetween.

In some embodiments, the relatively flat average transmittance and/or average reflectance includes maximum oscillation amplitude, expressed as a percent of the average transmittance or average reflectance, along a specified wavelength range segment in the optical wavelength regime. The average transmittance or average reflectance of the laminated articles 100a-c would also be measured along the same specified wavelength range segment in the optical wavelength regime. The wavelength range segment may be about 50 nm, about 100 nm or about 200 nm. In one or more embodiments, the articles 100 and 100a exhibit an average transmittance and/or average reflectance with an average oscillation amplitude of about 10% or less, about 5% or less, about 4.5% or less, about 4% or less, about 3.5% or less, about 3% or less, about 2.5% or less, about 2% or less, about 1.75% or less, about 1.5% or less, about 1.25% or less, about 1% or less, about 0.75% or less, about 0.5% or less, about 0.25% or less, or about 0.1% or less, and all ranges and sub-ranges therebetween. Such percent-based average oscillation amplitudes may be exhibited by the article along wavelength range segments of about 50 nm, about 100 nm, about 200 nm or about 300 nm, in the optical wavelength regime. For example, an article according to this disclosure may exhibit an average transmittance of about 85% along the wavelength range from about 500 nm to about 600 nm, which is a wavelength range segment of about 100 nm, within the optical wavelength regime. The article may also exhibit a percent-based oscillation amplitude of about 3% along the same wavelength range (500 nm to about 600 nm), which means that along the wavelength range from 500 nm to 600 nm, the absolute (non-percent-based) oscillation amplitude is about 2.55 percentage points.

Some embodiments pertain to an electronic device incorporating the articles 100a-c disclosed herein (not shown). These electronic devices can include any device or article with a display (e.g., consumer electronics, including mobile phones, tablets, computers, wearables (e.g. watches), navigation systems, and the like), architectural articles, transportation articles (e.g., automotive, trains, aircraft, sea craft, etc.), appliance articles, or any article in which some transparency, scratch-resistance, abrasion resistance or a combination thereof is desired. A mobile phone can include a housing; electrical components that are at least partially inside or entirely within the housing and including at least a controller, a memory, and a display at or adjacent to the front surface of the housing; and a laminated article 100a-c at or over the front surface of the housing such that it is over the display. Additional applications for the articles of the disclosure do not necessarily include an electronic device, such as eyeglasses, sunglasses, windows, automotive or aircraft windshields, or glass-based screen protectors which are laminated to electronic devices using an adhesive.

In one or more embodiments, the method includes disposing the hard film 110 and/or the crack mitigating composite 130a-c via a vacuum deposition process. In particular embodiments, such vacuum deposition processes may utilize temperatures of about 25° C., 50° C., 75° C., 100° C., 200° C., 300° C., 400° C., or more, and all ranges and sub-ranges therebetween. In some embodiments, the crack mitigating composite 130a-c may be formed by a wet process.

In one or more specific embodiments, the method includes controlling the thickness(es) of the crack mitigating composite 130a-c and/or the hard film 110. Controlling the thickness(es) of the crack mitigating composite 130a-c and/or films (e.g., hard film 110) disclosed herein may be performed by controlling one or more processes for forming the crack mitigating composite, stack and/or films so that the crack mitigating composite, stack and/or films are applied having a desired or defined thickness. In some embodiments, the method includes controlling the thickness(es) of the crack mitigating composite 130a-c and/or the hard film 110 to maintain (or enhance, in some cases) the average flexural strength of the glass-based substrate 120, the functional properties of the glass-based substrate 120 and/or the functional properties of the film 110.

In one or more alternative embodiments, the method includes controlling the continuity of the crack mitigating composite 130a-c and/or the hard film 110. Controlling the continuity of the crack mitigating composite 130a or stack 130b may include forming a continuous crack mitigating composite and removing a selected portion(s) of the crack mitigating composite or stack to create a discontinuous crack mitigating composite. In other embodiments, controlling the continuity of the crack mitigating composite or stack may include selectively forming the crack mitigating composite or stack to form a discontinuous crack mitigating composite or stack. Such embodiments may use a mask, an etchant and combinations thereof to control the continuity of the crack mitigating composite 130a-c.

In one or more embodiments, the method may include creating a controlled elastic modulus in the crack mitigating composite 130a-c. The method may further include controlling the intrinsic film stresses of the crack mitigating composite 130a, stack 130b and/or the film 110 through control of deposition and fabrication processes of the crack mitigating composite or stack.

The method may include disposing an additional film, as described herein, on the glass-based substrate 120. In one or more embodiments, the method may include disposing the additional film on the glass-based substrate such that the additional film is disposed between the glass-based substrate 120 and the crack mitigating composite 130a-c, between the crack mitigating composite 130a-c and the hard film 110 or, such that the film 110 is between the crack mitigating composite 130a-c and the additional film. Alternatively, the method may include disposing the additional film on the opposite major surface of the glass-based substrate 120 from the surface on which the film is disposed.

In one or more embodiments, the method includes strengthening the glass-based substrate 120 before or after disposing the crack mitigating composite 130a-c, hard film 110 and/or an additional film on the glass-based substrate. The glass-based substrate 120 may be strengthened chemically or otherwise. The glass-based substrate 120 may be strengthened after disposing the crack mitigating composite 130a-c on the glass-based substrate 120 but before disposing the film 110 on the glass-based substrate. The glass-based substrate 120 may be strengthened after disposing the crack mitigating composite 130a-c and the film 110 on the glass-based substrate 120 but before disposing an additional film (if any) on the glass-based substrate. Where no additional film is utilized, the glass-based substrate 120 may be strengthened after disposing the crack mitigating composite 130a-c and the film 110 on the glass-based substrate.

The following examples represent certain non-limiting embodiments of the disclosure.

Example 1

Strength of Laminated Articles Having Five-Layer $Al_2O_3$/Polyimide Crack Mitigating Composites and Silicon Nitride Hard Films Sample laminated articles designated Examples 1A-1C ("Exs. 1A, 1B, 1A1, 1B1 and 1C") were formed by providing Corning® 2320 Gorilla Glass® glass-based substrates according to the following composition: $SiO_2$ of about 67 mol %, $B_2O_3$ of about 4 mol %, $Al_2O_3$ of about 13 mol %, $Na_2O$ of about 14 mol %, and MgO of about 2.5 mol %. The glass-based substrates had a thickness of 1 mm (Exs. 1A, 1B) or 0.7 mm (Exs. 1A1, 1B1 and 1C). The glass-based substrates were strengthened by ion exchange to provide a surface CS of about 800 MPa and a DOC of about 40 μm. The ion-exchange process was carried out by immersing the glass-based substrate in a molten potassium nitrate ($KNO_3$) bath that was heated to a temperature in the range from about 350° C. to 450° C. The glass-based substrates were immersed in the bath for a duration of 3-8 hours to achieve the surface CS and DOC. After completing the ion exchange process, the glass-based substrates of Examples 1A-1C were cleaned in a 2% concentration KOH detergent solution, supplied by Semiclean KG, having a temperature of about 50° C.

In Example 1, the Ex. 1C sample represents a control as it only contains a glass-based substrate. Similarly, the Exs. 1A and 1A1 samples also serve as a control because they possess a $SiN_x$ hard film having a thickness of about 440 nm and lack a crack mitigating composite. In the Exs. 1A and 1A1 samples, the $SiN_x$ hard film was deposited in a Plasma-Therm Versaline HDPCVD system at 200° C. with a silane precursor gas and nitrogen gas.

In Example 1, samples designated Exs. 1B and 1B1 were also prepared. For the Exs. 1B, 1B1 samples, strengthened glass-based substrates and hard films according to the Ex. 1A or 1A1 condition (e.g., a $SiN_x$ film having a thickness of about 440 nm and 0.7 mm or 1 mm thick glass-based substrates) were prepared. In addition, Exs. 1B and 1B1 each possess a crack mitigating composite comprising a five-layer sequence of $Al_2O_3$ and polyimide ("PI") layers having the following thicknesses: 10 nm $Al_2O_3$ (over the substrate)/75 nm PI/75 nm $Al_2O_3$/75 nm PI/75 nm $Al_2O_3$ (immediately below the hard film).

Figure 8:
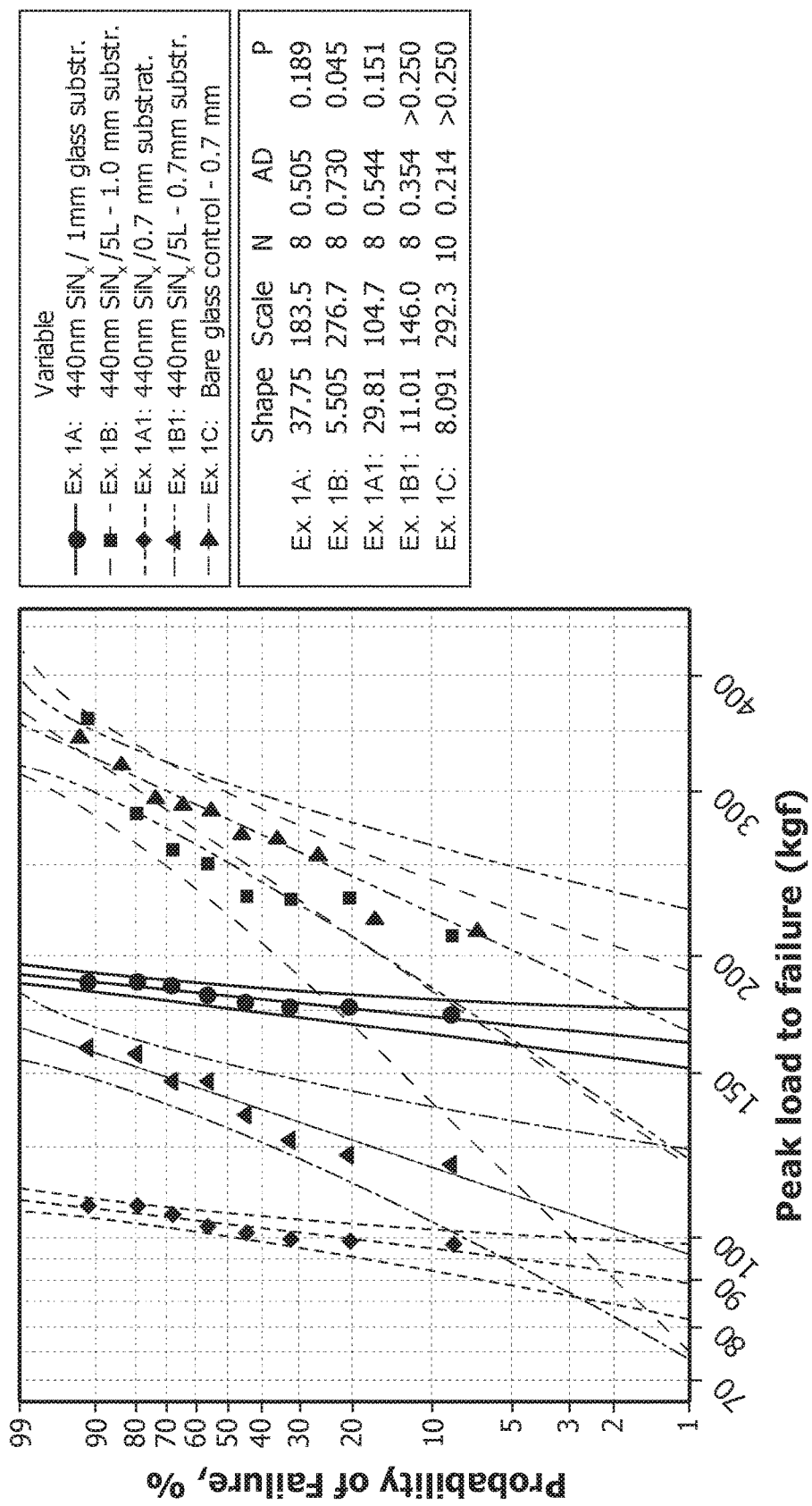
FIG. 8 is a graph presenting ring-on-ring load-to-failure performance of a glass-based substrate control (Example 1C); articles comprising glass-based substrates (1 mm and 0.7 mm thick) having silicon nitride hard films (440 μm thick) (Examples 1A and 1A1, respectively); and articles comprising glass-based substrates (1 mm and 0.7 mm thick) having a silicon nitride hard film (440 μm) and a five-layer crack mitigating composite (Examples 1B and 1B1, respectively) according to aspects of this disclosure.

Ring-on-ring (ROR) load to failure testing was used to demonstrate the retention of average flexural strength of Exs. 1A-1C, as shown in FIG. 8. For ROR load-to-failure testing, the side with the film and/or crack mitigating composite was placed in tension. The ROR load-to-failure testing parameters included a contact radius of 1.6 mm (0.063 inches), a cross-head speed of 1.2 mm/minute (0.047 inches/min), a load ring diameter of 1.27 mm (0.5 inches), and a support ring diameter of 2.54 cm (1 inch). Before testing, an adhesive film was placed on both sides of the sample being tested to contain broken glass shards.

As illustrated in FIG. 8, the addition of a crack mitigating composite (as comprising a five-layer $Al_2O_3$/PI layer sequence) to a laminate article with a $SiN_x$ hard film and a glass-based substrate (Exs. 1B (1 mm thick substrate) and 1B1 (0.7 mm thick substrate)) resulted in laminate articles with about a 36% and 42% increase (1 mm thick, and 0.7 mm thick substrates) in failure load relative to similarly-configured laminate articles without such a crack mitigating composite (i.e., from Ex. 1A to 1B and from Ex. 1A1 to 1B1). As also shown by FIG. 8, the inclusion of a scratch-resistant film with a thickness of 440 nm (see Exs. 1B and 1B1) without any cracking mitigating composite significantly reduces the average flexural strength of the glass-based substrate (see Ex. 1C). Given the relatively little difference in the increase in the average flexural strength observed between the two sets of samples having differing glass-based substrate thicknesses (i.e., 36% and 42%, respectively), it is apparent that the thickness of the glass-based substrate has little influence on the pronounced effect from the crack mitigating composite.

Example 2

Figure 9A:
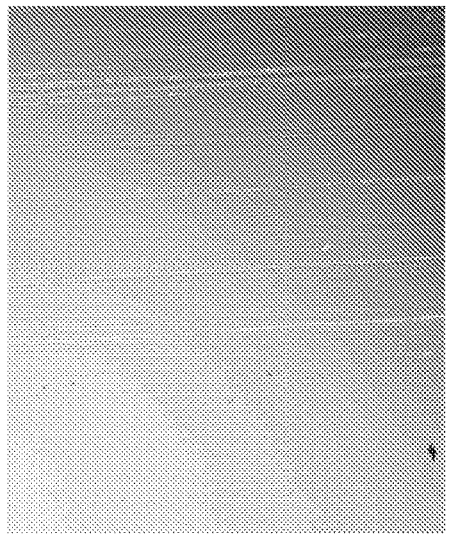
FIGS. 9A-9D are optical microscopy images from articles comprising glass-based substrates having a hard film comprising a silicon nitride layer and a fluorosilane layer, and no crack mitigating composite (9A), a crack mitigating composite comprising three thick alumina and two thin polyimide layers (9B), a crack mitigating composite comprising three thin alumina and two thick polyimide layers (9C), or a crack mitigating composite comprising polyimide (9D).
Figure 9B:
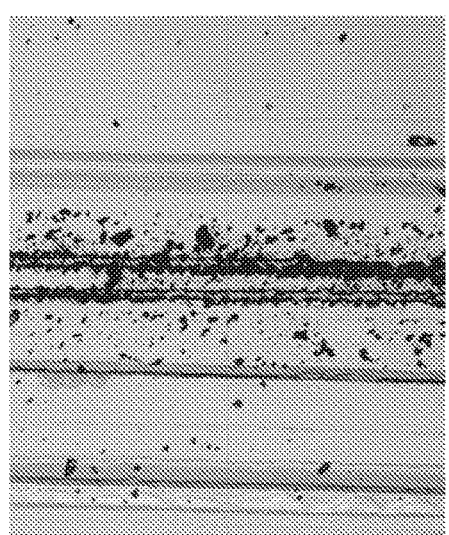
Figure 9C:
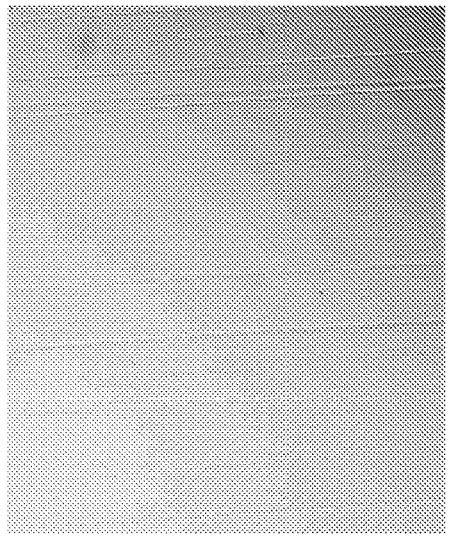
Figure 9D:
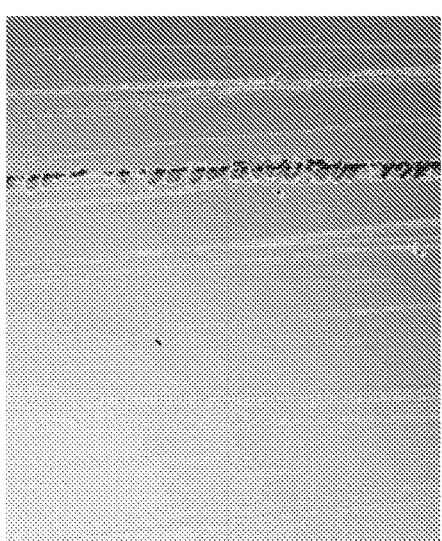

Scratch Resistance of Laminated Articles Having Five-Layer $Al_2O_3$/Polyimide Crack Mitigating Composites and Silicon Nitride Hard Films Referring now to FIGS. 9A-9D, optical microscopy images from laminate articles comprising glass-based substrates having a hard film comprising a 2 micron thick a silicon nitride layer and a fluorosilane layer, and no crack mitigating composite (FIG. 9A), a crack mitigating composite comprising three thick alumina and two thin polyimide layers (FIG. 9B), a crack mitigating composite comprising three thin alumina and two thick polyimide layers (FIG. 9C), or a crack mitigating layer comprising polyimide alone (FIG. 9D). Each of the samples depicted in FIGS. 9A-9D were subjected to a Garnet Scratch Test with a 4 kg load. More particularly, the laminate articles depicted in FIG. 9A were configured with a fluorosilane and silicon nitride multi-layer hard film directly over a glass-based substrate. The laminate articles depicted in FIGS. 9B and 9C were configured with a fluorosilane and silicon nitride multi-layer hard film, followed by a five-layer crack mitigating composite layer directly over a glass-based substrate. The five layer crack mitigating composite employed in the laminate articles of FIGS. 9B and 9C comprised: $Al_2O_3$/PI/$Al_2O_3$/PI/$Al_2O_3$ with thicknesses of: 100/50/100/50/20 nm (FIG. 9B) and 25/125/25/125/20 nm (FIG. 9C) with the 20 nm $Al_2O_3$ layer discovered to act as an adhesion promoting layer when placed adjacent to the glass substrate. In contrast, placing polyimide layers or $SiO_2$ layers immediately adjacent to the glass substrate with similar crack mitigating composite structures was found to result in poor adhesion and scratch resistance in such laminate articles. Finally, the laminate articles depicted in FIG. 9D were fabricated with a fluorosilane and silicon nitride multi-layer hard film, and a polyimide (PI) layer with a 450 nm thickness disposed directly over a glass-based substrate. In particular, the laminate articles of FIG. 9D served as a comparative example having a polymer-only (not a composite) crack mitigating layer. As is evident from the optical microscopy images of FIGS. 9A-9D, the laminate articles with the five layer crack mitigating composite structures (FIGS. 9B and 9C), consistent with aspects of the disclosure, demonstrate comparable scratch resistance as the control sample without a crack mitigating composite (FIG. 9A). In contrast, the laminate articles with a mono-layer-type crack mitigating layer comprising only polyimide (FIG. 9D) were prone to delamination during the Garnet Scratch Test.

Example 3

Figure 10:
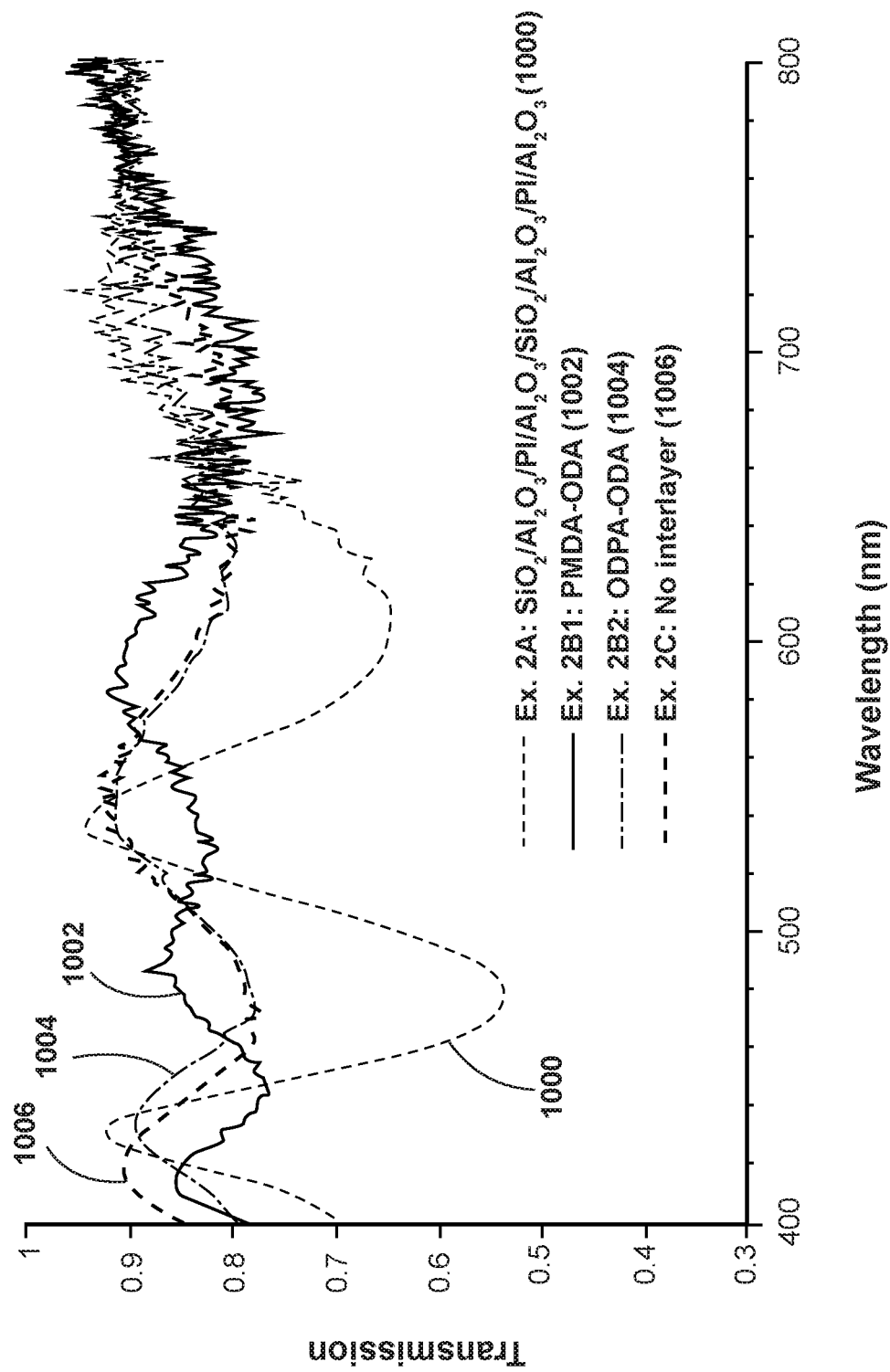
FIG. 10 is a graph presenting optical transmittance data as a function of wavelength in the visible spectrum for articles comprising a glass-based substrate and a silicon nitride hard film, with no crack mitigating composite (Ex. 2C), a crack mitigating composite comprising a polyimide (Exs. 2B1, 2B2) and a crack mitigating composite comprising alumina and polyimide layers (Ex. 2A), according to some embodiments of the disclosure.

Optical Properties of Laminated Articles Having Seven-Layer $Al_2O_3$/Polyimide Crack Mitigating Composites and Silicon Nitride Hard Films In FIG. 10, the transmittance spectra are provided for laminated articles designated without a crack mitigating composite and hard film (Ex. 2C, a glass-based substrate control) and three sets of samples with differing crack mitigating composites (Exs. 2A, 2B1 and 2B2). More particularly, the laminate article designated Ex. 2A includes a crack mitigating composite over a glass-based substrate with the following structure and thicknesses: $SiO_2$ (over the substrate)/$Al_2O_3$/PI/$Al_2O_3$/PI/$Al_2O_3$/PI/$Al_2O_3$ and 80/10/50/10/80/10/50/20 nm. Further, the laminate articles designated Exs. 2B1 and 2B2 include polyimide layers derived form PMDA-ODA and ODPA-ODA, respectively, having thicknesses of 450 nm and 150 nm, respectively. As a hard film deployed over a crack mitigating composite would dominate the optical properties of the laminate articles of the disclosure, it is judged that samples without such hard films are representative for purposes of demonstrating the relative lack of any effect of the crack mitigating composite on the overall optical properties of the laminate articles of the disclosure.

As shown in FIG. 10, the samples with the polyimide crack mitigating composite layers (Exs. 2B1 and 2B2, traces 1002 and 1004, respectively) have relatively similar levels of optical transmission in the visible wavelength range as compared to the baseline laminate article sample without a crack mitigating composite (Ex. 2C, trace 1006), indicating that PI layers have high optical transmissivity. While the laminate article sample with a seven-layer crack mitigating composite (Ex. 2A, trace 1000) exhibits somewhat more oscillations in transmittance in the visible spectrum as compared to the other samples, it still demonstrates high optical transmissivity over the full visible spectrum. Without being bound by theory, it is also believed that the thicknesses and compositions of the various layers within crack mitigating composite, comparable to the laminate article of Ex. 2A, can be designed to eliminate or otherwise minimize the optical interference effects observed in the results depicted in FIG. 10 for Ex. 2A. For example, a laminate article consistent with the principles of the disclosure with a crack mitigating composite with a more-optimized optical layer structure is detailed below in Example 6.

Example 4

Figure 11B:
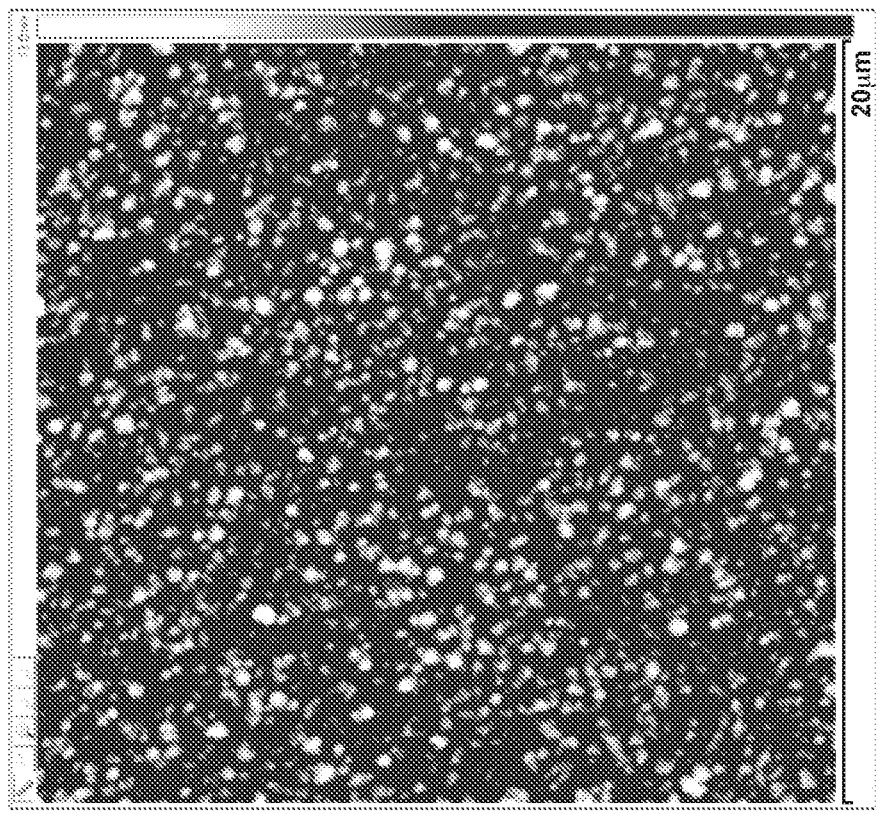
FIGS. 11A and 11B are atomic force microscopy (AFM) images for articles comprising a glass-based substrate, a silicon nitride hard film and a crack mitigating composite comprising alumina and polyimide layers (11A) and no crack mitigating composite (11B), according to some embodiments of the disclosure.
Figure 11A:
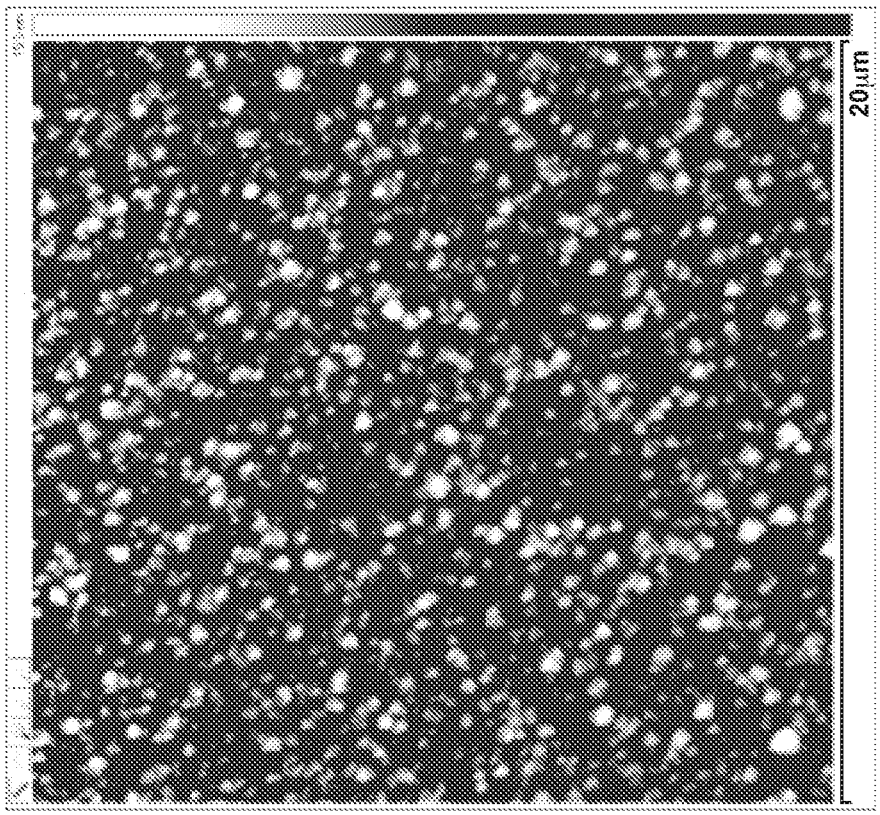

Surface Roughness of Laminated Articles Having $Al_2O_3$/Polyimide Crack Mitigating Composites and Silicon Nitride Hard Films Referring now to FIGS. 11A and 11B, atomic force microscopy (AFM) images are provided for laminate articles comprising a glass-based substrate, a silicon nitride hard film having a thickness of 440 nm and a crack mitigating composite comprising alumina and polyimide layers (FIG. 11A), according to some embodiments of the disclosure, and no crack mitigating composite (FIG. 11B). In FIGS. 11A and 11B, the whiter regions correspond to peaks and other surface features indicative of the overall surface roughness of these samples. Further, the root mean squared (RMS) roughness was measured on these samples using atomic force microscopy (AFM) techniques within a 2 micron×2 micron window on the outer surface of the respective silicon nitride films of these samples, as shown in FIGS. 11A and 11B. In particular, the sample depicted in FIG. 11A, with a crack mitigating composite and a silicon nitride hard film, had a surface roughness (over the silicon nitride film) of 1.68 nm. In comparison, the sample depicted in FIG. 11B, with a silicon nitride hard film and no crack mitigating composite, had a surface roughness (over the silicon nitride film) of 1.55 nm. Accordingly, the use of the crack mitigating composite only resulted in a nominal increase in surface roughness (i.e., from 1.55 nm to 1.68 nm), which is virtually indistinguishable when viewing the surface of the samples shown in FIGS. 11A and 11B. As the exterior surface roughness of laminated articles for the applications envisioned in the disclosure can contribute to scratch resistance, wear resistance and low friction performance, the laminated articles of the disclosure, with their crack mitigating composites and layers, are particularly advantageous in that they offer other improved properties (i.e., strength retention) without significantly degrading the exterior surface roughness of the article.

Example 5

Scratch Resistance of Laminated Articles Having Five-Layer $Al_2O_3$/Polyimide and BaF Crack Mitigating Composites and Silicon Nitride Hard Films Referring now to FIGS. 12A and 12B, optical microscopy images are depicted from an article comprising a glass-based substrate, a silicon nitride hard film and a barium fluoride crack mitigating composite, as subjected to a Berkovich ramped scratch test (0 to 150 mN) (FIG. 12A); and from an article comprising a glass-based substrate, a silicon nitride hard film and a crack mitigating composite comprising alumina and polyimide layers, as subjected to a Berkovich ramped scratch test (FIG. 12B). In FIGS. 12A and 12B, the scratched surfaces of the samples are shown and the scratch test was conducted from left to right, with increasing load levels as the stylus was moved from left to right over the sample. The load levels are increased in a linear fashion as a function of distance moved over the sample. Accordingly, the distance traveled by the stylus up to the point of a delamination can be used to measure the load level associated with the delamination.

As is evident from the results of the Berkovich ramped test on the laminate article depicted in FIG. 12A, which includes a crack mitigating composite of barium fluoride with a thickness of 300 nm and a silicon nitride hard film having a thickness of 2 μm, a delamination was observed at about 100 mN during the test. That is, the wear track observed in the samples shown in FIG. 12A is a scratch with a narrow width that substantially widens upon the delamination in the last third of the wear track at the right-hand side of the sample. In contrast, the laminate article depicted in FIG. 12B, which includes a crack mitigating composite with a five-layer structure of $Al_2O_3$/PI/$Al_2O_3$/PI/$Al_2O_3$ having thicknesses of 20 nm/50 nm/100 nm/50 nm/100 nm and a silicon nitride hard film having a thickness of 2 μm did not experience any delamination up to a scratch load of 150 mN. That is, the stylus was moved over the sample shown in FIG. 12B from left to right with an increasing load up to 150 mN and no evidence of any delamination was observed.

Example 6

Optical Properties of a Laminate Article Having a Five-Layer $Al_2O_3$/Polyimide Crack Mitigating Composite and a $SiO_2$/$AlO_xN_y$ Scratch-Resistant Film As detailed below in Table 1, a laminated article was prepared with a crack mitigating composite and hard film structure, as configured to optimize optical properties, according to an embodiment of the disclosure. In particular, a crack mitigating composite that comprises alternating polyimide and $Al_2O_3$ layers was formed over a primary surface of a glass substrate. As also demonstrated below in Table 1, a scratch-resistant film that comprises alternating $SiO_2$ and $AlO_xN_y$ layers was formed over the crack mitigating composite. The individual layer materials were fabricated by thermal and e-beam evaporation for the polyimide and $Al_2O_3$ layers, respectively, and reactive sputtering for the $SiO_2$ and $AlO_xN_y$ layers. Further, the $AlO_xN_y$ layers were fabricated such that each such layer comprises about 10 mol % oxygen.

The individual layer optical properties of the laminated articles were characterized by spectroscopic ellipsometry and then placed into a thin film optical model to develop the structure listed below in Table 1. That is, optical modeling was conducted to optimize the layer thicknesses to demonstrate optimized optical performance of a laminate article comprising a five-layer crack mitigating composite. As listed below in Table 1, the refractive index values for each of the layers associated with crack mitigating composite and the scratch-resistant film are reported from optical measurements at a reference wavelength of 550 nm.

TABLE 1

| Layer | Material | Refractive Index | Thickness (nm) |
|---|---|---|---|
| N/A | Air | 1 | N/A |
| 1 | $SiO_2$ | 1.4685 | 102.9 |
| 2 | $AlO_xN_y$ | 1.9540 | 32.7 |
| 3 | $SiO_2$ | 1.4685 | 14.6 |
| 4 | $AlO_xN_y$ | 1.9540 | 2000 |
| 5 | $SiO_2$ | 1.4685 | 8.1 |
| 6 | $AlO_xN_y$ | 1.9540 | 39.2 |
| 7 | $SiO_2$ | 1.4685 | 16.7 |
| 8 | $AlO_xN_y$ | 1.9540 | 14.0 |
| 9 | $Al_2O_3$ | 1.6629 | 6.53 |
| 10 | PMDA-ODA polyimide | 1.6862 | 41.3 |
| 11 | $Al_2O_3$ | 1.6629 | 67.3 |
| 12 | PMDA-ODA polyimide | 1.6862 | 114.0 |
| 13 | $Al_2O_3$ | 1.6629 | 24.8 |
| Substrate | Glass | 1.5063 | |

Figure 13A:
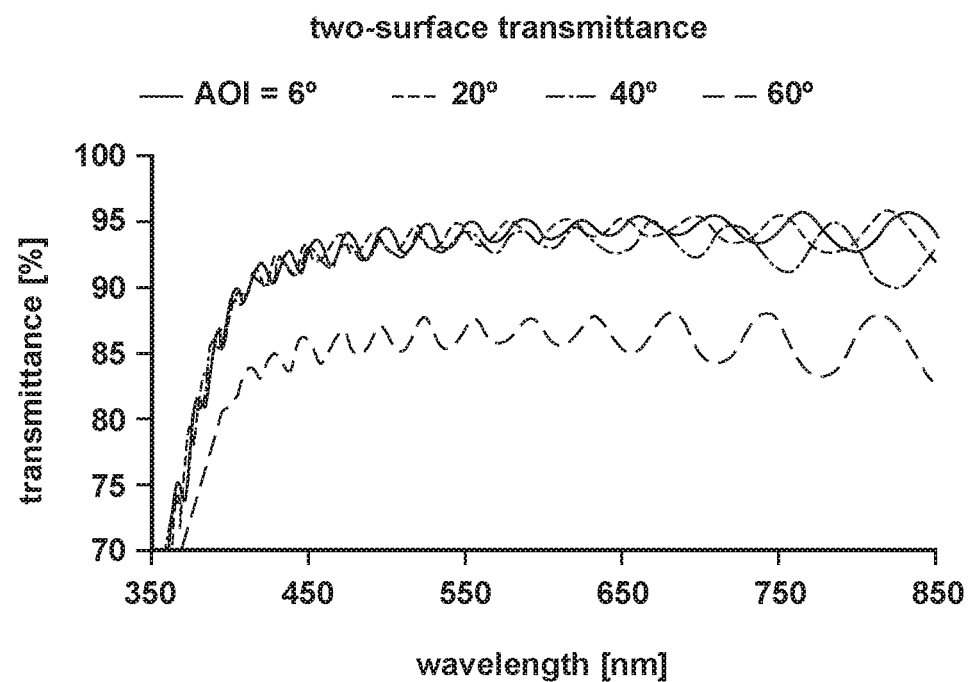
FIGS. 13A and 13B provide two-surface transmittance (i.e., as including both sides of the coated laminated article) and first-surface reflectance (i.e., as considering only the coated side of the laminated article) modeled optical data, respectively, as developed on a laminate article configured with a five-layer $Al_2O_3$/polyimide crack mitigating composite and a $SiO_2/AlO_xN_y$ scratch-resistant film, according to an embodiment of the disclosure.
Figure 13B:
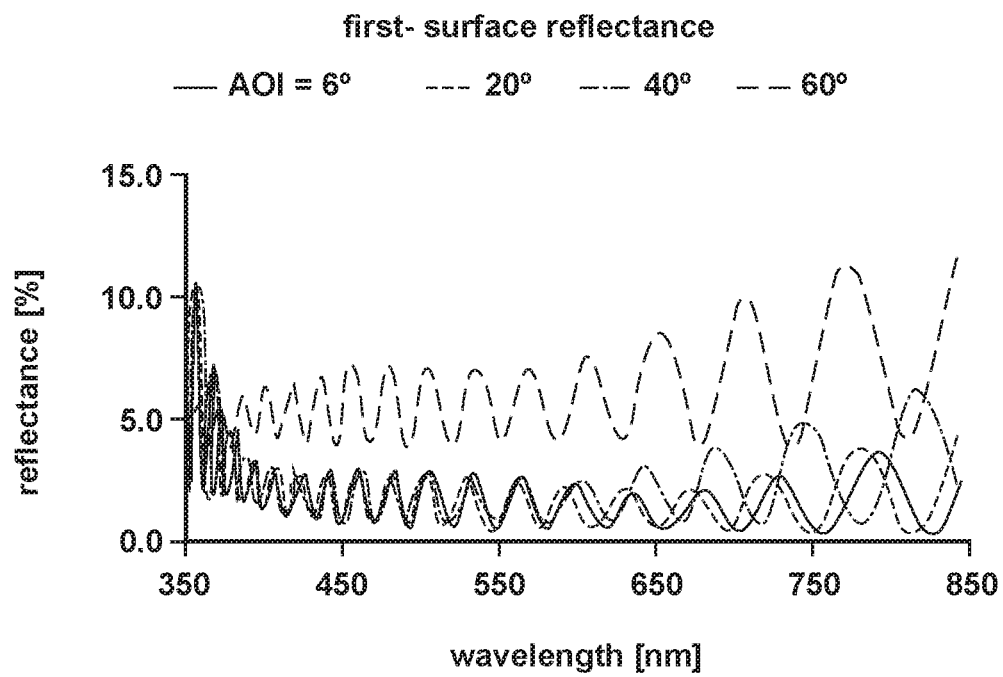

Referring now to FIGS. 13A and 13B, two-surface transmittance (i.e., as including both sides of the coated laminated article) and first-surface reflectance (i.e., as considering only the coated side of the laminated article) modeled data are presented, as obtained from a laminate article that is configured as listed in Table 1. The two-surface transmittance was for a 1-mm substrate under the assumption that the adsorption in the glass could be safely ignored. Accordingly, the results would not be different for 0.7 mm thickness (or other thickness) under the same assumption and, therefore, no particular thickness is shown in Table 1. As shown in FIG. 13A, the transmittance at angle of incidence (AOI) of 6, 20 and 40 degrees is above 90% in the wavelength range of 420 to 700 nm. Further, the transmittance at angle of incidence (AOI) of 60 degrees is above 84% within the same wavelength range. As shown in FIG. 13B, the reflectance at AOI of 6, 20 and 40 degrees is below 5% within the same wavelength range of 420 to 700 nm. Further, the reflectance at AOI of 60 degrees is below 10% for the same wavelength range.

Figure 14A:
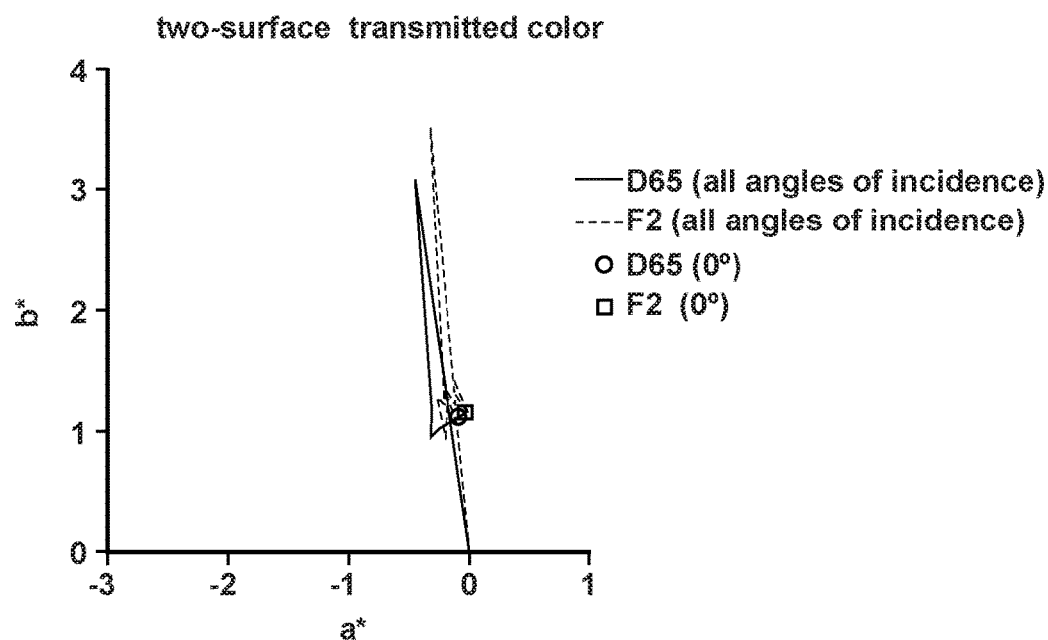
FIGS. 14A and 14B provide two-surface transmitted color and first-surface reflected color modeled optical data, respectively, as developed on a laminate article configured with a five-layer $Al_2O_3$/polyimide crack mitigating composite and a $SiO_2/AlO_xN_y$ scratch-resistant film, according to an embodiment of the disclosure.
Figure 14B:
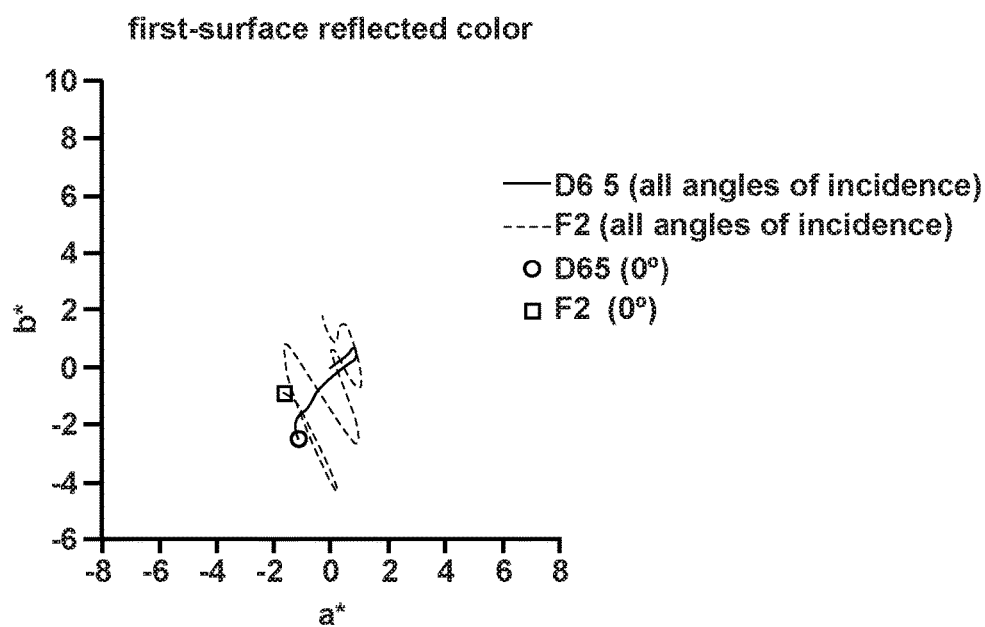

Referring now to FIGS. 14A and 14B, two-surface transmitted color and first-surface reflected color modeled data are presented, as obtained from a laminate article that is configured as listed in Table 1. The color data shown in FIGS. 14A and 14B are such that positive values are red and negative values are green for a*, and positive values are yellow and negative values are blue for b*. More particularly, the estimated measurements shown in FIGS. 14A and 14B are made for all angles of incidence between 0 and 90 degrees with D65 and F2 standard illuminants, as understood by those with ordinary skill in the field of the disclosure. With regard to FIG. 14A, the transmitted color is between 0 and −1 in the a* coordinate and between 0 and +4 in the b* coordinate, for all angles of incidence. With regard to FIG. 14B, the reflected color is between −2 and +2 in the a* coordinate and between −5 and +2 for the b* coordinate, for all angles of incidence.

Figure 15:
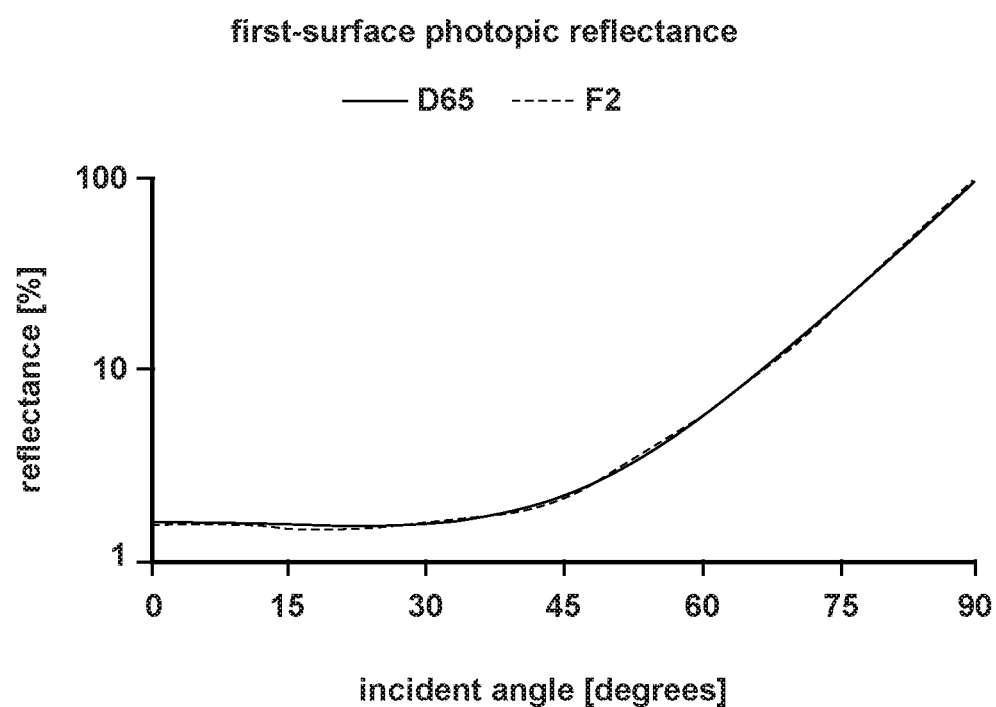
FIG. 15 provides first-surface photopic reflectance modeled optical data, as developed on a laminate article configured with a five-layer $Al_2O_3$/polyimide crack mitigating composite and a $SiO_2/AlO_xN_y$ scratch-resistant film, according to an embodiment of the disclosure.

Referring now to FIG. 15, first-surface photopic reflectance modeled optical data are presented, as obtained from a laminate article that is configured as listed in Table 1. The estimated measurements shown in FIG. 15 are made for all angles of incidence between 0 and 90 degrees both D65 and F2 standard illuminants. From FIG. 15, it is evident that the reflectance is less than 2% for angles of incidence between 0 and 40 degrees, and the reflectance is less than 6% for angles of incidence between 0 and 60 degrees.

While the disclosure has been described with respect to a limited number of embodiments for the purpose of illustration, those skilled in the art, having benefit of this disclosure, will appreciate that other embodiments can be devised which do not depart from the scope of the disclosure as disclosed herein. Accordingly, various modifications, adaptations and alternatives may occur to one skilled in the art without departing from the spirit and scope of the present disclosure.

We claim:

1. An article, comprising:
a glass-based substrate comprising a first major surface opposing a second major surface;
a crack mitigating composite over the first major surface, the composite comprising at least one inorganic element and a polymeric element;
a first film layer disposed on the crack mitigating composite, the film comprising an elastic modulus greater than or equal to the elastic modulus of the glass-based substrate; and
a second film layer disposed on the second major surface, wherein the second film layer comprises a multi-layer anti-reflection coating, and the first film layer comprises at least one of a metal-containing oxide, a metal-containing oxynitride, a metal-containing nitride, a metal-containing carbide, a silicon-containing polymer, a carbon, a semiconductor, and combinations thereof, and wherein the at least one inorganic element of the crack mitigating composite comprises two or more inorganic layers and the polymeric element corresponds to a polymeric layer, wherein one of the two or more inorganic layers is in contact with the substrate and another of the two or more inorganic layers is in contact with the first film layer.

2. The article of claim 1, wherein the article is characterized by an average flexural strength that is greater than or equal to about 50% of an average flexural strength of the substrate, as measured by ROR testing using an average from five (5) or more samples.

3. The article of claim 1, wherein the first film layer is further characterized by an indentation hardness of greater than or equal to about 8 GPa.

4. The article of claim 1, wherein the inorganic element comprises an oxide, a nitride or an oxynitride, and the polymeric element comprises at least one of a polyimide, a polycarbonate, a polyurethane, a polyester, and a fluorinated polymer.

5. The article of claim 1, wherein the article is further characterized by a light transmissivity of greater than or equal to 50% in the visible spectrum from about 400 nm to about 800 nm.

6. The article of claim 1, wherein the article is further characterized by a pencil hardness of 9H or greater.

7. The article of claim 1, wherein the article is further characterized by a delamination threshold of 150 mN or more, as tested using a Berkovich Ramped Scratch Test on the first film layer.

8. The article of claim 1, wherein the first film layer comprises a multi-layer antireflection coating, and further wherein the crack mitigating composite and the first film layer collectively comprise a photopic average single-side reflectance of less than about 2%.

9. The article of claim 1, wherein the crack mitigating composite is characterized by an elastic modulus of greater than 30 GPa.

10. The article according to claim 1, wherein the inorganic element comprises three inorganic layers with two organic layers of the organic element disposed therebetween.

11. The article according to claim 10, wherein the inorganic element comprises $Al_2O_3$ and the polymeric element comprising a polyimide.

12. An article, comprising:
a glass-based substrate comprising a first major surface opposing a second major surface;
a crack mitigating composite over the first major surface, the composite comprising at least one inorganic element and a polymeric element, wherein the crack mitigating composite is characterized by an elastic modulus ratio between the inorganic element and the polymeric element of greater than 10:1;
a first film layer disposed on the crack mitigating composite, the film comprising an elastic modulus greater than or equal to the elastic modulus of the glass-based substrate; and
a second film layer disposed on the second major surface, wherein the second film layer comprises a multi-layer anti-reflection coating, and the first film layer comprises at least one of a metal-containing oxide, a metal-containing oxynitride, a metal-containing nitride, a metal-containing carbide, a silicon-containing polymer, a carbon, a semiconductor, and combinations thereof, and wherein the at least one inorganic element of the crack mitigating composite comprises two or more inorganic layers and the polymeric element corresponds to a polymeric layer, wherein one of the two or more inorganic layers is in contact with the substrate and another of the two or more inorganic layers is in contact with the first film layer.

13. The article of claim 12, wherein the article is characterized by an average flexural strength that is greater than or equal to about 50% of an average flexural strength of the substrate, as measured by ROR testing using an average from five (5) or more samples.

14. The article of claim 12, wherein:
the inorganic element comprises an oxide, a nitride or an oxynitride, and the polymeric element comprises at least one of a polyimide, a polycarbonate, a polyurethane, a polyester, and a fluorinated polymer;
the article is further characterized by a light transmissivity of greater than or equal to about 50% in the visible spectrum from about 400 nm to about 800 nm; and
the article is further characterized by a pencil hardness of 9H or greater.

15. An article, comprising:
a glass-based substrate comprising a first major surface and a second major surface opposing the first major surface;
a crack mitigating composite over the first major surface, the crack mitigating composite comprising at least one inorganic element and a polymeric element;
a first film layer disposed on the crack mitigating composite; and
a second film layer disposed on the second major surface, wherein the at least one inorganic element of the crack mitigating composite comprises two or more inorganic layers and the polymeric element corresponds to a polymeric layer, wherein one of the two or more inorganic layers is in contact with the substrate and another of the two or more inorganic layers is in contact with the first film layer.

16. The article of claim 15, wherein the second film layer comprises a multi-layer anti-reflection coating.

17. The article of claim 15, wherein the first film layer comprises at least one of a metal-containing oxide, a metal-containing oxynitride, a metal-containing nitride, a metal-containing carbide, a silicon-containing polymer, a carbon, a semiconductor, and combinations thereof.

18. The article of claim 15, wherein the crack mitigating composite is characterized by an elastic modulus ratio between the inorganic element and the polymeric element of greater than 10:1.

19. The article of claim 15, wherein the at least one inorganic element comprises an oxide, a nitride or an oxynitride, and the polymeric element comprises at least one of a polyimide, a polycarbonate, a polyurethane, a polyester, and a fluorinated polymer.

20. The article of claim 15, wherein the inorganic element comprises three inorganic layers and the organic element comprises two organic layers disposed between the inorganic layers.

21. The article of claim 20, wherein the inorganic element comprises $Al_2O_3$ and the polymeric element comprising a polyimide.

* * * * *

UNITED STATES PATENT AND TRADEMARK OFFICE
CERTIFICATE OF CORRECTION

| | |
|---|---|
| PATENT NO. | : 11,407,681 B2 |
| APPLICATION NO. | : 16/498908 |
| DATED | : August 9, 2022 |
| INVENTOR(S) | : Robert Alan Bellman et al. |

It is certified that error appears in the above-identified patent and that said Letters Patent is hereby corrected as shown below:

On the Title Page

On the page 2, in Column 2, under "Other Publications", Line 16, delete "Joutnal" and insert -- Journal --.

On the page 2, in Column 2, under "Other Publications", Line 26, delete "389-138," and insert -- 389-438, --.

Signed and Sealed this
Eighth Day of August, 2023

Katherine Kelly Vidal
*Director of the United States Patent and Trademark Office*